(12) United States Patent
Hendricks et al.

(10) Patent No.: US 7,134,131 B1
(45) Date of Patent: Nov. 7, 2006

(54) DIGITAL BROADCAST PROGRAM BILLING

(75) Inventors: John S. Hendricks, Potomac, MD (US); Alfred E. Bonner, Bethesda, MD (US); John S. McCoskey, Castle Rock, CO (US); Michael L. Asmussen, Herndon, VA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 0 days.

(21) Appl. No.: 09/556,875

(22) Filed: Apr. 18, 2000

Related U.S. Application Data

(60) Division of application No. 09/191,520, filed on Nov. 13, 1998, and a continuation-in-part of application No. 08/735,552, filed on Oct. 23, 1996, now Pat. No. 6,160,989, which is a continuation-in-part of application No. 08/711,742, filed on Sep. 10, 1996, now Pat. No. 6,052,554, and a continuation-in-part of application No. 08/352,205, filed on Dec. 2, 1994, now Pat. No. 6,201,536, which is a continuation of application No. 08/160,280, filed on Dec. 2, 1993, now Pat. No. 5,600,364, which is a continuation of application No. 08/160,191, filed on Dec. 2, 1993, now Pat. No. 5,559,549, which is a continuation-in-part of application No. 07/991,074, filed on Dec. 9, 1992.

(51) Int. Cl.
*H04N 7/16* (2006.01)
*H04N 7/173* (2006.01)
(52) U.S. Cl. ............................. 725/31; 725/5
(58) Field of Classification Search .................. 725/1, 725/2, 6, 8, 31, 5
See application file for complete search history.

(56) References Cited

U.S. PATENT DOCUMENTS

| 4,484,217 | A | * | 11/1984 | Block et al. ................ 725/1 |
| 4,641,205 | A |   | 2/1987  | Beyers, Jr. |

(Continued)

*Primary Examiner*—Andrew Y. Koenig
(74) *Attorney, Agent, or Firm*—Patterson & Sheridan, LLP

(57) ABSTRACT

A method and a system for selecting and ordering broadcast programs uses an electronic program guide that may be broadcast to subscribers or posted on an Internet web site. The system allows national broadcasters to provide one or more channels of pay-per-view or subscription programming and to establish a mechanism for billing subscribers who access the programs. Subscribers may access the Internet and send a program request to a web site. An authorization is then forwarded to a billing center and to a local broadcaster. The billing center debits the subscriber's account, or prepares a bill. The local broadcaster sends the authorization to the subscriber. The authorization includes a program code and a terminal identifier that permit the subscriber's television or set top terminal to decrypt and display the program.

32 Claims, 31 Drawing Sheets

U.S. PATENT DOCUMENTS

| | | | |
|---|---|---|---|
| 4,686,564 A * | 8/1987 | Masuko et al. ............. | 725/120 |
| 5,270,809 A | 12/1993 | Gammie et al. | |
| 5,317,391 A * | 5/1994 | Banker et al. .............. | 725/139 |
| 5,357,276 A * | 10/1994 | Banker et al. .............. | 725/102 |
| 5,374,951 A | 12/1994 | Welsh | |
| 5,412,720 A * | 5/1995 | Hoarty ...................... | 380/211 |
| 5,539,450 A * | 7/1996 | Handelman .................... | 725/1 |
| 5,550,863 A | 8/1996 | Yurt et al. | |
| 5,600,364 A * | 2/1997 | Hendricks et al. ............. | 725/9 |
| 5,629,733 A | 5/1997 | Youman et al. | |
| 5,635,989 A | 6/1997 | Rothmuller | |
| 5,659,350 A * | 8/1997 | Hendricks et al. .......... | 725/116 |
| 5,675,390 A | 10/1997 | Schindler et al. | |
| 5,715,315 A | 2/1998 | Handelman | |
| 5,734,853 A * | 3/1998 | Hendricks et al. .......... | 715/716 |
| 5,844,552 A * | 12/1998 | Gaughan et al. .............. | 725/37 |
| 5,917,537 A | 6/1999 | Lightfoot et al. | |
| 6,058,424 A * | 5/2000 | Dixon et al. ................ | 709/226 |
| 2005/0278768 A1* | 12/2005 | Boyer et al. ................ | 725/113 |

* cited by examiner

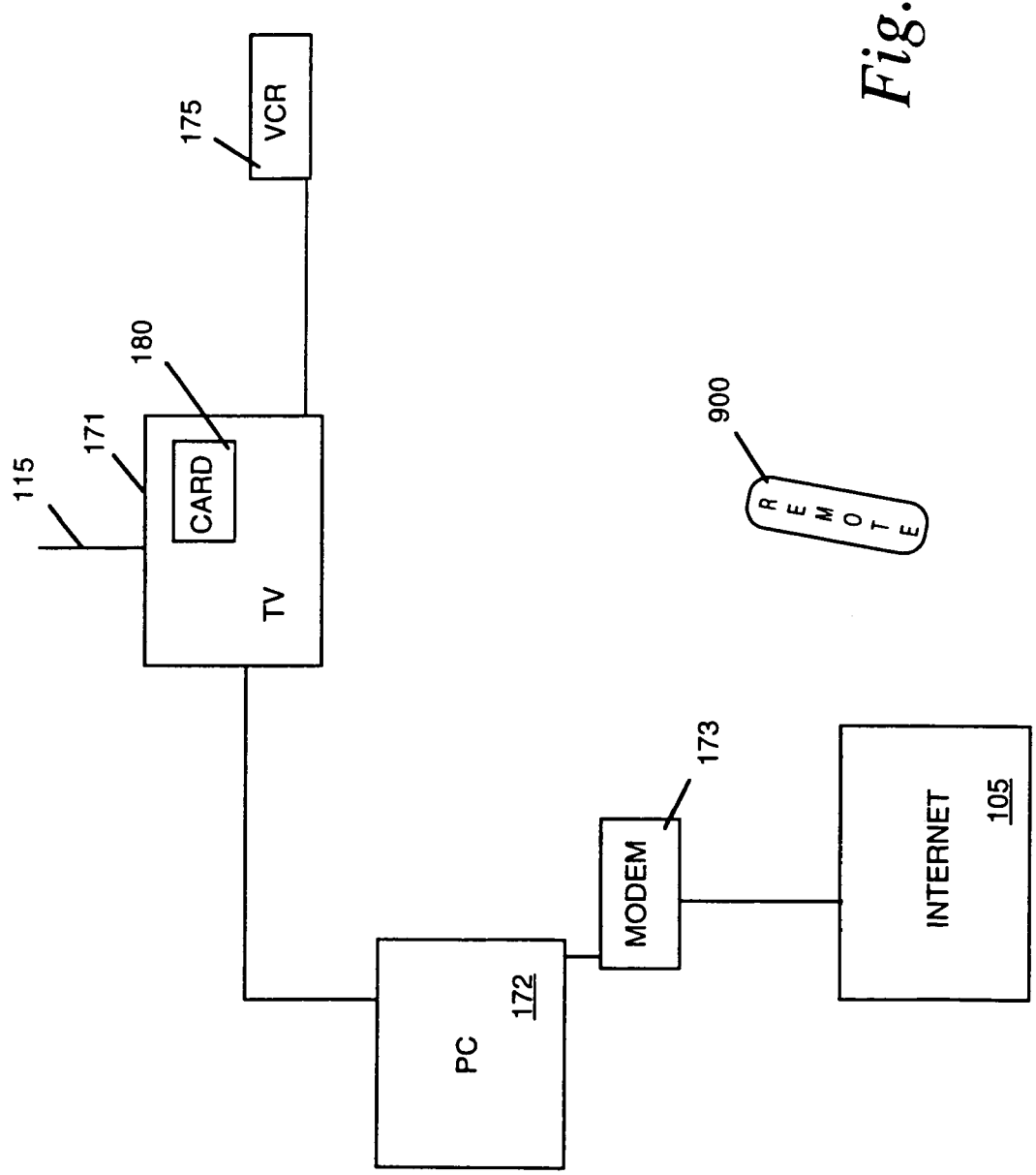

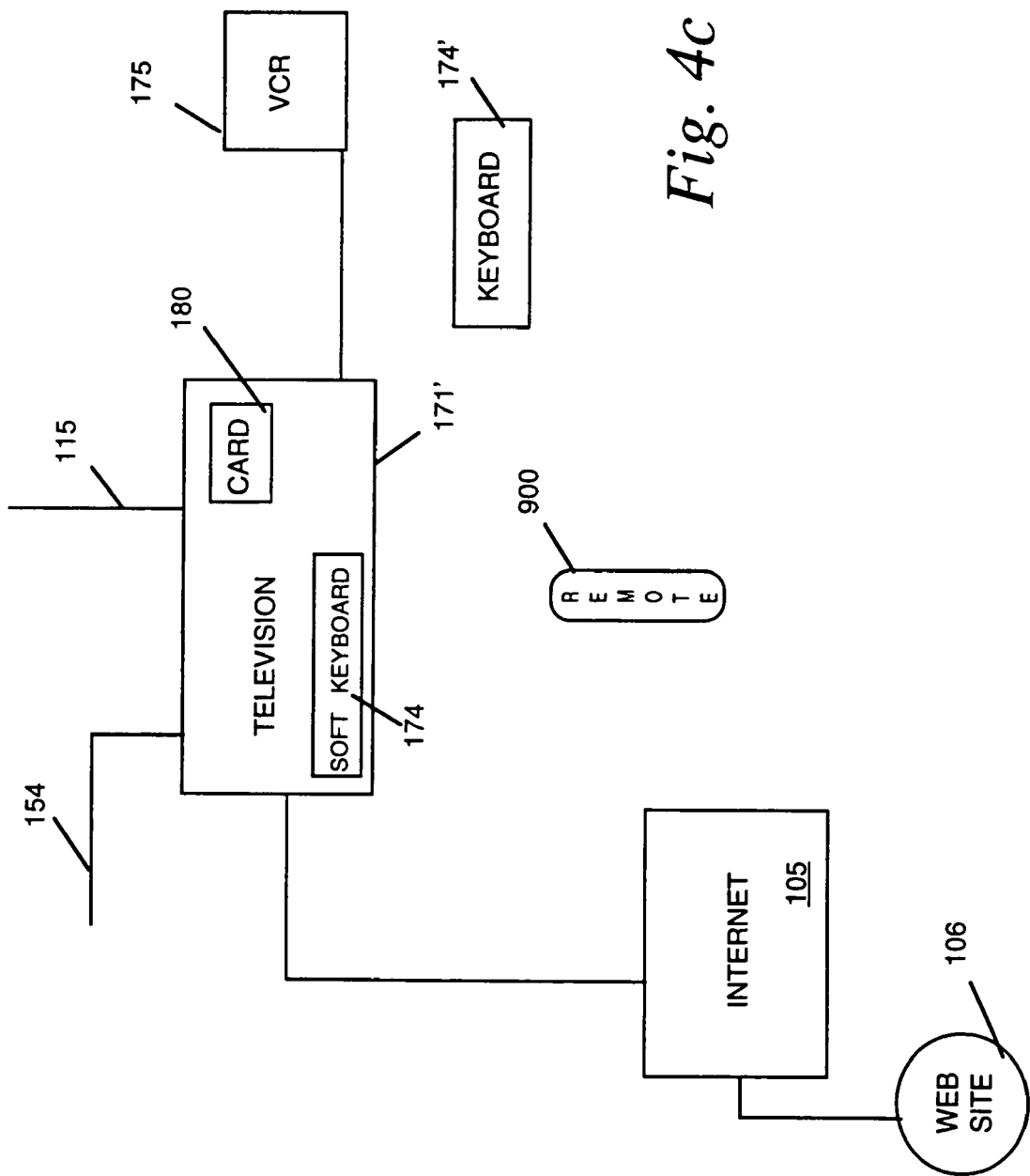

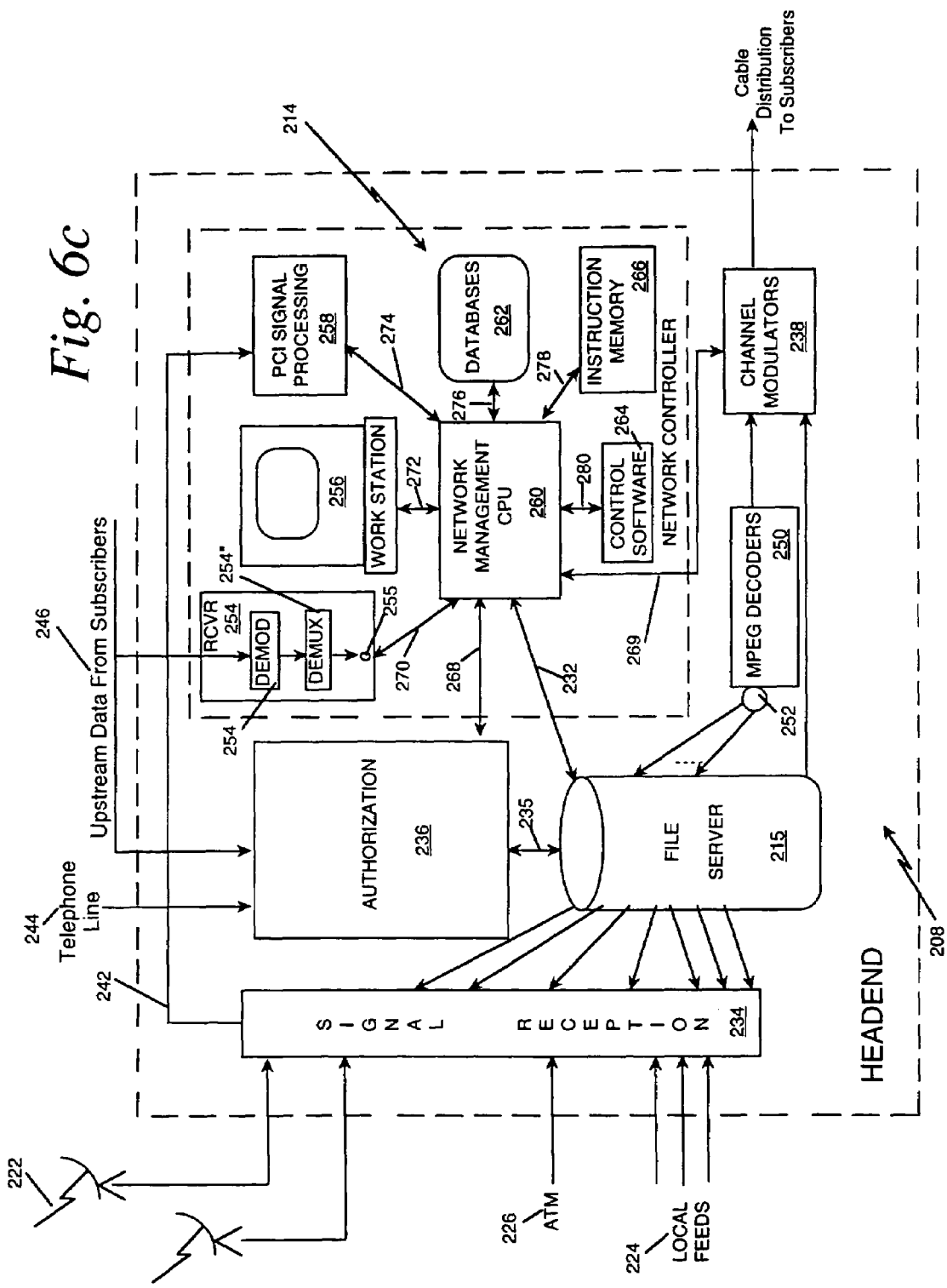

Fig. 8

| CHANNEL | 12 - 1 | 1 - 2 | 2 - 3 | 3 - 4 |
|---|---|---|---|---|
| 1 (Free) | HDTV- Simpsons | HDTV - Cheers | HDTV - King of the Hill | HDTV - Seinfeld |
| 2 (PPV - 4.95) | No Program | NFL Football - Colts v. Packers | NFL Football - Colts v. Packers | NFL Football - Colts v. Packers |
| 3 (PPV - 4.95) | No Program | NFL Football - Chiefs v. Raiders | NFL Football - Chiefs v. Raiders | NFL Football - Chiefs v. Raiders |
| 4 (PPV - 1.95) | Terminator IV (R) | Terminator IV (R) | Aliens X (R) | Aliens X (R) |
| 5 (PPV - 1.95) | King Lear (PG-13) | King Lear (PG-13) | King Lear (PG-13) | King Lear (PG-13) |
| 6 (PPV - 1.95) | Gone With the Wind (G) | Gone With the Wind (G) | Gone With the Wind (G) | Gone With the Wind (G) |
| 7 (Free) | Meet the Press | This Old House | Fly Fishing | Tennis |
| 8 (Free) | NFL Today | Meet the Press | This Old House | Golf |

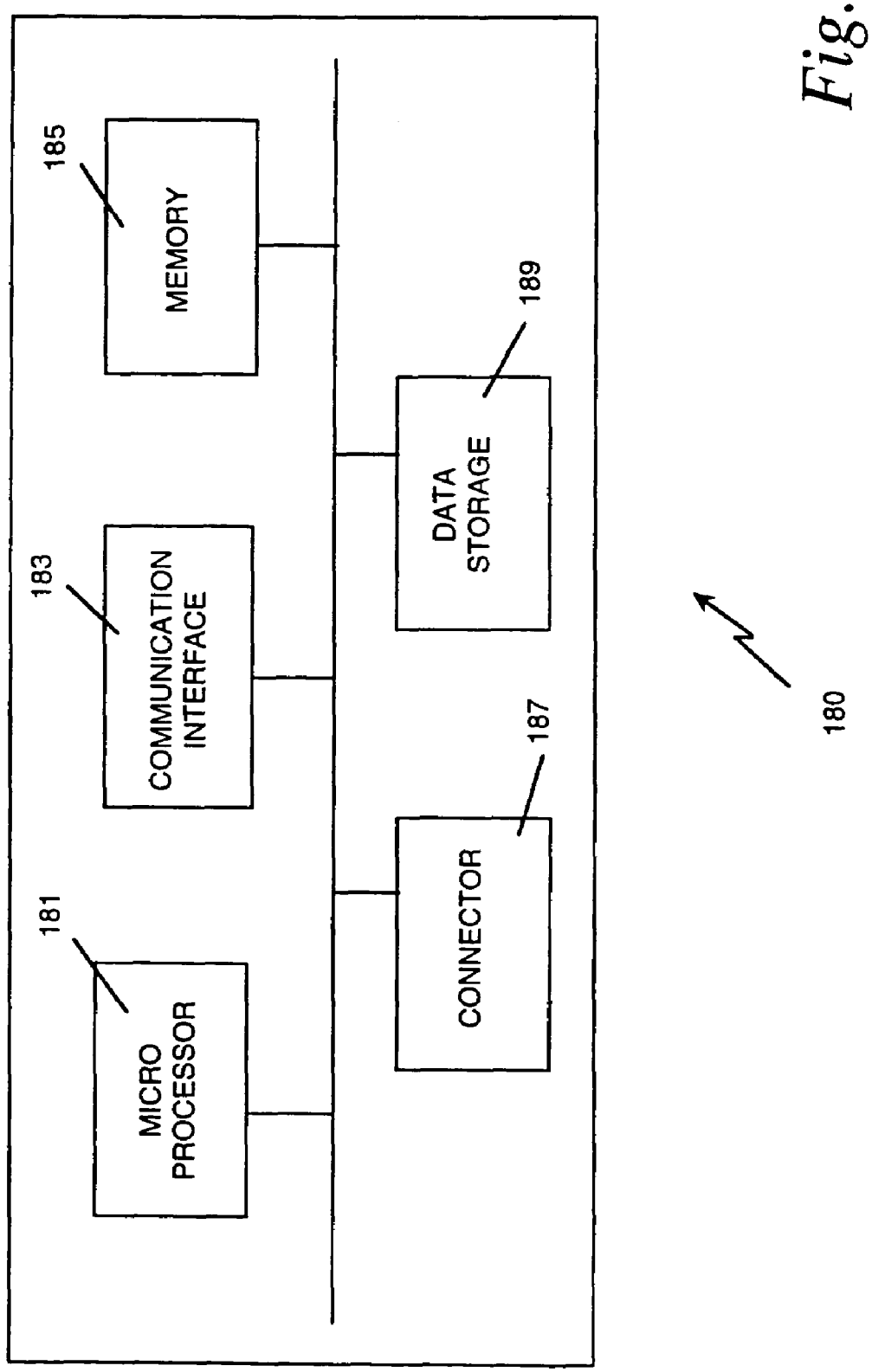

330

340

DIGITAL BROADCAST PROGRAM BILLING

RELATED APPLICATIONS

This application is a divisional of application Ser. No. 09/191,520, filed Nov. 13, 1998, entitled DIGITAL BROADCAST PROGRAM ORDERING, which is a continuation-in-part of application Ser. No, 08/711,742, filed Sep. 10, 1996, entitled TELEVISION PROGRAM DELIVERY SYSTEM, now U.S. Pat. No. 6,052,554, which is a continuation of application Ser. No. 08/160,191, filed Dec. 2, 1993, entitled TELEVISION PROGRAM DELIVERY SYSTEM, now U.S. Pat. No. 5,559,549.

This application is also a continuation-in-part of application Ser. No. 08/735,552, filed Oct. 23, 1996, entitled NETWORK CONTROLLER FOR CABLE TELEVISION DELIVERY SYSTEMS, now U.S. Pat. No. 6,160,989, which is a continuation of application Ser. No. 08/160,280, filed Dec. 2, 1993, entitled NETWORK CONTROLLER FOR CABLE TELEVISION DELIVERY SYSTEMS, now U.S. Pat. No. 5,600,364, which is a continuation-in-part of application Ser. No. 07/991,074 filed Dec. 9, 1992 entitled TELEVISION PROGRAM PACKAGING AND DELIVERY SYSTEM WITH MENU DRIVEN SUBSCRIBER ACCESS.

This application is also a continuation-in-part of application Ser. No. 08/352,205 filed Dec. 2, 1994, entitled NETWORK MANAGER FOR CABLE TELEVISION SYSTEM HEADENDS, now U.S. Pat. No. 6,201,536, which is a continuation-in-part of application Ser. No. 07/991,074, filed Dec. 9, 1992, entitled TELEVISION PROGRAM PACKAGING AND DELIVERY SYSTEM WITH MENU DRIVEN SUBSCRIBER ACCESS and application Ser. No. 08/160,280, filed Dec. 2, 1993, entitled NETWORK CONTROLLER FOR CABLE TELEVISION DELIVERY SYSTEMS, now U.S. Pat. No. 5,600,364.

The following patents and continuation-in-part applications, also based on the above-referenced patent application, are incorporated herein by reference:

U.S. Pat. No. 5,798,785, entitled REPROGRAMMABLE TERMINAL FOR SUGGESTING PROGRAMS OFFERED ON A TELEVISION PROGRAM DELIVERY SYSTEM.

U.S. Pat. No. 5,659,350, entitled AN OPERATIONS CENTER FOR A TELEVISION PROGRAM PACKAGING AND DELIVERY SYSTEM, dated Aug. 19, 1997.

U.S. Pat. No. 5,734,853, entitled SET-TOP TERMINAL FOR CABLE TELEVISION DELIVERY SYSTEMS, dated Mar. 31, 1998.

U.S. Pat. No. 5,990,927, entitled ADVANCED SET-TOP TERMINAL FOR CABLE TELEVISION DELIVERY SYSTEMS, dated Nov. 23, 1999, U.S. Pat. No. 5,682,195, entitled DIGITAL CABLE HEADEND FOR CABLE TELEVISION DELIVERY SYSTEM, dated Oct. 28, 1997.

BACKGROUND OF THE INVENTION

The invention relates to television entertainment systems for providing television programming to consumer homes. More particularly, the invention relates to a method and an apparatus that allows subscribers to order broadcast digital television programming.

Advances in television entertainment have been primarily driven by breakthroughs in technology. In 1939, advances on Vladmir Zworykin's picture tube provided the stimulus for NBC to begin its first regular broadcasts. In 1975, advances in satellite technology provided consumers with increased programming to homes.

In addition to advances in television broadcast technology, government regulatory agencies have placed requirements on the broadcast television industry. In particular, the over-the-air broadcast television networks will soon transition to high definition television (HDTV)—a broadcast digital television standard. These broadcasters may elect to provide a single HDTV digital signal in their allotted bandwidth, with the remaining bandwidth used for standard definition television (SDTV) digital programming. While the broadcast networks may desire to structure some of these channels to include a subscription, or pay-per-view feature, no mechanism currently exists to allow the broadcast networks to control access to their future digital programming. Without an effective authorization and billing system, the broadcast networks will likely not implement pay-per-view programming, thereby reducing programming choices for consumers.

The broadcast networks may also provide the same broadcast programming over existing cable television and digital satellite television systems. As before, the broadcast networks may want to control access to specific channels of their broadcast programming.

The present invention solves these problems so that over-the-air broadcast television services can be expanded to incorporate increased programming choices.

SUMMARY OF INVENTION

This invention relates to a digital television program delivery system. Specifically, the present invention is a digital television program delivery apparatus and method that provides subscribers with access to multiple channels of digital television programming including pay-per view events. The invention incorporates advanced features such as menu-driven access and one-button program selection.

To access the paid programming, an electronic program guide, program authorization system and billing system are used to provide a menu of available programming and to authorize receipt of programming and provide for payment by subscribers.

The electronic program guide may be provided as part of the broadcast from a national broadcaster. Alternately, the electronic program guide may be provided on an Internet web site. The electronic program guide may list discrete programs, series of programs, specialty channels, such as high definition television, and specialty programs, such as sports packages. A subscriber indicates a desired program to order by moving a cursor over the program, using a remote control, for example. The subscriber then operates a go button on the remote control to send an order signal to a remote location. Order signals may be sent to the national broadcaster, a broadcast affiliate, a local cable system, any other broadcast program provider, another remote location, and to the Internet web site.

In an embodiment, after receiving the order signal, an order and authorization system verifies that the subscriber is authorized to view the selected program, and sends an authorization signal to the broadcast program provider. The broadcast program provider then provides a local authorization code that is addressed to the terminal that originated the order signal. Alternately, the broadcast program provider may provide the local authorization to a terminal different from the terminal that initiated the program order.

These and other objects and advantages of the invention will become obvious to those skilled in the art upon review of the following description, the attached drawings and appended claims.

BRIEF DESCRIPTION OF DRAWINGS

FIGS. 4a–4c are diagrams of remote location reception options.

FIGS. 6a–6c show embodiments of a local cable television delivery system.

FIG. 8 is an example of an electronic program guide for use with the broadcast environment of FIG. 1.

FIG. 14 is a diagram of a smart card.

DISCLOSURE OF INVENTION

Figure 1:
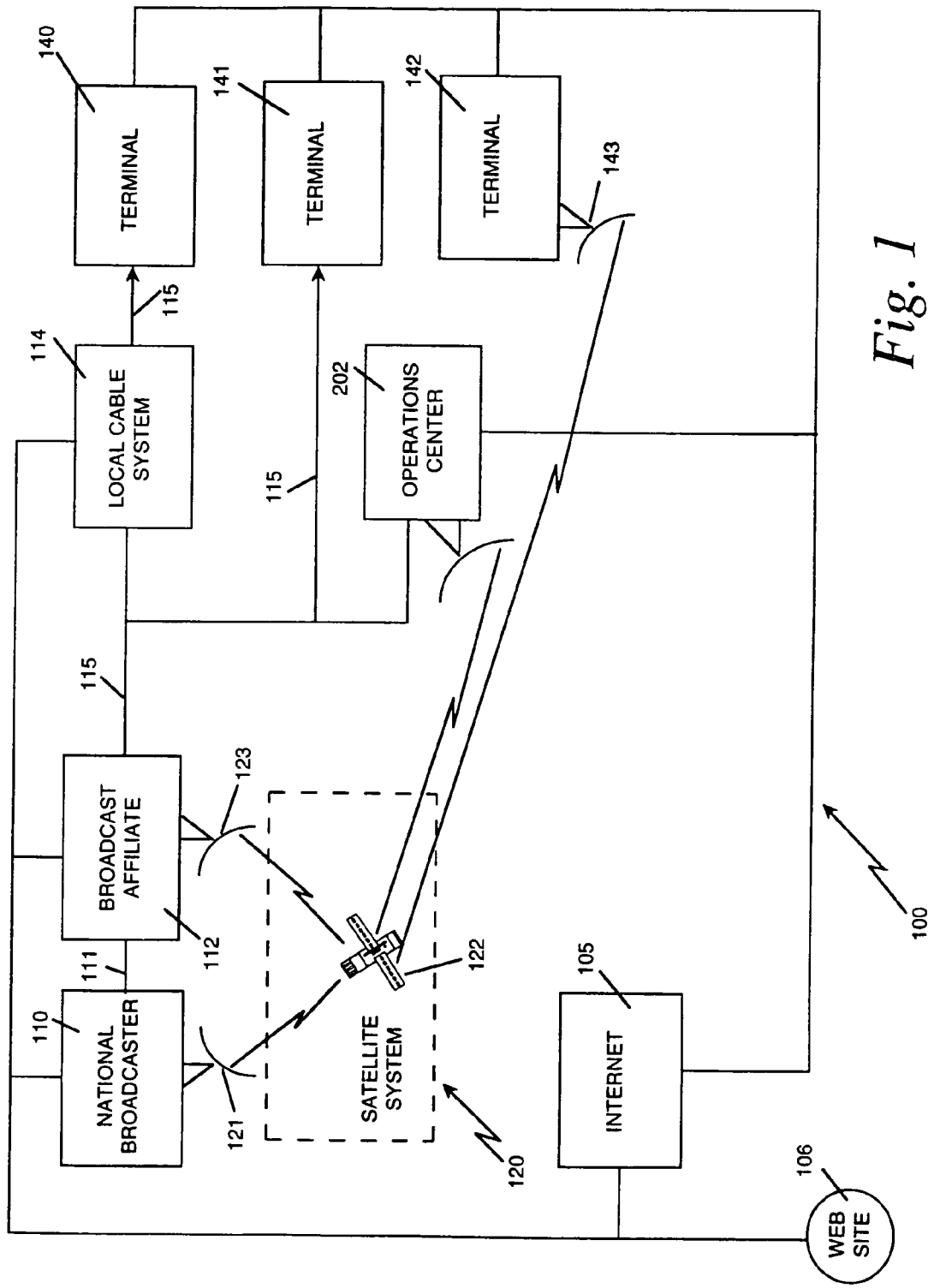
FIG. 1 is a diagram of a digital television broadcast environment.

A. Television Program Delivery System Description
1. Broadcast Television Environment FIG. 1 shows a broadcast television environment 100 in which a broadcast program provider, such as a national broadcaster 110, provides digital multiplex television programming 111 to a broadcast affiliate 112. The programming 111 may be provided to the broadcast affiliate 112 by any suitable means. For example, the national broadcaster 110 may provide the programming 111 by satellite transmission using a satellite broadcast system 120. The satellite broadcast system 120 may include an uplink site 121, a satellite 122, and a downlink site 123. The satellite broadcast system 120 may transmit the programming 111 to the broadcast affiliate 112 and directly to terminals 140, 141 and 142 at remote locations such as subscribers' homes, for example.

The broadcast affiliate 112 may provide digital multiplex television programming 115 to intermediate locations such as local cable system 114 and an operations center 202. Alternately, the broadcast affiliates 112 may provide the programming 115 directly to the terminals 140–142. The operations center 202 may provide the programming 115 to the local cable system 114. The local cable system 114 that receives the programming 115 may in turn provide the programming 115 to the terminals 140–142.

The terminals 140–142 may be any terminal capable of receiving digital television signals including digital televisions, digital set top boxes and personal computers, or any combination of these devices. The terminals 140–142 may receive the programming 115 by cable, including coaxial cable and fiber optic cable, by telephone cable (including T1 and T3 lines, Integrated Services Digital Network (ISDN) lines and Asymmetric Digital Subscriber Lines (ADSL)), and by satellite broadcast. Alternately, the terminals 140–142 may receive the programming 111 directly from the national broadcaster 110 via the satellite broadcast system 120. For example, the terminal 142 receives direct broadcast satellite programming via a backyard antenna 143.

Also coupled to the terminals 140–142 may be an Internet 105. The Internet 105 provides access to web sites such as web site 106. The web site 106 may supply online services and data that may be displayed on a television (not shown) or a personal computer (not shown), for example. The Internet 105 may also connect to the broadcast affiliate 112 and the national broadcaster 110. The national broadcaster 110 may use the Internet 105 to post program menus and to provide a means for authorizing reception of pay-per-view broadcast programming and to receive payment for the programming. The use of the Internet 105 for these purposes will be described later in more detail.

Figure 2:
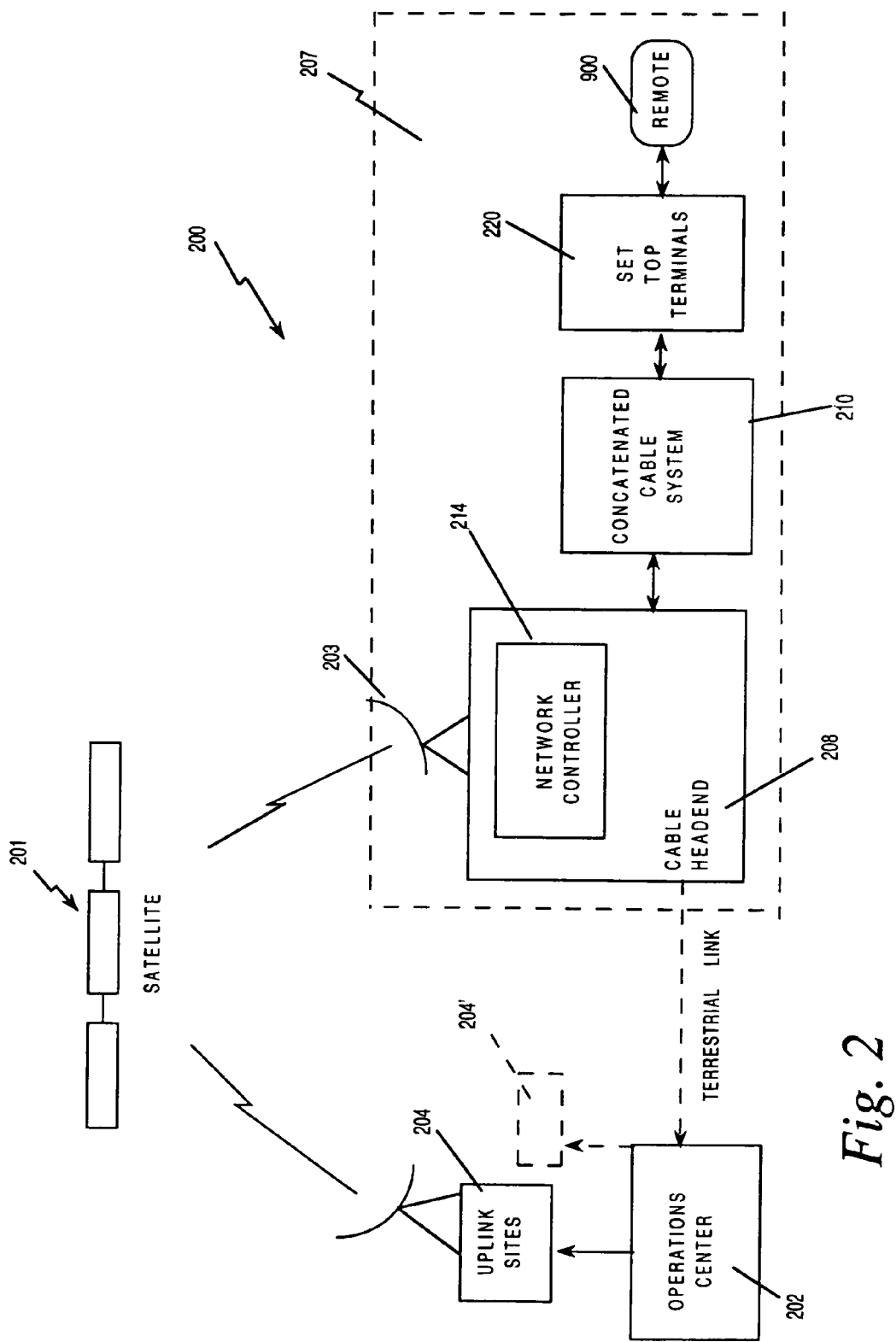
FIG. 2 is a diagram of the primary components of a cable television delivery system using the broadcast environment of FIG. 1.

FIG. 2 shows an expanded cable television program delivery system 200 that dramatically increases programming capacity using compressed transmission of television program signals and specifically incorporates the digital multiplex programming 111 from the national broadcasters 110.

In addition to the programming 111, subscribers are able to access an expanded television program package that includes other broadcast programming, video on demand, interactive services, including online services, data services and other programming. Subscribers view selected programs through a menu-driven access scheme that allows each subscriber to select individual programs by sequencing a series of menus. The menus may be sequenced by the subscriber using simple alpha-numeric and iconic character access or moving a cursor or highlight bar on the television display or the personal computer to access desired programs by simply pressing a single button, rather than recalling from memory and pressing the actual two or more digit numeric number assigned to a selection. Thus, with the press of a single button, the subscriber can advance from one menu to the next, or can select a program for viewing. In this fashion, the subscriber can sequence the menus and select a program from any given menu. The programs may be grouped by category so that similar program offerings are found on the same menu. Alternately, the programs may be arranged in the menu in a matrix fashion by channel and time/date of broadcast.

Subscribers are able to view the menu, or electronic program guide, of the programming 115 in a variety of formats. The electronic program guide may be broadcast by the national broadcaster 110 and displayed at the terminal 140. Alternately, the electronic program guide may be provided at the web site 106.

Figure 3:
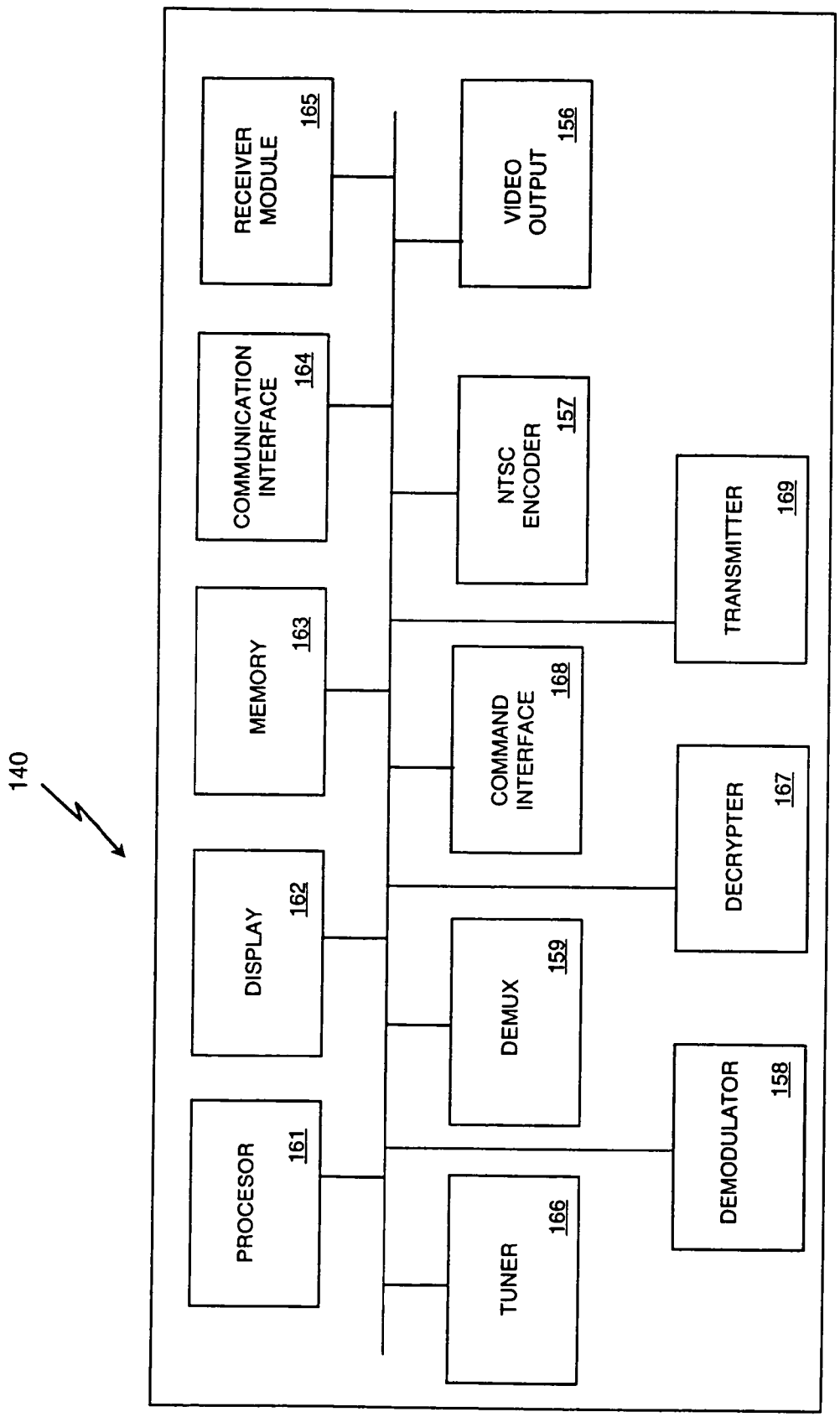
FIG. 3 is a diagram of a terminal used in conjunction with the broadcast environment of FIG. 1.

FIG. 3 shows the terminal 140 in more detail. The terminal 140 includes a processor 161 that controls operation of components of the terminal 140. A display 162 displays the programming provided by the national broadcaster 110. The display 162 may be a CRT, a LCD, or any other device suitable for displaying digital television signals. A memory 163 stores programming instructions, terminal operating instructions, authorization signals, programming, including targeted advertisements, programs watched data, and other information related to receiving and watching broadcast programs. A communications interface 164 provides communications with remote locations, such as the national broadcaster 110 and the Internet 105 shown in FIG. 1. The communications interface 164 may be a cable modem, a telephone modem, a wireless modem, a fiber optic connector, a broadcast satellite receiver, a radio frequency receiver, a LAN connector, or any other device capable of one or two-way communication between the terminal 140 and the remote location, or any combination of these devices. A receiver module 165 receives broadcast programming from the national broadcaster 110. The receiver module 165 may include one or more receivers. Alternatively, the functions of the receiver module 165 may be spread among other distributed equipment, such as a personal computer or smart card, for example. A tuner 166, coupled to the receiver module 165, tunes to an appropriate channel to display a program provided by the national broadcaster 110. If the program is a pay-per-view program, it may be encrypted. A decrypter 167 decrypts such pay-per-view programs so that they may be displayed on the display 162. A command input device 168 sends commands to the processor 161. The command input device 168 may be a remote control or a data entry device included in the terminal 140. The command input device 168 may also be a remote device and a soft key board that is displayed on the display 162. A transmitter 169 transmits information, such as program order signals, via the communication interface 164 to the national broadcaster 110 or the Internet 105.

The terminal 140 also includes a demodulator 150, and a demultiplexer 159 to process the programming 115, a NTSC encoder to convert digital signals to NTSC standard, and a video output to produce video for display on the display 162. Other components required to provide television programming at the terminal 140 are described later in more detail.

Some of the above features may be incorporated into the set top terminal 220, or may be added to the set top terminal 220 by use of a plug-in card, such that described in U.S. Pat. No. 5,734,853, entitled SET TOP TERMINAL FOR CABLE TELEVISION DELIVERY SYSTEMS and in copending application Ser. No. 08/160,194, entitled ADVANCED SET TOP TERMINAL FOR CABLE TELEVISION DELIVERY SYSTEMS, the disclosures of which are hereby incorporated by reference.

The terminal 140 may be embodied as a digital television with the above-described components built in. The terminal 140 may also be embodied as an analog or digital television with an attached set top terminal. The terminal 140 may further be embodied as a digital television that incorporates a smart card and that is coupled to a personal computer. Finally, the terminal 140 may be a digital television that incorporates a smart card alone. The terminal 140 may receive the programming over-the-air from the national broadcaster 110 or the broadcast affiliate 112, via a wired media such as by cable from the local cable system 114, and via the satellite broadcast system 120.

2. In-Home Reception Options

Figure 4A:
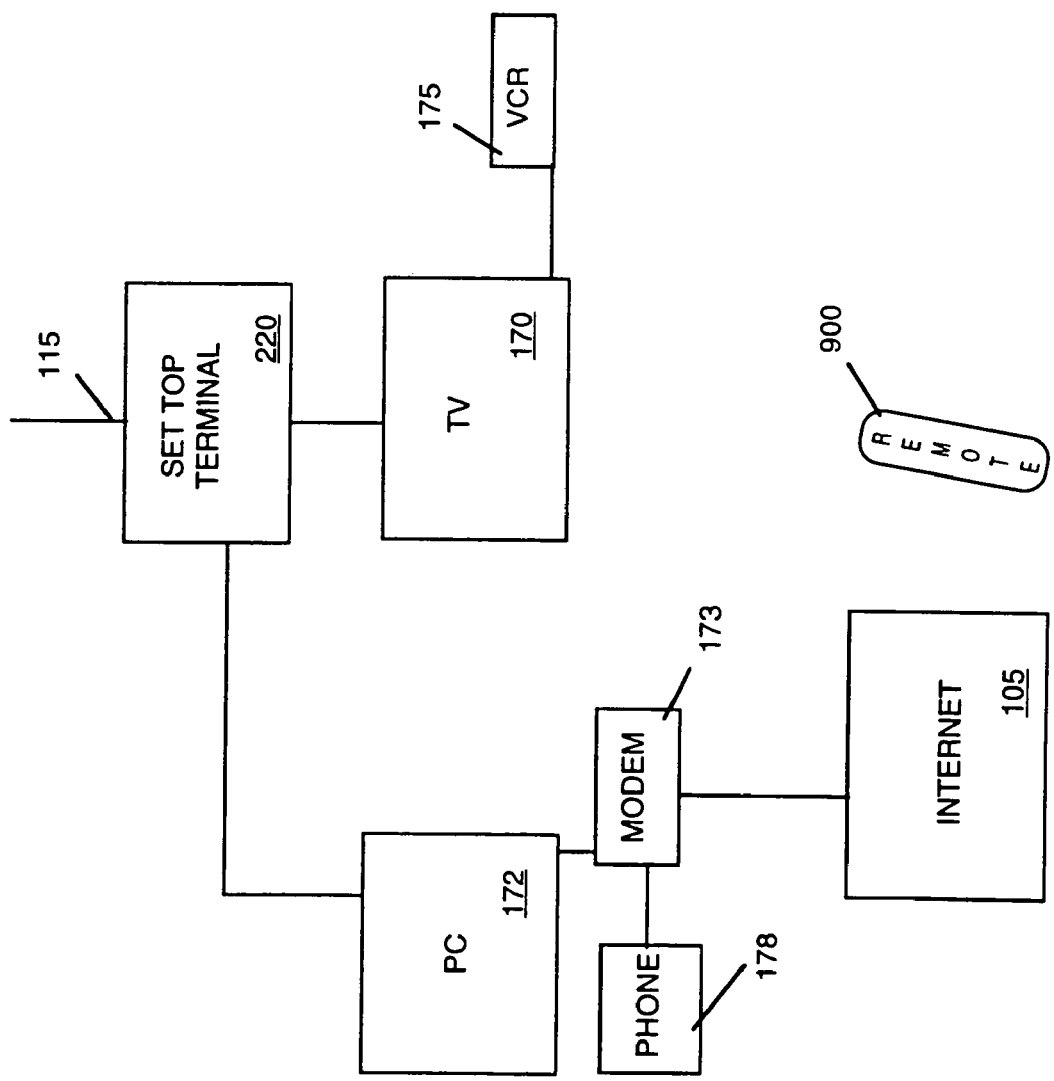

FIGS. 4a, 4b and 4c show reception options at the remote locations such as at a subscriber's home. In FIG. 4a, a television 170 is coupled to a digital set top terminal 220. The set top terminal 220 receives the programming 115 from the broadcast affiliate 112 or the local cable system 114. The local cable system 114, using the cable headend 208 or the operations center 202 shown in FIG. 2, may provide expanded television programming for display on the television 170. Alternately, the broadcast affiliate 112 may provide the programming 115 by use of the satellite broadcast system 120. In this alternative, the set top terminal 220 would be coupled to a local, or backyard, satellite dish antenna or similar device. In yet another alternative, the set top terminal 220 receives programming from both the satellite broadcast system 120 and the local cable system 114.

Also shown in FIG. 4a is a telephone 178 that may be used to communicate with the broadcast affiliate 112 and the cable headend 208, and a personal computer 172 and a modem 173 that may be used to communicate with the Internet 105. The personal computer 172 may be coupled to the set top terminal 220 via signal path 174. The signal path 174 may include a cable connection such as a RS-232 cable and connectors or by wireless means, such as infra red signaling and radio frequency signaling, for example.

The set top terminal 220 performs the necessary processing to send the programming 115 to the television 170 for display. For example, if the television 170 is an analog television, the set top terminal 220 may demultiplex the programming 115, convert the demultiplexed digital programming to a NTSC-compatible analog signal and provide the analog signal to the television 170. If the television 170 is a digital television, the set top terminal 220 may demultiplex the programming 115 and supply the demultiplexed signal to the television 170.

The set top terminal 220 may receive commands from a remote control 900. The remote control 900, which will be described in detail later, may be an infrared or a radio frequency control, or any other suitable control. The set top terminal 220 may include a variety of error detection, decryption, and coding techniques such as anti-taping encoding. The set top terminal 220 may include communication devices that allow reception and transfer of data with external sources such as the Internet 105. For example, the set top terminal 220 may include a telephone modem, a cable modem, a wireless modem, a fiber optic connector, a LAN connector, or any combination of these devices.

The set top terminal 220 has input and output ports for communication with other local and remote devices. For example, the set top terminal 220 may have an input port that receives information from the cable headend 208. The set top terminal 220 may have output ports that provide communications from the set top terminal 220 to the television 170 and to a video cassette recorder (VCR) 175. Certain menu selections may cause the set top terminal 220 to send control signals directly to the VCR 175 to automatically program or operate the VCR 175. Also, the set top terminal 220 may contain a phone jack that can be used for maintenance, trouble shooting, reprogramming and additional customer features. The phone jack may also be used to connect the set top terminal 220 with the Internet 105. The set top terminal 220 may also contain stereo/audio output terminals and a satellite dish input port.

In an embodiment, the set top terminal 220 receives compressed program and control signals from the cable headend 208, the operations center 202, the broadcast affiliate 112, or the national broadcaster 110. After the set top terminal 220 receives the individually compressed program and control signals, the signals are demultiplexed, decompressed, converted to analog signals (if necessary) and either placed in local storage (for later display of for other control functions, such as creating programming menus), executed immediately, or sent directly to the television screen.

After processing certain signals received from the cable headend 208, the set top terminal 220 is able to store menu data for generating menus that are displayed on a subscriber's television. Before a menu is generated, menu templates may be created and sent to the set top terminal 220 for storage. A microprocessor in the set top terminal 220 uses the control signals received from the operations center 202 or cable headend 208 to generate the menu templates for storage. Each menu template may be stored in volatile memory in the set top terminal 220. When the set top terminal 220 receives the menu template information, the set top terminal 220 demultiplexes the program control signals received from the cable headend 208 into four primary parts: video, graphics, program logic and text. Each menu template represents a different portion of a whole menu, such as a menu background, a television logo, a cursor highlight overlay, one or more scalable display windows, or other miscellaneous components needed to build a menu. The menu templates may be deleted or altered using control signals received from the operations center 202, the cable headend 208, the broadcast affiliate 112 or the national broadcaster 110.

Once the menu templates have been stored in memory, the set top terminal 220 can generate the appropriate menus. In an embodiment, the basic menu format information is stored in memory located within the set top terminal 220 so that the microprocessor may locally access the information from the set top terminal 220 instead of from an incoming signal. The microprocessor next generates the appropriate menus from the menu templates and the other menu information stored in memory. The set top terminal 220 then displays specific menus on the subscriber's television that correspond to the inputs the subscriber selects. Alternately, menu viewing and program selection may use a web site on the Internet 105, which is accessed via the provided modem interface.

If the subscriber selects a specific program from the menu, the set top terminal 220 determines on which channel the program is being shown, demultiplexes and extracts the single channel transmitted from the cable headend 208. The set top terminal 220 then decompresses the channel and, if necessary, converts the program signal to an analog NTSC signal to enable the subscriber to view the selected program. The set top terminal 220 can be equipped to decompress more than one program signal. Two or more decompressors may be desirable to provide picture-on-picture capability, control signal decompression, enhanced channel switching or like features.

In addition to menu information, the set top terminal 220 may also store text transmitted from the remote location such as the cable headend 208 or the operations center 202. The text may inform the subscriber about upcoming events, billing and account status, new subscriptions, or other relevant information. The text may be stored in an appropriate memory location depending on the frequency and the duration of the use of the textual message.

Optional upgrades are available to enhance the performance of the set top terminal 220. These upgrades may include a cartridge or computer card (not shown) that is inserted into an expansion slot in the set top terminal 220 or may include a feature offered by the cable headend 208 or operations center 202 to which the user may subscribe. Available upgrades may include online data base services, interactive multi-media services, access to digital radio channels, and other services.

In an embodiment, available converter boxes such as those manufactured by General Instruments or Scientific Atlanta, may be modified and upgraded to perform the functions of the set top terminal 220.

FIG. 4b shows an alternate arrangement of components for receiving the broadcast digital programming 115. In FIG. 4b, the digital television 171 is coupled to the broadcast affiliate 112 to receive the programming 115. The digital television 171 may also receive the programming 115, and other programming, from the local cable system 114 or from the satellite broadcast system 120.

The digital television 171 may include a smart card 180 that performs the functions described above for the set top terminal 220. For example, the smart card 180 may include a cable modem, a telephone modem, a wireless modem, a fiber optic connector, or a LAN connector. The smart card 180 is described later in more detail. Also shown in FIG. 4b is the personal computer 172 and the modem 173, which function as before to connect to the Internet 105. The functions of the digital television 171 may be controlled by the remote control 900, using either infrared signals or radio frequency signals, for example.

FIG. 4c shows another arrangement of components for receiving the broadcast digital programming 115. In FIG. 4c, a digital television 171' incorporating the smart card 180 receives the programming 115 from the local cable system 114. The television 171' could also receive the programming via other media including direct satellite broadcast, fiber optic connections, local area network, such as an ethernet, the Plain Old Telephone Service (POTS), other telephone delivery systems (including T1 and T3 lines, Integrated Services Digital Network (ISDN) lines and Asymmetric Digital Subscriber Lines (ADSL)) and by over-the-air broadcast from the broadcast affiliate 112. The television 171', incorporating the smart card 180, includes some or all of the functionality of the personal computer 172 shown in FIG. 4b, for example. The television 171'connects to the Internet 105 and is able to access the web site 106 to view electronic program guides provided by the national broadcaster 110, the broadcast affiliate 112 or the local cable system 114. The television 171'is also able to access online services provided by the Internet 105, and to perform computing functions normally associated with the personal computer 172. The remote control 900 may be used to control the television 171'. The television 171'may also, in its programming, include a soft key board 174 that is displayed on the display of the television 171'. The remote control 900 can then be used to operate "soft keys" on the soft key board 174. The television 171' may also incorporate a separate key board 174' that is used to control the television 171'and to operate the television 171' in its personal computer role. The key board 174' may be connected to the television 171' by a wired connection. Alternately, the key board 174' may communicate with the television 171' by wireless means including infra red signaling, radio frequency signaling and by other optical means including a laser. The television 171' may connect to other devices and media including the VCR 175 or other audio or video recording device, and to a telephone system via signal path 154. The television 171' may then be used to display information related to incoming telephone calls, such as a caller identification number, for example. The television 171' may also be used to support a video feed from a caller, such as in a video conference call.

3. Other System Components

Returning to FIG. 2, the program delivery system 200 generally includes (i) at least one operations center 202, where program packaging and control information are created and then assembled in the form of digital data, (ii) a digital compression system, where the digital data is compressed, combined/multiplexed, encoded, and mapped into digital signals for satellite transmission to the cable headend 208 or the broadcast affiliate 112, and (iii) a set of in-home terminals. The program delivery system 200 transports the digital signals to the cable headend 208 where the signals are transmitted through a concatenated cable television system 210 or to the broadcast affiliate 112 where the programming 115 is sent to terminals, such as the terminal 141 of FIG. 1, that are adapted to receive these signals. Within the cable headend 208, the received signals may be decoded, demultiplexed, managed by a local central distribution and switching mechanism, combined and then transmitted to the set top terminal 220 located in each subscriber's home over the cable system 210. Although concatenated cable systems 210 are the most prevalent transmission media for connecting to the home, telephone lines (including T1 and T3 lines, Integrated Services Digital Network (ISDN) lines and Asymmetric Digital Subscriber Lines (ADSL)), cellular networks, fiber optics, local area networks, Personal Communication Networks, and analog and digital satellites and similar technology for transmitting to the home can be used interchangeably with the program delivery system 200.

In the discussion that follows, the functions of the set top terminal 220 are described. These same functions may also be carried out by the digital television 171 with the smart card 180, shown in FIG. 4b, for example.

The program delivery system 200 has a reception region 207 with an in-home decompression capability. This capability is performed by a decompressor housed within the set top terminal 220. The decompressor remains transparent from the subscriber's point of view and allows any of the compressed signals to be demultiplexed and individually extracted from the composite data stream and then individually decompressed upon selection by the subscriber. The decompressed video signals may be converted into analog signals for television display. Such analog signals include NTSC and PAL formatted signals for use by a standard television. Control signals are likewise extracted and decompressed and then either executed immediately or placed in local storage such as a random access memory (RAM), a static random access memory (SRAM), a dynamic random access memory (DRAM), or other memory. Multiple sets of decompression hardware may be used to decompress video and control signals. The set top terminal 220 may then overlay or combine different signals to form the desired display on the subscriber's television. Graphics on video, picture-on-picture and split screen are examples of such a display.

Although a single digital compression standard (e.g., MPEG) may be used for both the program delivery system 200 and the concatenated cable system 210, the compression technique used may differ between the two systems. When the compression standards differ between the two media, the signals received by the cable headend 208 must be decompressed before transmission from the headend 208 to the set top terminals 220. Subsequently, the cable headend 208 must recompress and transmit the signals to the set top terminal 220, which would then decompress the signals using a specific decompression algorithm.

The video signals and program control signals received by the set top terminal 220 correspond to specific television programs and menu data that each subscriber may access through a subscriber interface. The subscriber interface is a device with buttons, such as a key pad, located on the set top terminal 220 or the portable remote control 900. In an embodiment, the subscriber interface is the combined alpha-character, numeric and iconic remote control 900, which provides direct or menu-driven program access. The remote control 900 also contains cursor movement and go buttons as well as alpha, numeric and iconic buttons. The remote control 900, used in conjunction with the menu arrangement, enables the subscriber to sequence through menus by choosing from among several menu options that are displayed on the television screen. In addition, the subscriber may bypass several menu screens and immediately choose a program by selecting the appropriate alpha-character, numeric or iconic combinations on the subscriber interface. In an embodiment, the set top terminal 220 generates the menus that are displayed on the television using the menu data and the menu templates, and the set top terminal 220 displays a specific menu or submenu option for each available video signal. In another embodiment, the menus are provided as a broadcast signal and are displayed on the television screen. In yet another embodiment, the menus are provided at a remote location, such as the web site 106 on the Internet 105, and subscribers may use the web site 106 for program selection.

4. Operations Center and Digital Compression System

Figure 5:
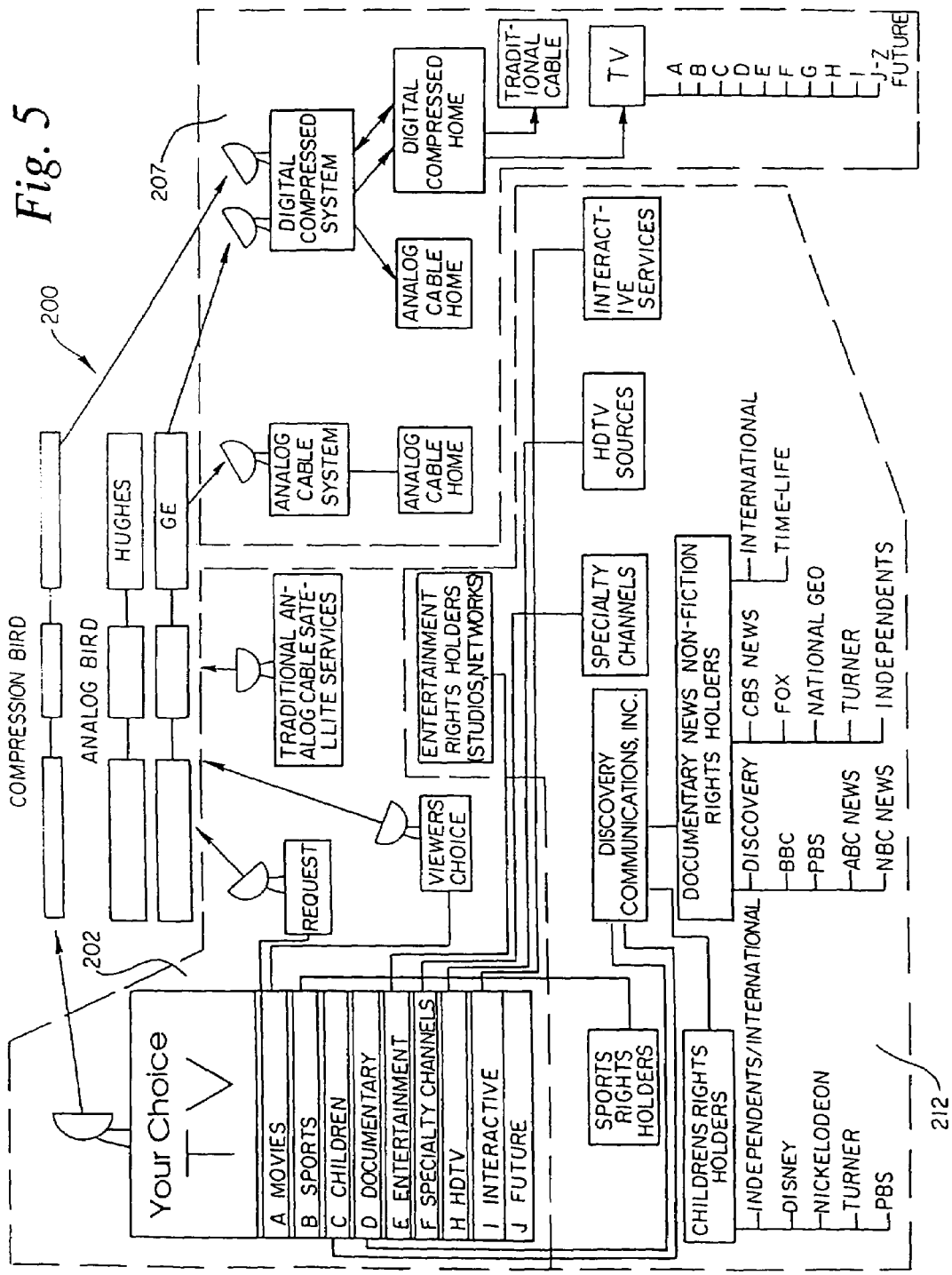
FIG. 5 is a diagram of an operations center of the television delivery system of FIG. 2.

The operations center 202 performs two primary services, packaging television programs and generating the program control information signal. At the operations center 202, television programs are received from external program sources in both analog and digital form. FIG. 5 shows an embodiment of the operations center receiving signals from various external sources 212. Examples of the external program sources are sporting events, children's programs, specialty channels, news or any other program source that can provide audio or visual signals. Once the programs are received from the external program sources, the operations center 202 digitizes (and preferably compresses) any program signals received in analog form. The operations center 202 may also maintain an internal storage of programs. The internally stored programs may be in analog or digital form and stored on permanent or volatile memory sources, including magnetic tape or RAM or other suitable storage medium. Subsequent to receiving programming, the operations center 202 packages the programs into the groups and categories that provide the optimal marketing of the programs to subscribers. For example, the operations center 202 may package the same programs into different categories and menus for weekday, prime-time viewing and Saturday afternoon viewing. Also, the operations center 202 packages the television programs in a manner that enables both the various menus to easily represent the programs and the subscribers to easily access the programs through the menus.

The packaging of the digital signals may be performed at the operations center 202 by computer assisted packaging equipment (CAP). The CAP system normally includes at least one computer monitor, keyboard, mouse, and standard video editing equipment. A programmer packages the signals by entering certain information into the CAP. This information includes the date, time slot, and program category of the various programs. The programmer and the CAP may use demographic data and ratings in performing the packaging tasks. After the programmer selects the various programs from a pool of available programs and inputs the requisite information, the programmer, with assistance from the CAP, can select the price and allocate transponder space for the various programs. After the process is complete, the CAP displays draft menus or program schedules that correspond to the entries of the programmer. The CAP may also graphically display allocation of transponder space. The programmer may edit the menus and transponder allocation several times until satisfied with the programming schedule. During the editing, the programmer may direct the exact location of any program name on a menu with simple commands to the CAP.

The packaging process also accounts for any necessary groupings by satellite transponder. The operations center 202 may send different groups of programs to different cable headends 208 and/or set top terminals 220. One way the operations center 202 may accomplish this task is to send different program packages to each transponder. Each transponder, or set of transponders, then relays a specific program package to specific cable headends 208 and/or set top terminals 220. The allocation of transponder space is another important task performed by the operations center 202.

The operations center 202 may also "insert" directions for filling local available program time in the packaged signal to enable local cable and television companies to fill the program time with local advertising and/or local programming. Consequently, the local cable headends 208 are not constrained to show only programs transmitted from the operations center 202. New set top terminals may incorporate both digital and analog channels. Therefore, the cable headend 208 may combine analog signals with the digital signals prior to transmitting the program signals to the set top terminals 220.

After packaging the programs, the CAP creates a program control information signal to be delivered with the program package. The program control information signal contains a description of the contents of the program package, commands to be sent to the cable headend 208 and/or set top terminal 220, and other information relevant to the signal transmission.

In addition to packaging the program control information signal, the operations center 202 employs digital compression techniques to increase existing satellite transponder capacity by a 4:1 ratio, or more, resulting in at least a four-fold increase in program delivery capability. A number of digital compression algorithms currently exist which can achieve the resultant increase in capacity and improved signal quality desired for the system. The algorithms generally use one or more of three basic digital compression techniques: (1) within-frame (intraframe) compression, (2) frame-to-frame (interframe) compression, and (3) within carrier compression. For example, the MPEG 2 compression method may be used. After digital compression, the program signals are combined (multiplexed) and encoded. The combined program signal is subsequently transmitted to various uplink sites 204.

There may be a single uplink site 204 or multiple uplink sites (represented by 204', shown in phantom in FIG. 2) for each operation center 202. The uplink sites 204 may either be located in the same geographical place or may be located remotely from the operations center 202. Once the combined program signal is transmitted to the uplink sites 204, the signal may be multiplexed with other signals, modulated, upconverted and amplified for transmission over satellite. Multiple cable headends 208 may receive such transmissions.

In addition to multiple uplinks 204, the delivery system 200 may also contain multiple operations centers 202. One method for using multiple operations centers 202 is to designate one of the operations centers 202 as a master operations center and to designate the remaining operations centers 202 as slave operations centers. In this configuration, the master operations center coordinates various functions among the slave operations centers such as synchronization of simultaneous transmissions and distributes the operations workload efficiently.

5. Cable Headend

After the operations center 202 has compressed and encoded the program signals and transmitted the combined program signals to the satellite, the cable headend 208 receives and further processes the signals before they are relayed to each set top terminal 220. Each cable headend site is generally equipped with multiple satellite receiver dishes. Each dish is capable of handling multiple transponder signals from a single satellite and sometimes from multiple satellites.

As an intermediary between the set top terminals 220 and the operations center 202 (or other remote site), the cable headend 208 performs two primary functions. First, the cable headend 208 acts as a distribution center, or signal processor, by relaying the combined program signal to the set top terminal 220 in each subscriber's home. In addition, the cable headend 208 acts as a network controller 214 by receiving information from each set top terminal 220 and passing such information on to an information gathering site such as the operations center 202.

Figure 6A:
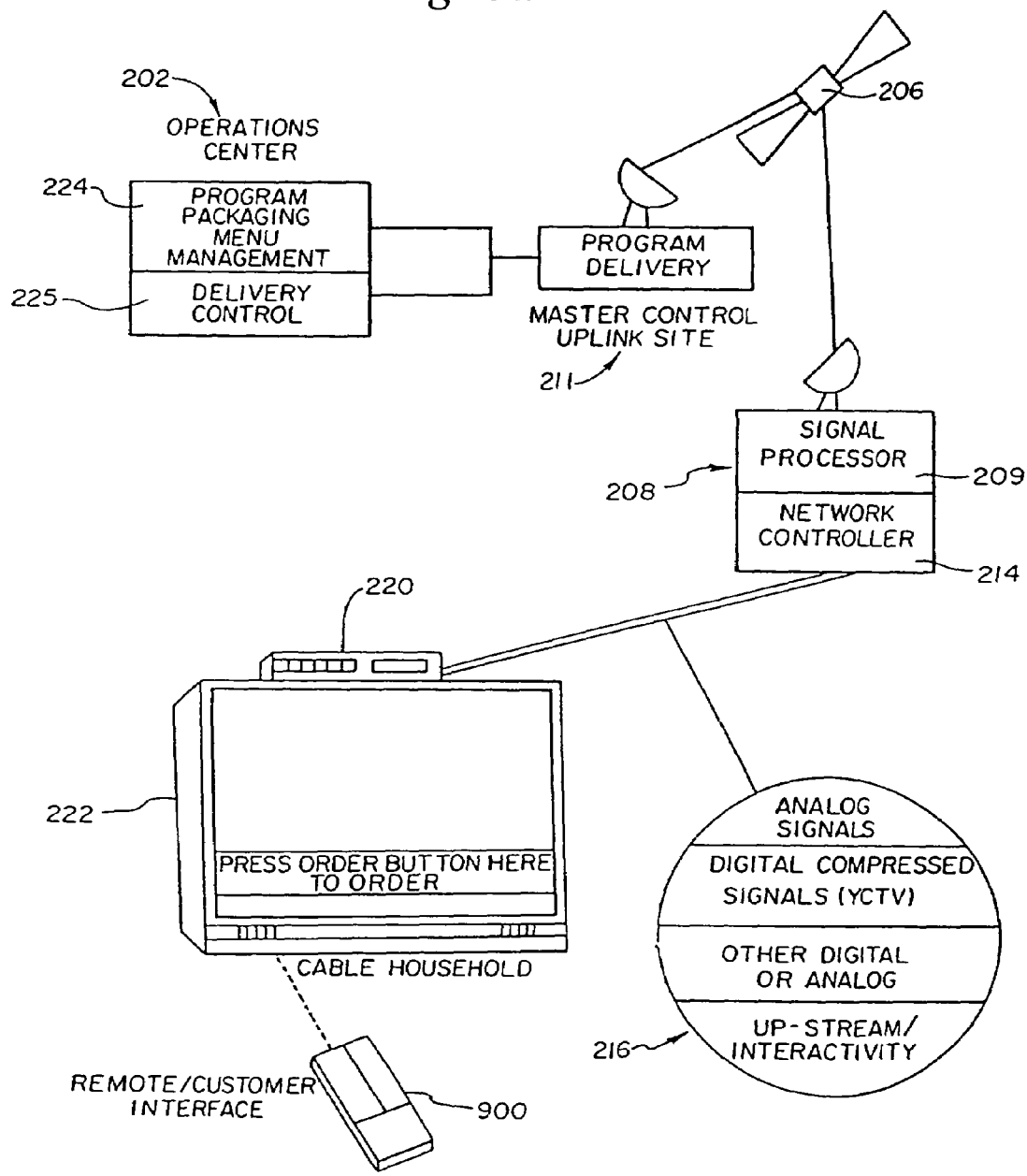

FIG. 6a shows an embodiment where the cable headend 208 and the subscriber's home are linked by certain communications media 216. In this particular embodiment, analog signals, digitally compressed signals, other digital signals and up-stream/interactivity signals are sent and received over the media 216. The cable headend 208 provides such signaling capabilities in its dual roles as a signal processor 209 and a network controller 214.

As a signal processor 209, the cable headend 208 prepares the program signals that are received by the cable headend 208 for transmission to each set top terminal 220. In an embodiment, the signal processor 209 re-routes or demultiplexes and recombines the signals and digital information received from the operations center 202 and allocates different portions of the signal to different frequency ranges. Cable headends 208 which offer different subscribers different program offerings may allocate the program signals from the operations center 202 in various manners to accommodate different subscribers. The signal processor 209 may also incorporate local programming and/or local advertisements into the program signal and forward the revised program signal to the set top terminals 220. To accommodate this local programming availability, the signal processor 209 must combine the local signal in digital or analog form with the operations center program signals. If the local cable system uses a compression standard that is different than the one used by the operations center 202, the signal processor 209 must also decompress and recompress incoming signals so they may be properly formatted for transmission to the set top terminals 220. This process becomes less important as standards develop (i.e., MPEG 2). In addition, the signal processor 209 performs any necessary signal decryption and/or encryption.

As a network controller 214, the cable headend 208 performs the system control functions for the system. The primary function of the network controller 214 is to manage the configuration of the set top terminals 220 and process signals received from the set top terminals 220. In an embodiment, the network controller 214 monitors, among other things, automatic poll-back responses from the set top terminals 220 remotely located at each subscribers home. The polling and automatic report-back cycle occurs frequently enough to allow the network controller 214 to maintain accurate account and billing information as well as monitor authorized channel access. In this embodiment, information to be sent to the network controller 214 may be stored in RAM within each set top terminal 220 and will be retrieved only upon polling by the network controller 214. Retrieval may, for example, occur on a daily, weekly or monthly basis. The network controller 214 allows the television program delivery system 200 to maintain complete information on all programs watched using a particular set top terminal 220.

In addition to the above, the network controller 214 allows the television program delivery system 200 to receive detailed information regarding operations at each set top terminal 220. This information includes click-stream data such as operation of channel select buttons, cursor buttons, volume adjust buttons, mute buttons, and other buttons on the remote control 900, for example.

The network controller 214 is also able to respond to the immediate needs of a set top terminal 220 by modifying the program control information signal received from the operations center 202. Therefore, the network controller 214 enables the television program delivery system 200 to adapt to the specific requirements of individual set top terminals 220 when the requirements cannot be provided to the operations center 202 in advance. In other words, the network controller 214 is able to perform "on the fly programming" changes. With this capability, the network controller 214 can handle sophisticated local programming needs such as, for example, interactive television services, split screen video, and selection of different foreign languages for the same video. In addition, the network controller 214 controls and monitors all compressors and decompressors in the system.

The television program delivery system 200 and digital compression provide a one-way path from the operations center 202 to the cable headend 208. Status and billing information may sent from the set top terminal 220 to the network controller 214 at the cable headend 208 and not directly to the operations center 202. Thus, program monitoring and selection control may take place only at the cable headend 208 by the local cable company and its decentralized network controllers 214 (i.e., decentralized relative to the operations center 202, which is central to the television program delivery system 200). The local cable company will in turn be in communication with the operations center 202 or a regional control center (not shown) that accumulates return data from the set top terminal 220 for statistical or billing purposes. In alternative system embodiments, the operations center 202 and the statistical and billing sites are collocated. Further, telephone lines with modems may be used to transfer information from the set top terminal 220 to the statistical and billing sites. Alternately, the set top terminal 220 may incorporate a cable modem, a wireless modem, connectors, LAN connectors, T1 and T3 connectors, Asymmetric Digital Subscriber Line (ADSL) Connectors, Integrated Digital Service Network (ISDN) connectors or other advanced communications interfaces for transmitting information upstream to the cable headend 208, the operations center 202, a separate statistical and billing site, an Internet 105 web site, and other remote locations.

In the above discussion, the cable headend 208 was used to provide programming to the set top terminals 220. However, the national broadcaster 110 could choose to send the programming 111 directly to the terminal 142 of FIG. 1 by satellite, for example. Optionally, the broadcast affiliate 112 could send the programming 115 directly to the terminal 140 or to the terminal 141.

Figure 6B:
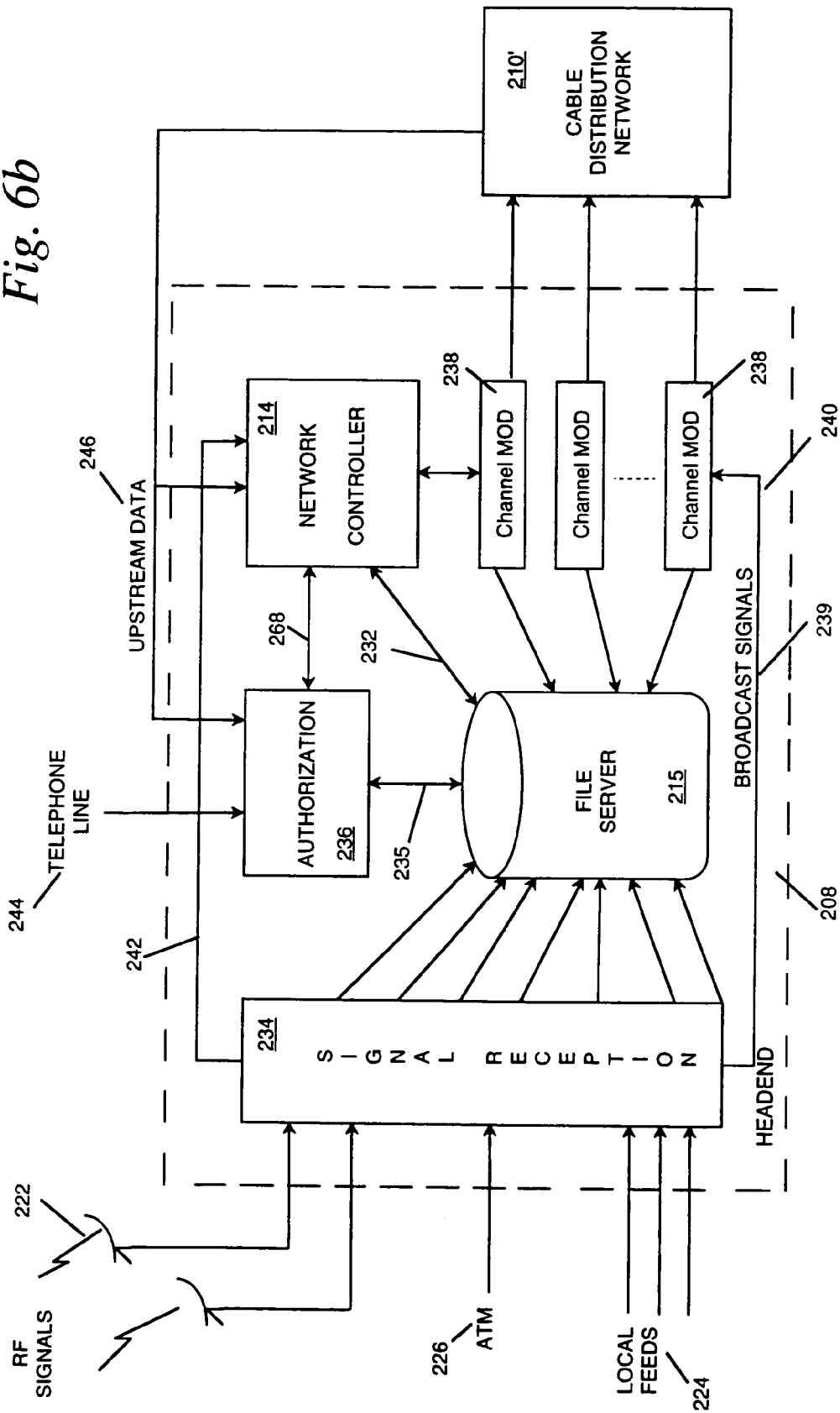

FIG. 6b shows the cable headend 208 having a file server 215 capable of storing digital compressed data. The cable headend components shown in FIG. 2 include the network controller 214, the file server 215, signal reception equipment 234, an authorization component 236, and a set of channel modulators 238. The network controller 214 performs many of its functions using its interface 232 with the file server and its interface 268 with the authorization component 236 (which, in turn, is connected to the file server 215 over a separate connection or interface 235). The network controller 214 and other cable headend components all work with one another to provide the capability to deliver programming in response to requests from subscribers. The signal reception equipment 234 receives RF signals 222 (which may include both analog or digital broadcast signals and digital programming and control information signals), ATM data 226, and local feeds 224. The signal reception equipment 234 may: (i) place various signals in storage in the file server 215 in digitally compressed format, (ii) send certain signals to the channel modulators 238 for distribution over the cable distribution network 210' and/or (iii) send other signals to the network controller 214 for processing.

In the embodiment shown in FIG. 6b, the signal reception equipment bypasses the file server 215, sending broadcast signals 239 over connection 240 directly to channel modulator 238 for distribution to subscribers. The signal reception equipment 234 also transfers certain program control information and data to the network controller 214 over a control link or connection 242. In this way, the network controller 214 can receive the program control information signal from the operations center 202 or some other remote source through the signal reception equipment 234.

The authorization component 236 can receive requests for programs from the set top terminals 220 either by telephone line 244 or upstream data transmissions 246 over the cable distribution network 210'. The authorization component 236 processes the subscriber requests, prompting the file server 215 to spool the program requested by the subscriber. Alternatively, the file server 215 may be instructed to transmit an authorization code to the subscriber to enable descrambling or reception of a specific program by the subscriber's set top terminal 220. The network controller 214 monitors all incoming requests to the authorization component 236 in order to maintain up-to-date information on programs watched and viewing habits. By monitoring and coordinating with the authorization component 236 and the file server 215, the network controller 214 oversees, and in some cases initiates, the selection, spooling and transmission of programs, menus and advertisements to the subscribers in the cable distribution network 210'. The network controller 214 may also receive upstream data 246 directly.

FIG. 6c shows a more detailed illustration of the cable headend 208 components with a file server 215 and network controller 214. As shown in the figure, the headend includes signal reception equipment 234, an authorization component 236, a file server 215, MPEG decoders 250, a buffer with frame repeat 252, channel modulators 238, and the network controller 214. The network controller 214 includes several components. These components include a receiver 254 or set of receivers 254 (including a demodulator 254', demultiplexer 254" and/or buffering circuitry 255), a work station 256, a program control information (PCI) signal processing capability 258, a network management central processing unit (CPU) 260, databases 262, control software 264 and an instruction memory 266 (which stores computer program instructions that may be executed by the network management CPU 260). These components are exemplary of the components that reside within the network controller 214; however, other components, such as additional storage (e.g., RAM, ROM, EPROM, and EEPROM), processors, work stations, receiver equipment, signal processing devices, and additional software may also be included in the network controller 214.

The network controller 214 uses such components in its coordination and management of cable headend 208 operations. For example, the network management CPU 260 is linked or connected to all other components in the network controller 214. The network management CPU 260 also includes connections or links, either directly or indirectly, with other cable headend 208 components.

As shown in FIG. 6c, the network management CPU 260 is linked to the authorization component 236 through a data and signal interface 268 (which may be the same or an interface separate from the interface 235 shown in FIG. 6c that connects the authorization component 236 with the file server 215). The network management CPU 260 also coordinates and manages file server 215 functions through a separate interface 232. These interfaces between the network management CPU 260, on the one hand, and the authorization component 236 and file server 215, on the other hand, may be direct or indirect through one or more interfaces. Such interfaces may be RS-232, RS422, or IEEE-488 compatible. The network management CPU 260 also monitors and, in some instances, instructs the channel modulators 238 in regard to program distribution and signal processing activities over a separate connection or interface 269.

Within the network controller 214, the network management CPU 260 includes a number of internal connections, links, or interfaces. Such links, connections or interfaces include direct or indirect full duplex data and signal paths, including a connection 270 to receiver 254, a connection 272 to work station 256, a connection 274 to the PCI signal processing equipment 258, a connection 276 with the data bases 262, a connection 278 with the instruction memory 266, a connection 280 with the control software 264, as well as other connections to additional internal components as described herein. The network management CPU 260 uses these links, connections, and interfaces to exchange data and program signals with other network controller components and devices. Using such components and devices, the network controller 214 performs its cable headend 208 operations.

The receiver 254 or set of receivers 254 is equipped to receive upstream data transmissions 246 from the subscriber. This receiver 254 or receivers 254 may simply be a telephone modem or more sophisticated control receiver equipment that is adapted to receive upstream data transmissions 246 directly from the cable distribution network 210, 210' (FIGS. 2 and 6b). The network management CPU 260 coordinates such reception by the receiver 254 or receivers 254.

The PCI signal processing equipment 258 is interfaced with the cable headend 208 signal reception equipment 234. The PCI signal processing equipment 258 enables the network controller 214 to receive the program control information signal from the operations center 202 or another remote site through an interface 242 with the signal reception equipment 234. The program control information signal is received by the network controller 214 and processed by the network management CPU 260 using the control software 264.

In some instances, the network management CPU 260 stores the data carried by the program control information signal. This data includes data on program packages and menu content and can be stored within the databases 262. The network controller 214 can modify the program control information signal and transmit the modified program control information signal to those set top terminals 220 in the cable distribution network 210' that require the use of such data in order to generate menus or perform other local processing capabilities.

The databases 262 include a variety of databases in which data from upstream transmissions 246 from the subscribers can be stored. The databases 262 may also store information and data on program packaging, menu content, advertisements and billing. No set number of databases 262 are required for the network controller 214 to perform its operations, and a single temporary database may be used. In an embodiment, however, the network controller 214 uses several databases 262 that are accessed 278 during network management operations.

The network management CPU 260 also acts with the instruction memory 266 as needed in order to run certain control and network management software 264. Such software may be stored in the instruction memory 266 or in one or more other storage locations within the network controller 214.

By maintaining links with the authorization component 236 and the file server 215, the network controller 214 is flexible enough to maintain up-to-date programs watched information. Such programs watched information can be based on upstream data transmissions 246 that are received over the cable distribution network 210, 210' or through a telephone line 244. The network controller's 214 connection 232 with the file server 215 allows the network controller 214 to coordinate and manage intelligent selection and spooling of programs, menus and advertisements stored in the file server 215. Alternatively, the software resident within the network controller 214 may reside within the file server 215 itself or certain functions may be split between the two cable headend components.

6. Remote Control Device

Figure 7:
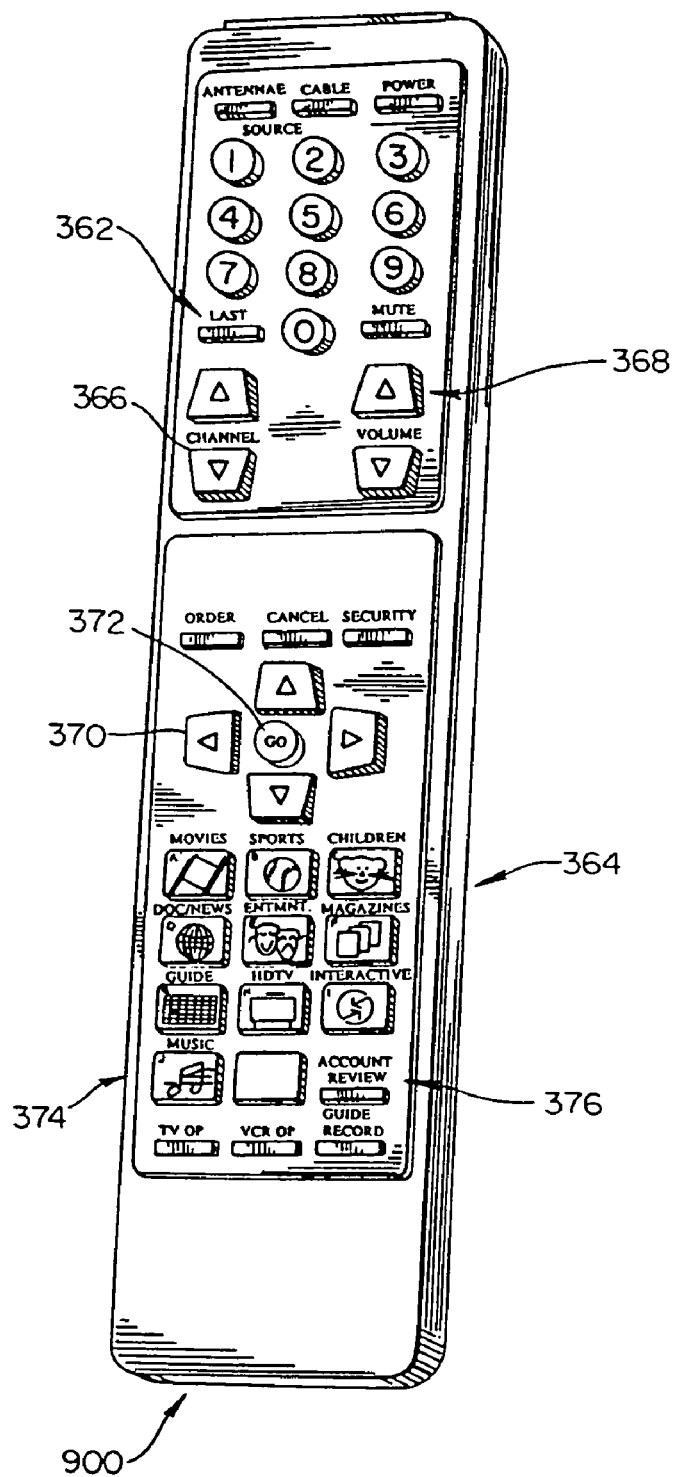
FIG. 7 shows a remote control for use in the broadcast environment of FIG. 1.

The primary conduit for communication between the subscriber and the set top terminal 220 is through the subscriber interface, such as the remote control 900 shown in FIG. 7. Through the remote control 900, the subscriber may select desired programming through the television program delivery system's menu-driven scheme or by directly accessing a specific channel by entering the actual channel number. Using the remote control 900, the subscriber can navigate through a series of informative program selection menus. By using menu-driven, iconic or alpha-character access, the subscriber can access desired programs by simply pressing a single button rather than recalling from memory and pressing the actual channel number to make a selection. The subscriber can access regular broadcast and basic cable television stations by using either the numeric keys on the remote control 900 (pressing the corresponding channel number), or one of the menu icon selection options.

In addition to enabling the subscriber to easily interact with the television program delivery system 200, the physical characteristics of the subscriber interface 900 also adds to the user friendliness of the system. The remote control 900 easily fits in the palm of the subscriber's hand. The buttons of the preferred remote control 900 may contain pictorial symbols that are easily identifiable by the subscriber. Also, buttons that perform similar functions may be color coordinated and consist of distinguishing textures to increase the user friendliness of the system.

The remote control 900 may communicate with the set top terminal through wireless means such as infra red signals and radio frequency signals. In addition, the remote control 900 may communicate with the set top terminal by wired connections, and by other wireless means including laser-based optical signals that scatter the laser light at its source, microwave signals and masers. Laser links could be accompanied by a bidirectional radio frequency link to do automatic feedback control of the laser's pointing direction, with the laser slaved very tightly to the middle of the transmission beam width of the command interface in the set top terminal 220.

In the configurations shown in FIGS. 4*a* and 4*b*, the remote control 900 may be used to operate the set top terminal 220, the televisions 170 and 171 and the VCR 175. The remote control 900 may also be used to operate the PC 172 of FIGS. 4*a* and 4*b*. If the remote control 900 is not used to operate the PC 172 of FIGS. 4*a* and 4*b*, the PC 172 may be operated by an attached keyboard (not shown) or some other suitable subscriber interface.

In addition to the remote control 900, the televisions 170, 171 and 177 of FIGS. 4*a* and 4*b*, the VCR 175 and the PC 172 may be operated by voice communications. For example, the PC 172 and the set top terminal 220 may be trained to recognize and respond to the voice of the subscriber.

B. Broadcast Program Ordering System

The selection of a program from the programming 115 or the programming 111 begins with the subscriber viewing a menu of program choices. FIG. 8 shows an example of an electronic program guide 300 that is related to the programming 115. The program guide 300 could also be used to provide menu choice for programming provided directly by the national broadcaster 110 (i.e., programming 111 shown in FIG. 1). As will be described later, the program guide 300 may also be incorporated into a menu-driven program access system provided by the cable headend 208 or the operations center 202 of FIG. 2. Alternately, the program guide 300 may be sent to the set top terminal 220 over a dedicated channel, may be incorporated into other program signals, and may be provided at a remote location such as the web site 106 on the Internet 105.

Referring to FIG. 8, the available programs are listed by title in a continuous time barker channel format. The program guide 300 lists the available programs in a matrix by time and channel. Thus, as shown in FIG. 8, eight channels are available. Channel 1 is a free channel carrying HDTV programming. Channels 2 through 6 are pay-per-view channels carrying other standard definition digital programming. Channels 7 and 8 are free channels and carry additional programming.

Each program in the program guide 300 could be identified by an event number that designates the time/date of broadcast, and by a program identifier, that uniquely identifies the program. The event data and the program identifier can be included in an authorization signal, or local authorization code, that is sent to the terminal 140. Alternately, the program identifier could be sent to the terminal 140, with an event number that allows the terminal 140 to access the selected program any time it was broadcast. In this arrangement, the terminal 140 may be manually tuned to the channel carrying the selected program.

The number of channels carrying standard definition digital programming can vary, depending on the total bandwidth allocated to the national broadcaster 110. In addition, if HDTV programming is not provided, for example during off-peak hours from midnight to 6 am., additional channels may be available for SDTV digital programs. The program guide 300 will change to accommodate the number of digital channels available.

The program guide 300 may be used to directly order desired programming. The desired program may be selected by using cursor keys on the remote control 900 to navigate the program guide 300 and to highlight programs listed in the program guide 300. When the desired program is highlighted, the go button of the remote control 300 may be operated to provide one-button ordering. That is, operation of the go button will send the order signal to the national broadcaster 110, for example.

The program guide 300 shown in FIG. 8 includes a list of programs, available start times, costs to order and ratings. Other information may be included in the program guide 300. For example, for hit movies, the program guide 300 may include a brief description of the movie, its year of release, and the names of its major stars.

Other program guide configurations are also available. The program guide 300 could be provided in a hard copy format. In this embodiment, the program guide 300 could include alpha-numeric information that a subscriber would use to order a particular program. For example, a movie could be identified by an event number, that is the time and date of broadcast, and the duration of the broadcast, and by a program identifier that is unique to the movie. The event number and the program identifier could be included in the hard copy of the program guide 300. Other method for identifying a program or a series of programs are described in U.S. Pat. No. 5,659,350 entitled OPERATIONS CENTER FOR A TELEVISION PROGRAM PACKAGING AND DELIVERY SYSTEM, which is hereby incorporated by reference. To order a program, the subscriber could enter the event number and the program identifier into the terminal 140, using the remote control 900, for example. By then pressing the go button on the remote control 900, the subscriber would be sending a program order. Alternately, the subscriber could call an order and authorization system and provide the event number and program identifier, or other descriptive information, over the telephone. The subscribers may also order a program by accessing an Internet web site, either from the set top terminal 220 or the PC 172 of FIG. 4*a*, for example. The order and authorization system would then issue an authorization signal. A corresponding local authorization code may be provided with the programming 115 or via the Internet web site.

The program guide 300 may include submenus and other features, which will be described later with respect to the menu-driven access system.

For real-time ordering and authorization, when the desired program is highlighted, the subscriber orders the program by operating a go, or select, button, on the remote control 900. Operation of the go button begins the process of program reception, program authorization and program payment. Specifically, operation of the go button sends the order signal to a remote location. In response, an authorization signal may be provided by the remote location that received the order signal, or another remote location. The authorization signal includes the code required to decrypt and display the selected program on the television 171 of FIG. 4*b*, for example.

Ordering and authorization may also be conducted in a non-real-time basis. For example, the local cable system 114 or the broadcast affiliate 112 may conduct periodic polling over the cable system or the plain old telephone system (POTS) to determine recent selections. Programs selected by the subscriber would then be registered with the local cable system 114 or the broadcast affiliate 112 and a bill would be prepared reflecting the cost to the subscriber for accessing these programs. Alternately, the set top terminal 220 or the television 171 may incorporate a smart card/cash card with a pre-paid limit, where a quantity of purchases are pre-authorized. In another alternative, the programs are paid for after the fact upon the cash card being returned to an authorization and billing facility or billing agent.

The program guide 300 may be used to display program suggestions for discrete programs and events. The program guide may also be used to display multiple part programs, such as a television mini-series and subscriptions services. Subscription services could include speciality channels and speciality programs. The speciality channels could include a first-run movie channel, for example. The speciality programs could include sporting events, for example. A subscription to the sporting events could be on a favorite team basis, a full season basis, or a partial season basis, for example.

The program guide 300 of FIG. 8 may be displayed for viewing by the subscriber in a variety of telecommunications media. For example, the program guide 300 may be provided as an electronic program guide (EPG) and carried on a television channel. The program guide 300 would then be displayed on the television 171. Alternately, the program guide 300 may be provided on a web site 106 of the Internet 105. In this alternative, the program guide 300 could be displayed on the personal computer 172 or the television 171 of FIG. 4*b*. Additional details of the electronic program guide for use with the broadcast environment of FIG. 1 are provided later.

The electronic program guide could also be provided as an individualized program guide that is tailored to a specific subscriber or group of subscribers. That is, the individualized program guide could present a menu of favorite programs, where the menu of favorite programs is developed based on information gathered about the specific subscriber. The information could include subscriber-entered data that is provided by the subscriber to a series of questions presented at the terminal 140, for example. The series of questions may be presented when the specific subscriber initially accesses the broadcast environment, periodically thereafter, and at other times when desired by the specific subscriber. Gathering programs watched data is described in detail in copending application Ser. No. 09/124,043 entitled METHOD AND APPARATUS FOR USING PROGRAMS WATCHED DATA, filed Jul. 19, 1998, which is hereby incorporated by reference.

The programs watched data may be gathered by, or transferred to a processor in a remote location, such as the cable headend 208 and the broadcast affiliate 112, for example. The programs watched data may also be gathered by the set top terminal 220 and then may be transferred to the processor in the remote location. The processor may also receive the demographic data, and the other subscriber specific data.

Individualized menus may be provided by the cable headend 208 or the national affiliate 112, with the menu data included in the programming 115, for example. Alternately, the menu data may be provided by out of band signaling.

When the electronic program guide is provided on the Internet web site, the Internet web site may recognize the subscriber, based on the subscriber's automatic number identification (ANI), user name, user identification, and Internet address (i.e., REMOTE_HOST, REMOTE_ADDR, and HTTP_NAME), for example. The subscriber may also be identified by a unique subscriber identifier that is provided to the subscriber upon subscribing to a broadcast television service. Other means for identifying a subscriber include special features such as browser cookies. A browser cookie is a mechanism that allows a web site server to store limited amounts of information on a browser. The information is typically information sent to a subscriber's terminal using a Set-cookie HTTP response field header. The Set-cookie field contains the cookie content as a name/value pair, and can also contain information explaining when the cookie will no longer be valid (expires), the Internet domain for which the cookie is valid (domain), and the path portion of the URL within this domain for which the cookie is valid. Browsers that understand cookies will store the data on the terminal's hard disk, for example, and will return these data to the web site server from which the cookie originated within a cookie request header field. Cookies are useful for storing state information (when the subscriber last visited the web site, which resources the subscriber last used, for example) on the browser, in such a way that the information is not lost when the subscriber leaves the web site or shuts down the browser.

A web site, such as the web site 106, may use cookies to customize program ordering for a subscriber. For example, the web site 106 may welcome a subscriber to the web site 106, based on the information in the cookie, and may navigate the subscriber to a preferred menu, or individualized program guide, based on previous program orders provided by the subscriber.

When the subscriber is identified, the web site 106 may create the individualized program guide, which the specific subscriber may download to the terminal 140 (i.e., down load to the PC 172, the televisions 171 and 177 and the set top terminal 220).

Alternately, the subscriber may log on to the Internet web site, using the PC 172 or the television 171' of FIGS. 4*a*–4*c*. The subscriber may then enter a subscriber identification. The Internet web site will then present the individualized menu to the subscriber, who may view the individualized menu on the television 171', for example. The individualized web site may be based on subscriber specific data, such as programs watched data, for example. The subscriber specific data may be stored in the set top terminal 220, for example, until a polling request message is sent to the set top terminal 220, for example.

In the situations described above, the specific subscriber may also view a generic program guide, such as the program guide 300, by use of the remote control 900 or the PC 172 to enter a command to switch program guides. The specific subscriber may also view the individualized program guide, and select programs therefrom, by switching from the generic program guide to the individualized program guide.

The preceding discussion is based on the assumption that a subscriber initiates a program order from the subscriber's own terminal 140. However, the invention is not limited to this configuration. Alternately, the broadcast program provider may provide the local authorization code to a terminal different from the terminal that initiated the program order. In this alternative, an address and identification number of the terminal to receive the program, or some other means for identifying the terminal, such as the name and address of the individual to receive the program, must be provided by the terminal initiating the program order. This alternative allows the subscriber to order a program from a location other than his home, such as at a kiosk in a video rental store. This alternative also allows the subscriber to provide access to a program, such as an annual subscription to a speciality channel or a sports program package, to another subscriber, for example as a gift.

Figure 9A:
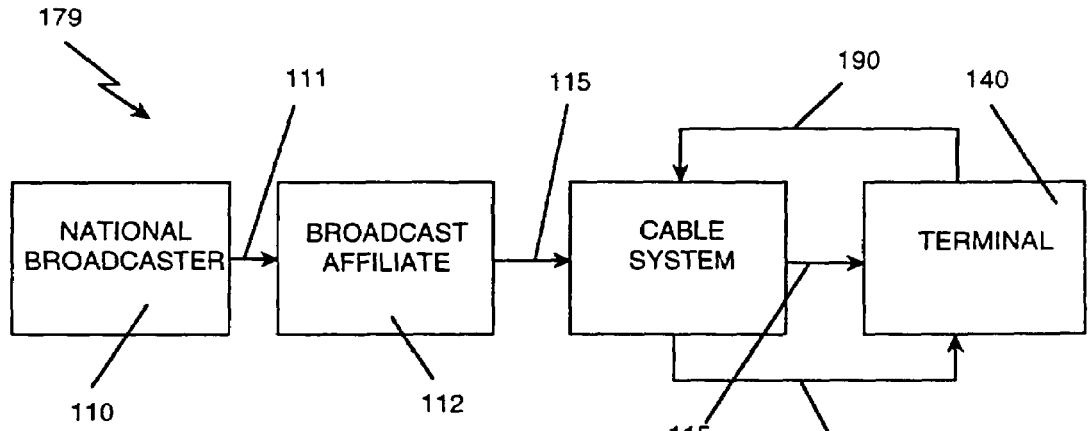
FIGS. 9a–9c are examples of order and authorizations systems for use in the broadcast environment of FIG. 1.
Figure 9B:
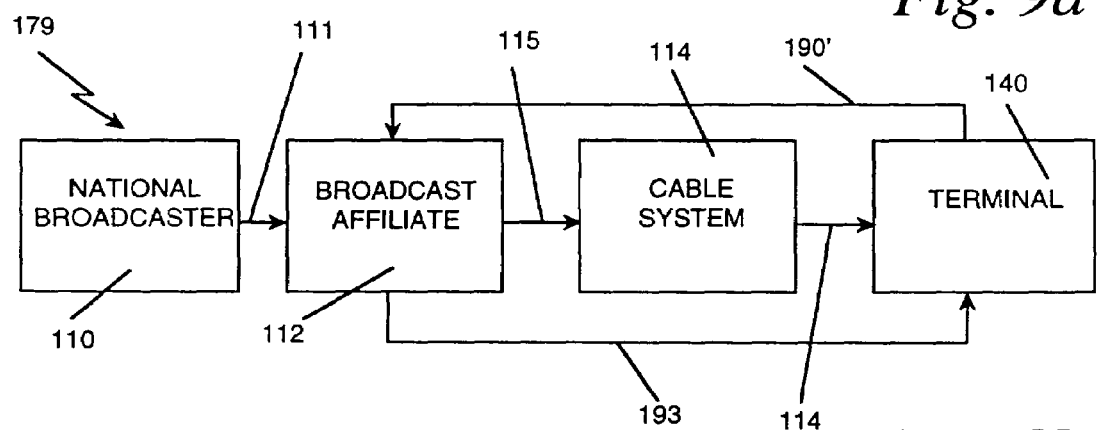
Figure 9C:
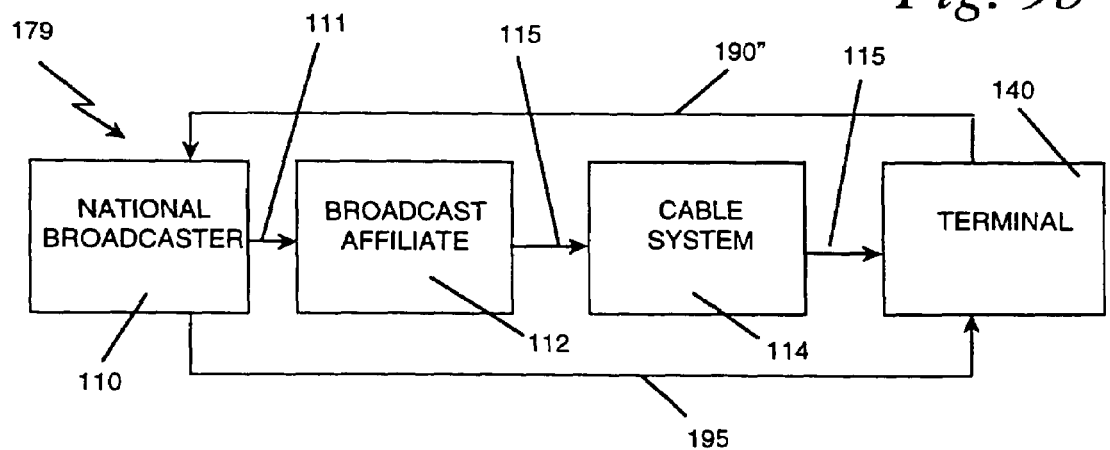

FIGS. 9a–9c show alternate arrangements of an order and authorization system 179 that can be used with the programming 111 or 115. In the discussion that follows, the subscriber receives the programming 115 from the local cable system 114. However, the order and authorization system 179 may also be used when the programming 115 is provided by the broadcast affiliate 112 or the satellite broadcast system 120, or any other entity capable of providing digital broadcast programs.

In FIGS. 9a–9c, program order signals and program authorization signals may be provided over a variety of telecommunications media including via a cable modem to the local cable system 114; over a proprietary two-way transmission system to the local cable system 114; over a fiber optic cable system to the local cable system 114, the broadcast affiliate 112 or the national broadcaster 110; via a telephone modem with any of the local cable system 114, the broadcast affiliate 112 and the national broadcaster 110, using existing telephone lines; via a cellular modem over wireless telecommunication systems; via T1 and T3 lines, Asymmetric Digital Subscriber Lines, Integrated Digital Services Network lines, and via a telephone and the plain old telephone system (POTS). Alternately, the broadcast programs and the order and authorization signals may also be provided over a LAN such as an ethernet. In addition either the order signals and the authorization signals may be provided over the satellite broadcast system 120. An alternate arrangement for one-way authorization control is to embed the authorization signal in the programming 115 or the programming 111.

In FIG. 9a, the national broadcaster 110 provides the programming 111 to the broadcast affiliate 112. The broadcast affiliate 112 sends the programming 115 to the local cable system 114. The local cable system 114 sends the programming 115 to the terminal 140. To decrypt and display a program from the programming at the terminal 140, the subscriber must initiate the order signal. In the embodiment shown in FIG. 9a, the subscriber sends an order signal 190 to the local cable system 114. Upon receipt of the order signal 190, the local cable system 114 sends an authorization signal 191 to the terminal 140. The authorization signal 191 includes a code that allows the terminal 140 to decrypt the program ordered with the order signal 190.

FIG. 9b shows an alternate arrangement of the order and authorization system 179. The order and authorization system 179 shown in FIG. 9b differs from that shown in FIG. 9a in that an order signal 190' is sent to the broadcast affiliate 112, and in return, an authorization signal 193 is returned to the terminal 140.

FIG. 9c shows yet another arrangement of the order and authorization system 179. In FIG. 9c, an order signal 190" is sent to the national broadcaster 110. The national broadcaster 110 then returns an authorization signal 195 to the terminal 140.

The arrangements of the order and authorization system 179 of FIGS. 9a–9c show the authorization signal being sent by the same entity (e.g., the broadcast affiliate in FIG. 9b) that received the order signal. The order and authorization system 179 is not limited to this configuration. For example, the order signal could be sent to the local cable system 114. The local cable system 114 could the relay the order signal to either the broadcast affiliate 112 or the national broadcaster 110. The broadcast affiliate 112 or the national broadcaster 110, respectively, could then send the authorization signal to the terminal 140. In yet another arrangement, the national broadcaster 110 or the broadcast affiliate 112 could relay the authorization signal to the local cable system 114. The local cable system 114 would then send the authorization signal to the terminal 140.

In another example, although FIG. 9a shows the order signal 190 being transmitted to the local cable system 114, the order signal 190 could also be transmitted to another remote location maintained by the local cable system 114, or maintained on behalf of the local cable system 114. For example, the order signal 190 could be transmitted to the web site 106 of the Internet 105. The local cable system 114 could maintain the web site 106. Alternately, the national broadcaster 110, the broadcast affiliate 112, or some other entity, such as an online television guide service, could maintain the web site 106.

In yet another alternative, a first terminal 140 could access the program guide 300 and transmit an order signal 190, but designate the ordered program for display on a second terminal 140. In this alternative, address and identification information for the second terminal 140 would be provided with the order signal 190.

In still another embodiment, the order and authorization system 179 may provide local authorization codes for two or more programs that air at the same time. In this alternative, the terminal 140 may display the programs in a split screen or picture-in-picture format, may cycle between the two or more programs, may delay display of a program until a later showing is provided, may save one or more programs in memory for later replay, may direct an attached VCR or other video recording device to record one program while another is displayed, may display a first program on a first television and a second program on a second television, or any combination of the above features. For example, a terminal 140 could be authorized to view a package of live football games airing simultaneously. The terminal 140 could then cycle between games, or record one game and display a second game, for example. In order to accommodate these features, the terminal 140 may be provided with two or more tuners and associated processing components such as decompressors, demultiplexers and decrypters.

Figure 10:
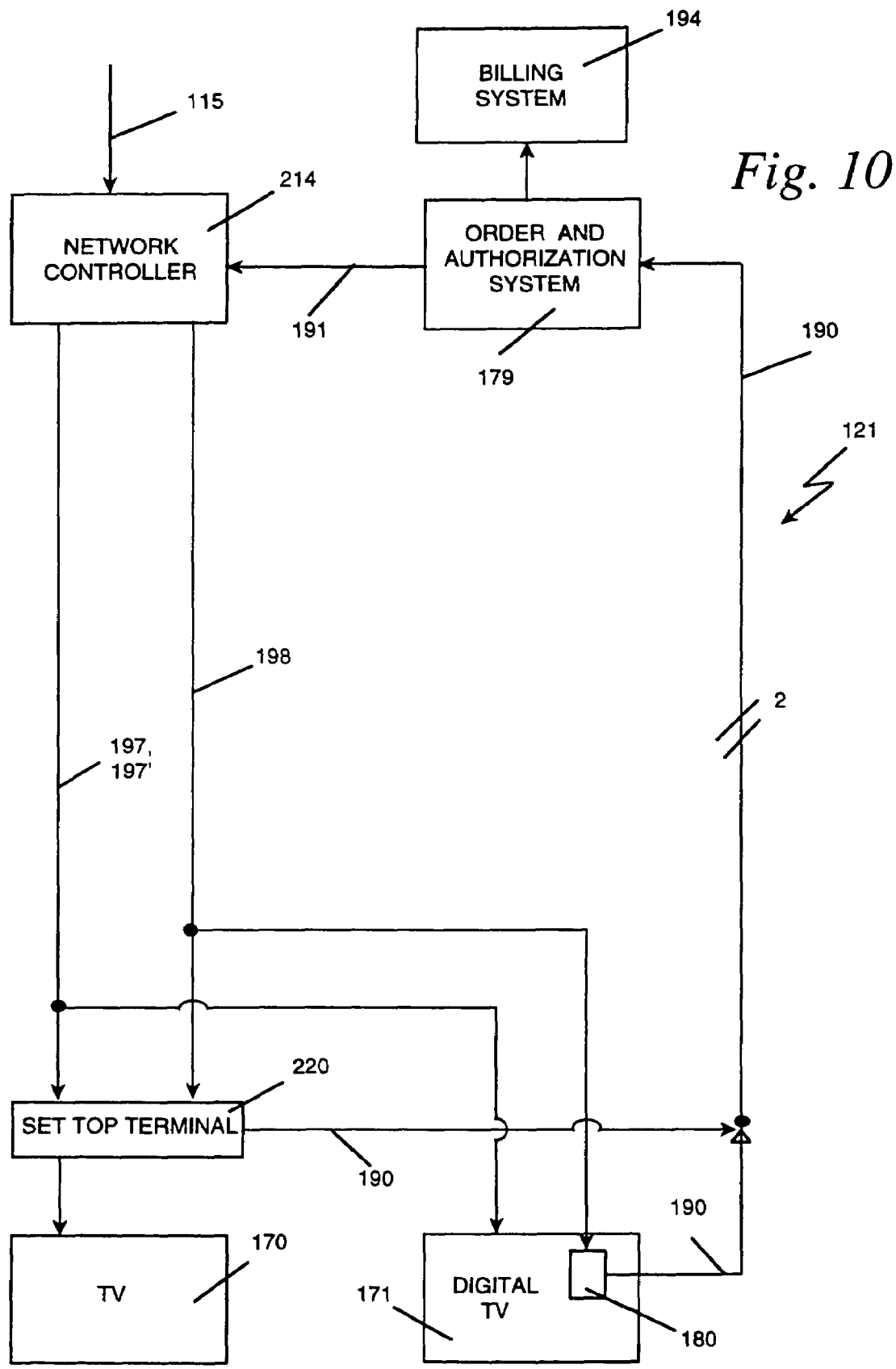
FIG. 10 is an diagram of a digital television broadcast environment.
Figure 11:
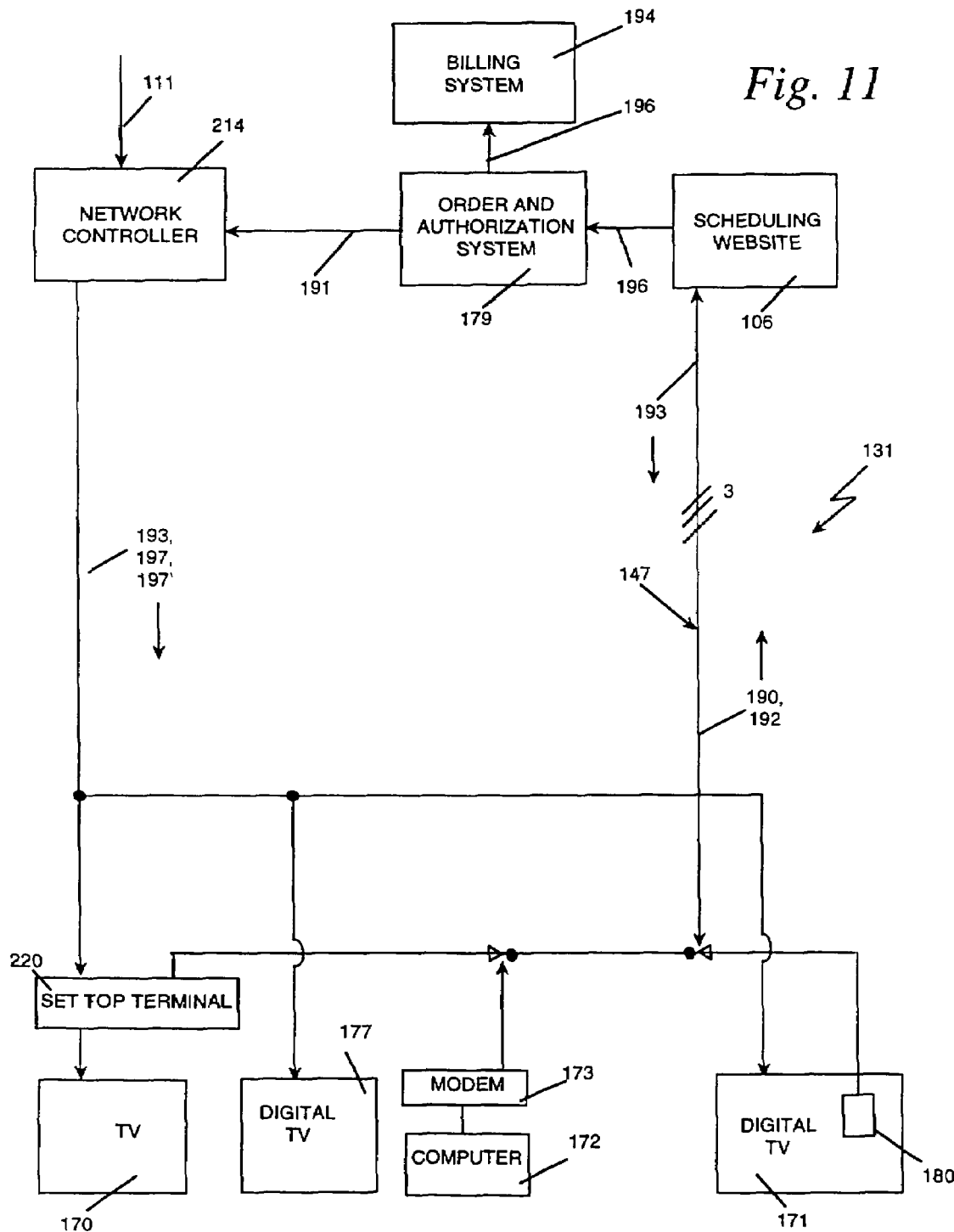
FIG. 11 is an diagram of an alternate digital television broadcast environment.
Figure 12:
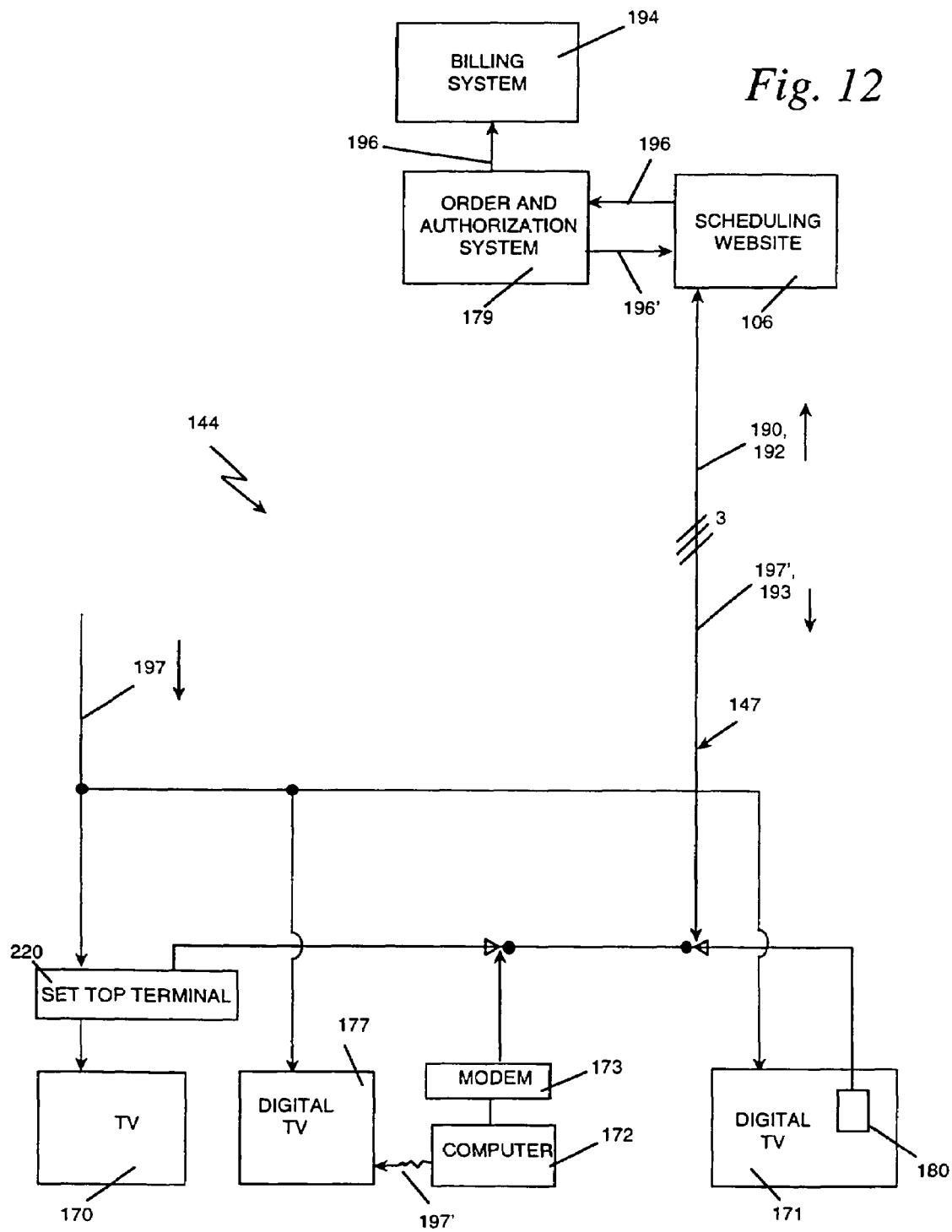
FIG. 12 is an diagram of yet another example of a digital television broadcast environment.

FIGS. 10, 11 and 12 show broadcast digital television environments that allow subscribers with different television reception capabilities to order and receive broadcast digital programming on a pay-per-view or subscription basis. Also shown in FIGS. 10–12 are terminals such as the terminal 140 of FIG. 1. The terminals may have different capabilities. For example, one terminal could include an analog television 170 and a digital set top terminal 220 while another terminal 140 may include the digital television 171 equipped with the smart card 171.

In the discussion that follows, the terminal 140 is used to refer generically to the different combinations of components. In FIGS. 10, 11 and 12, the programming is shown being supplied by a local cable system. However, as discussed above, the programming, and associated ordering, authorization and billing signals could also be provided by other telecommunications media including by satellite broadcast, over-the-air broadcast, wireless broadcast, fiber optic broadcast, T1 and T3 lines, ADSL and ISDN lines, and broadcast over POTS, individually and in combination.

FIG. 10 shows a broadcast digital television environment 121 in which the network controller 214 of a local cable system 114 provides digital broadcast programming to subscribers. The network controller 214, as the controller of the local cable system 114, receives the programming 115 from the broadcast affiliate 112, or directly from the national broadcaster 110. The network controller 214 provides programming 197, which may include a local authorization code 197', to subscribers of the local cable system 114. The programming 197 may be multiplexed and compressed. The local authorization code 197', which may also be multiplexed and compressed, is provided in response to an order placed by the subscriber, and is formatted such that it can be interpreted only by the terminal to which it is addressed. That is, the local authorization code 197' includes an address corresponding to the terminal that ordered the program. The address may be built into the circuitry of the terminal 140, or may be provided by the local cable system 114, for example.

The network controller 214 also supplies a program guide signal 198, which includes data related to available programs. The program guide signal 198 may also include instructions for formatting the data, such as a menu template. The program guide signal 198 is interpreted by the terminal 140 receiving it and is used to produce the program guide 300 shown in FIG. 8, for example. The program guide 300 may include additional submenus, such as notification submenus, escape submenus, and description submenus. The submenus are described in detail later.

Subscribers to the local cable system 114 may receive the programming 197 and the program guide signal 198 in components that have different reception capabilities. In FIG. 10, the set top terminal 220 receives the programming 197 and the program guide signal 198. The program guide signal 198 may be stored in a memory (not shown in FIG. 10) of the set top terminal 220. Alternately, the program guide signal 198 may be provided on a real-time basis. Upon receiving a command to display the program guide 300, the set top terminal 220 formats the program guide signal 198 into a readable format such as that shown in FIG. 8, and the television 170 displays the program guide 300. The set top terminal 220 may demultiplex, decompress, and decrypt the program guide signal 198. The television 170 may be a digital television or an analog television. If an analog television, the set top terminal 220 converts the digital data to a NTSC-compatible analog signal for display.

The set top terminal 220 receives program selections from the subscriber (e.g., by the subscriber operating the go button on the remote control 900). The set top terminal 220 then produces the order signal 190 to order the selected program. The order signal 190 may be provided over a cable television cable using a cable modem, a LAN, the POTS using a telephone modem, ADSL and ISDN, a fiber optic cable, and by wireless means using a wireless modem.

Also shown in FIG. 10 is a digital television 171 that incorporates a smart card 180. The smart card 180 receives the program guide signal 198, and produces the program guide 300 for display on the television 171. The television 171 receives the programming 197 with the local authorization code 197', as appropriate. The smart card 180 receives program selections from the subscriber (e.g., by the subscriber operating the go button on the remote control 900). The smart card 180 then produces the order signal 190 to order the selected program.

The order and authorization system 179, which may be located at the local cable system 114, a central billing location, or some other remote location including a web site on the Internet 105, receives the order signals 190 from the set top terminal 220 and the smart card 180. The order and authorization system 179 then prepares the authorization signal 191 and sends the authorization signal 191 to the network controller 214. On receipt of the authorization signal 191, the network controller 214 generates the local authorization code 197' that is addressed to the terminal from which the order signal originated, and multiplexes the local authorization code 197' into the programming 197.

The order and authorization system 179 also sends the authorization signal 191 to a billing system 194. The billing system 194, on receipt of the authorization signal 191, prepares a billing record that may be sent to the subscriber on a periodic basis. The billing record may also be used to debit a subscriber's account with the local cable system 114, to debit a subscriber's checking account, or to charge to a subscriber's credit card, for example. If the program guide 300 incorporates an escape submenu (to be described later), the billing record may not be generated by the billing system 194 until a set time after the start of the program. This feature allows the subscriber to cancel viewing of a program without incurring a fee, provided that a cancellation signal is received within the set time period, for example, five minutes. The subscriber can initiate the cancellation signal by accessing a hidden menu that incorporates this feature, for example. Alternately, the subscriber can cancel the order by manually tuning away from the channel displaying the selected program.

FIG. 11 shows a broadcast digital television environment 131 in which the network controller 214 of the local cable system 114 provides digital broadcast programming to subscribers. The network controller 214, as the controller of the local cable system 114, receives the programming 115 from the broadcast affiliate 112, or the programming 111 directly from the national broadcaster 110. The network controller 214 provides the programming 197, which may include the local authorization code 197', to subscribers of the local cable system 114. The local authorization code 197' is provided in response to an order placed by the subscriber, and is formatted such that it can be interpreted only by the terminal to which it is addressed. That is, the local authorization code 197' includes an address corresponding to the terminal that ordered the program. The address may be built into the circuitry of the terminal, or may be provided by the local cable system 114, for example.

The programming 197 may be received by subscribers having terminals with different reception capabilities. The set top terminal 220 receives the programming 197 and may provide programs for display on the television 170. The television 170 may be a digital or an analog television. If an analog television, the set top terminal 220 converts the digital programs provided by the programming 197 into NTSC-compatible analog signals.

The digital television 177 also receives the programming 197. The digital television 177 displays those programs for which the local authorization code 197' is provided.

The digital television 171 equipped with the smart card 180 also receives the programming 197. The digital television 171 displays those programs for which the local authorization code 197' is provided.

As described above, the reception of the programming 197 is the same between the environment 121 shown in FIG. 10 and the environment 131 shown in FIG. 11. However, the reception of the program guide data and program ordering differ. In the environment 131, the subscribers view the national broadcaster's program selections by accessing the web site 106 on the Internet 105. That is, the national broadcaster 110 may create the web site 106, and provide the web site 106 with the program guide 300. The subscribers make program selections directly from the web site 106.

Referring to FIG. 11, the set top terminal 220 is shown coupled to the web site 106 over the signal path 147. The signal path 147 may be a coaxial cable or a telephone line, for example. The set top terminal 220 may be coupled to the web site 106 by a cable modem, a telephone modem, T1 and T3 lines, Integrated Services Digital Network (ISDN) lines and Asymmetric Digital Subscriber Lines (ADSL), a wireless modem or a fiber optic connector, for example. The display of the television 170 may be used as the display for viewing the web site 106. The remote control 900 may be used for sending commands to the set top terminal 220, which are then relayed to the web site 106 for selecting and ordering programs from the program guide 300. The web site 106 may also incorporate features such as a soft key board to increase its functionality.

Those skilled in the art will recognize many ways to access the web site 106. For example, the television 170 may display a web browser page that includes a location field. The web address may then be entered into the location field, using the remote control 900 or the key pad 221, and the go button of the remote control 900 operated to complete the connection to the web site 106. Alternately, the national broadcaster 110 may provide an overlay or hidden menu (both of which will be described later) with a program that is currently being displayed on the television 170. The overlay menu or the hidden menu may contain a hypertext link to the web site 106. The remote control 900 may then be used to select the hypertext link and the go button operated to activate the hypertext link to the web site 106. The hypertext link may also be provided at other web sites on the Internet 105. The national broadcaster 110 may also provide a logo that overlays a broadcast program. In this case, the logo acts as a hypertext link. By selecting the logo, and operating the go button, the web site 106 may also be accessed.

In the above examples, the web site 106 may be displayed as a full screen display. Optionally, the web site 106 may be displayed in a separate window, or in a picture-in-picture format, so that the broadcast program continues to be displayed and seen on the television 170. The window containing the web site 106 display may be scaled or repositioned on the display of the television 170.

The web site 106 may include a single page listing the program choices in an electronic program guide, such as the program guide 300 shown in FIG. 8. Alternately, the web site 106 may include multiple pages that are accessed through hypertext links or by operation of "forward", "back" and "home" buttons that are part of the web site 106 display. The additional pages may contain additional program choices, when, for example, the number of choices exceed that which can be conveniently displayed on one page. The web site 106 may also include additional pages that provide program description information, program reviews, information regarding performers, and other related information.

The web site 106 may be used to directly order programs. For example, the order signal 190 may be generated by selecting a program from the program guide 300, and operating the go button of the remote control 900 to send the order signal 190 to the web site 106.

The smart card 180 is similarly connected to the web site 106. The smart card 180 may incorporate a cable modem, a telephone modem, a wireless modem or a fiber optic connector, for example.

The subscriber using the digital television 177 may use the personal computer 172, which is coupled to the modem 173, to access the web site 106 and to view the program guide 300 and order programs for display on the digital television 177. The computer 172 may communicate with the television 177 by wired or wireless means. In FIG. 12, the computer 172 is shown sending the local authorizations code 197' to the television 177 may be wireless. Wireless communication may be by infra red or radio frequency signaling, for example.

While the modem 173, the smart card 180, and the set top terminal 220 are all shown connecting to the web site 106 over the cable 147, the connection is not limited in this respect. The web site 106 may be accessed over a variety of different telecommunications systems such as the POTS, a coaxial cable, a fiber optic cable, T1 and T3 lines, Integrated Services Digital Network (ISDN) lines and Asymmetric Digital Subscriber Lines (ADSL) or by wireless means.

The set top terminal 220, the smart card 180 and the modem 173 are all used to send the order signal 190 to the scheduling web site 106 and to view programs listed in the program guide 300. The order signal 190 indicates which program from the program guide is desired for viewing, and includes an address of the terminal requesting the program. When the scheduling web site 106 receives the order signal 190, it sends an authorization request 196 to the order and authorization system 179. The authorization request 196 includes an identity of the desired program and the address of the terminal requesting the program.

The order and authorization system 179 prepares an authorization signal 191 that is transmitted to the network controller 214. The network controller 214 produces the local authorization code 197' and multiplexes the local authorization code 197' with the programming 197. The network controller 214 then broadcasts the programming 197 to the terminal connected to the local cable system 114. Only those terminals that receive an authorization code with a matching address are able to decrypt and display the programming.

The order and authorization system 179 also sends the authorization request 196 to the billing system 194. The billing system 194 generates a billing record, which may be used to bill the subscribers for programs watched.

The order and authorization system 179 may include an escape feature for pay-per-view events. For example, if a subscriber decides, after ordering a program, not to watch the program, the subscriber may send a cancel program signal 192 to the web site 106. Software incorporated in the web site 106 or the order and authorization system 179 may include a time out feature. The time out feature allows the subscriber to view an ordered program for a short time, five minutes, for example, before the authorization request 196 is sent to the billing system 194.

If the subscriber sends the cancel program signal 192, the web site 106 or the order and authorization system 179 may generate a deauthorization signal 193. The deauthorization signal 193 is then sent to the terminal 140 that originated the cancel program signal 192. The deauthorization signal 193 can be multiplexed into the programming 197, or may be sent over the cable 147.

FIG. 12 shows a digital television environment 144 in which a national broadcaster 110, a broadcast affiliate 112, or a local cable system 114 provides digital broadcast programming to subscribers, but program authorization is handled over the Internet 105. That is, the local authorization code 197' is provided from the web site 106 to the terminal 140. The local authorization code 197' is based on an address built into the set top terminal 220, for example.

The programming 197 may be received by subscribers having terminals with different reception capabilities. The set top terminal 220 receives the programming 197 and may provide programs for display on the television 170. The television 170 may be a digital or an analog television. If an analog television, the set top terminal 220 converts the digital programs provided by the programming 197 into NTSC-compatible analog signals.

The digital television 177 also receives the programming 197. The digital television 177 displays those programs for which the local authorization code 197' is provided.

The digital television 171 equipped with the smart card 180 also receives the programming 197. The digital television 171 displays those programs for which the local authorization code 197' is provided.

In the environment 144 shown in FIG. 12, the subscriber both orders the programming 197 and receives authorization to view the programming 197 by signals sent to, and received from the web site 106, respectively. The electronic program guide, such as the program guide 300 shown in FIG. 8, is also provided at the web site 106. That is, in the environment 144, the subscribers view the national broadcaster's program selections by accessing the web site 106 on the Internet 105. The national broadcaster 110, the national affiliate 112, or the local cable system 114 may create the web site 106, and provide the web site 106 with the program guide 300. The subscribers then make program selections directly from the web site 106.

Referring to FIG. 12, the set top terminal 220 is shown coupled to the web site 106. The set top terminal 220 may be coupled by a cable modem, a telephone modem, a wireless modem, T1 and T3 lines, Integrated Services Digital Network (ISDN) lines and Asymmetric Digital Subscriber Lines (ADSL), for example. The display of the television 170 may be used as the display for viewing the web site 106. The remote control 900 may be used for sending commands to the set top terminal 220, which are then relayed to the web site 106 for selecting and ordering programs from the program guide 300. The web site 106 may also incorporate features such as a soft key board to increase its functionality.

The smart card 180 is similarly connected to the web site 106. The smart card 180 may incorporate a cable modem, a telephone modem, a wireless modem or a fiber optic connector, for example.

The subscriber using the digital television 177 uses the personal computer 172, which is coupled to the modem 173 to access the web site 106 and to view the program guide 300 and to order programs for display on the digital television 177.

While the modem 173, the smart card 180, and the set top terminal 220 are all shown connecting to the web site 106 over the cable 147, the connection is not limited in this respect. The web site 106 may be accessed over a variety of different telecommunications systems such as the POTS, T1 and T3 lines, Integrated Services Digital Network (ISDN) lines and Asymmetric Digital Subscriber Lines (ADSL) a coaxial cable, a fiber optic cable, or by wireless means.

The set top terminal 220, the smart card 180 and the modem 173 are all used to send order signals 190 to the scheduling web site 106 to view programs listed in the program guide 300. The order signal 190 indicates which program from the program guide 300 is desired for viewing, and includes an address of the terminal requesting the program. When the scheduling web site 106 receives the order signal 190, it sends an authorization request 196 to the order and authorization system 179. The authorization request 196 includes an identity of the desired program and the address of the terminal requesting the program.

The order and authorization system 179 prepares an authorization confirmation signal 196' that is transmitted to the subscriber's terminal, such as the set top terminal 220. The national broadcaster 110, for example, broadcasts the programming 197 to the subscriber's terminals 140, such as the set top terminal 220. Only those subscriber's terminals 140 that receive the authorization confirmation signal 196' with a matching address are able to decrypt and display the programming.

The order and authorization system 179 also sends the authorization request 196 to the billing system 194. The billing system 194 generates a billing record, which is used to bill the subscribers for programs watched.

The cable 147 may also be used for other communications with the web site 106. For example, if a subscriber decides, after ordering a program, not to watch the program, the subscriber may send a cancel program signal 192 to the web site 106. Software incorporated in the web site 106 or the order and authorization system 179 may include a time out feature. The time out feature allows the subscriber to view an ordered program for a short time, five minutes, for example, before the authorization request 196 is sent to the billing system 194.

If the subscriber does not send the cancel program signal 192, the web site 106 or the order and authorization system 179 may generate a deauthorization signal 193. The deauthorization signal 193 is then sent via the cable 147 to the terminal 140 that originated the cancel program signal 192.

The cable 147 may also be used to complete the program billing process. The billing system may send a debit signal (not shown) over the cable 147 to the terminal 140. The received debit signal debits a cash card (not shown) contained in the terminal 140. The cash card could be part of the smart card 180. The cash card may be removable or fixed to the smart card 180. Increases in value of the smart card 180 may also be accommodated over the cable 147. For example, the order and authorization system 179 may send a credit signal (not shown) to the terminal 140, after the order and authorization system 179 receives a payment or electronic funds transfer from a subscriber.

The order and authorization system 179, or other remote location may send messages to terminals in the broadcast television environment 144. For example, the order and authorization system may send promotional messages to the terminal 140. The promotional messages may advertise upcoming programs or suggest purchase of special features such as a speciality sports program. The order and authorization system may send targeted advertisements to the terminal 140, where the targeted advertisements are selected based on a subscriber profile maintained in the local cable system 114, for example. Targeted advertising is described in detail in copending application Ser. No. 08/735,549, entitled NETWORK CONTROLLER FOR CABLE TELEVISION DELIVERY SYSTEMS and in Ser. No. 09/054, 419, entitled TARGETED ADVERTISEMENT USING TELEVISION DELIVERY SYSTEMS, the disclosures of which are hereby incorporated by reference.

The terminals 140 may use the broadcast environment 144 for other communications purposes. For example, the terminals 140 shown in FIG. 12 may send electronic mail to each other via the Internet 105, may access other web sites on the Internet 105 and may participate in multimedia conference calls, for example.

Figure 13:
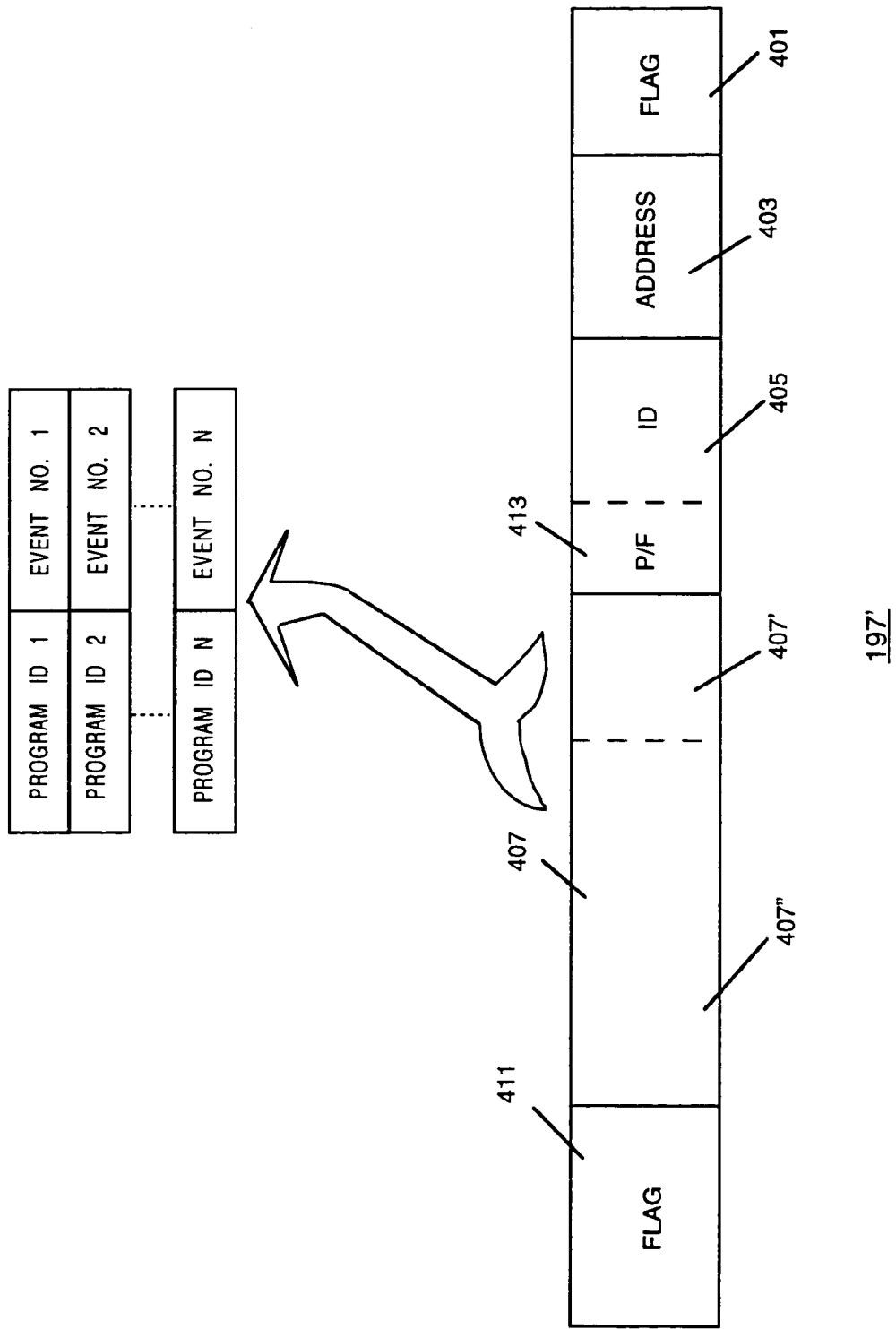
FIG. 13 is a diagram of an authorization signal for use with the broadcast environment of FIG. 1.

In an embodiment, program access information, in the form of the local authorization code 197' is provided to the terminal 140 from the national broadcaster 110, for example. FIG. 13 shows the details of the local authorization code 197'. The local authorization code 197'may be a frame format signal. The local authorization code 197' may include a leading flag 401 at the beginning of the signal, an address field 403, a terminal identifier 405, an information field 407 and a trailing flag 411 at the end of the signal.

The eight-bit flag 401 that appears at the beginning of the frame and the eight-bit flag 411 that appears at the end of the frame are used to establish and maintain synchronization. The eight-bit flag may be a "01111110" bit-stream. The address field 403 designates a 4-bit address for a given terminal 140. The address field 403 may also include one or more routing indicators (not shown). The routing indicators may be used in the case where a signal, such as the local authorization code 197' must pass through several nodes of a telecommunications network. The terminal identifier 405 is a 16-bit field that uniquely identifies each terminal 140 with a 15-bit designation followed by an appended P/F bit 413. Although field size is provided by this example, a variety of sizes can be used with the present invention.

The information field 407 is variable in length. The variable length feature allows the local authorization code 197' to include a number of program authorizations, as shown in FIG. 13. The information field 407 includes an eight-bit field 407' that contains an event number and a sixteen-bit field 407" that contains a program identification. The event number 407' may be formatted so that each time a particular program airs, the terminal 140 will be able to access the program. That is, the subscriber will only have to pay once to view the program for an indefinite number of showings in the future. The number of showings could be limited to those showing that occur in the current month, for example. The terminal 140 is able to access any program identified in the information field 407. Other methods for identifying programs are described in U.S. Pat. No. 5,659,350, entitled OPERATIONS CENTER FOR A TELEVISION PROGRAM PACKAGING AND DELIVERY SYSTEM, which is hereby incorporated by reference.

The P/F bit 413 may be used to command a polling response from the terminal 140 addressed, as described below. The P/F bit may be used to command the terminal 140 to provide a response back to the national broadcaster 110, for example. Such a response could command the terminal to report programs watched information, for example, that is stored in a memory of the terminal 140. The programs watched information could be used by the billing system 194 of FIGS. 10–12 to generate the billing record. The programs watched information could also be used for other purposes such as targeted advertising. Collection of such programs watched data is described in U.S. Pat. No. 5,600,364, entitled NETWORK CONTROLLER FOR CABLE TELEVISION DELIVERY SYSTEMS, and in copending application Ser. No. 09/124,043, entitled METHOD AND APPARATUS FOR GATHERING PROGRAMS WATCHED DATA, the disclosures of which is hereby incorporated by reference.

In an embodiment, the local authorization code 197'is received by the terminal 140 shown in FIG. 3 and may be stored in the memory 163. When a subscriber tunes the terminal 140 to a broadcast digital channel, the processor 161 will then compare the local authorization code 197' to the programming 197 to determine if the subscriber is authorized to view the selected program. If authorization is granted, the processor 161 then directs the decrypter 167 to decrypts the selected program and displays the decrypted program on the display 162 of the terminal 140.

In another embodiment, the processor 161 will instruct the tuner 166 to tune to the channel carrying the authorized program at some time prior to the start of the authorized program. For example, the tuner 166 may tune to the channel carrying the authorized program one minute prior to the start of the program. The processor 161 may be programmed by the subscriber to execute commands upon the occurrence of certain events. For example, the processor 161 may be programmed to instruct an attached recording device to record a program using a "tape program" command. If the subscriber has chosen "tape program," the processor 161 will begin recording the program on the attached VCR or other recording device at the start of the authorized program. If the display 162 of the terminal 140 is off, and the subscriber has chosen "turn on television," the processor 161 will turn on the display 162. If the subscriber has not chosen "turn on television," and the television is off, but the "tape program" command is pending, the processor 161 will instruct the VCR, or other recording device, to begin recording the program at the start of the selected program. The processor 161 may also be programmed to pause, or stop, recording, during commercial breaks, if any, in the programming 197. Recording of the program ends when the program is complete. The processor 161 may then return the tuner 166 to the channel previously selected, if a free channel, tune to the next authorized program, or tune to a menu channel that provides the program guide 300.

FIG. 14 is a diagram of the smart card 180 that may be incorporated into the terminal 140 of FIGS. 4a–4c. For example, the smart card 180 may be incorporated into the television 171 of FIG. 4b or the television 177 of FIG. 4c. A microprocessor 181 controls all the functions of the smart card 180. A communications interface 183 provides communications with external sources such as a personal computer or a digital camera (not shown) through a RS-232 cable and connector (not shown), for example. The communications interface 183 may also be used to connect to the national broadcaster 110, or wireless means such as infra red or radio frequency signaling, for example. For communications with the national broadcaster 110, the communications interface 183 may include one or more of a one-way cable modem, a two-way cable modem, a telephone modem, a wireless modem, an ethernet connector, or a fiber optic connector, for example. A memory 185 stores programming instructions for the microprocessor 181 and data provided by devices external to the smart card 180. The memory 185 may be a RAM, a SRAM, a SDRAM, an EEPROM or other suitable memory device. A connector 187 provides external communications with components of the set top terminal 220.

The programming instructions in the memory 185 may be updated by loading programming instructions from the local cable system 114, the broadcast affiliate 112, or the national broadcaster 110. The programming instructions may also be loaded from the web site 106. Thus, if the broadcast associate 112, for example, changes the way in which the programming 115 is provided, the broadcast associate 112 may send programming instructions along with the programming 115 to the terminals 140. The changed programming instructions may replace or modify programming instructions that are stored in the memory 185.

Also shown in FIG. 14 is a data storage device 189. The data storage device 189 may be removable, or may be affixed permanently to the smart card 180. The data storage device 189 may store program control information, program information, and subscriber specific data, for example. Program control information may be used to generate menu information for currently available programs. The program control information may also be used to control display of programs on the television 171. The program information may be a preview of an upcoming program, or may be the entire program or a portion of the entire program. For example, the first five minutes of all pay-per-view movies that are available in a given month may be stored in the data storage device 189. In this embodiment, once a program is selected, and authorized, the first part of the program is displayed, and the remaining portion of the program is supplied by the national broadcaster 110.

The smart card 180 may also include a cash card module (not shown). The cash card may be fixed or removable. The cash card may receive credits and debits from a remote locations such as the order and authorization system 179 and the billing system 194.

The data storage device 189 may also store entire programs. For example, the data storage device 189 may store one or more movies. In addition, the data storage device 189 may store advertisements, including advertisements targeted to the subscriber. Targeted advertising is described in detail in copending application Ser. No. 08/735,549, entitled NETWORK CONTROLLER FOR CABLE TELEVISION DELIVERY SYSTEMS and in Ser. No. 09/054,419, entitled TARGETED ADVERTISEMENT USING TELEVISION DELIVERY SYSTEMS the disclosures of which are hereby incorporated by reference.

The data storage device 189 may be programmed to record programs watched data and click stream data. The programs watched data may be used to target the advertisements and as part of a billing and account system. Data recorded on the data storage device 189 may be provided to a remote location such as the local cable company 114 in response to a polling request message. Alternately, the data storage device 189 may provide data to a remote source through another data transfer scheme such as carrier sense multiple access with collision detection/collision avoidance (CSMA/CD). Finally, the data storage device 189 may be taken to, or sent to the local cable company 114, for example, where its contents are read.

C. Menu System for Broadcast Program Ordering

A broadcast provider, such as the national broadcaster 110 may provide a menu of available programs, in the form of an electronic program guide (EPG). The program guide may be provided on a broadcast channel, and is displayed at the terminal 140 so that a subscriber can select a program for viewing. The program guide may also be provided at the web site 106 on the Internet 105. Finally, rather than an electronic program guide, the menu may be provided in a hard copy format, with program codes listed.

When the program guide is broadcast by the broadcast provider, the program guide may be displayed on a subscriber's television. This situation is shown in FIG. 10. In particular, the set top terminal 220 and the smart card 180 may receive the program guide. In this embodiment, the program guide may be provided as program data. One or more program guide templates may then be used in the set top terminal 220 and the smart card 180 to generate the program guide. Details for generating the program guide, or menu, using the program guide data and the template are provided later. Alternately, the program guide may be provided by the broadcast provider and displayed directly on the television 170 and the television 171.

When the program guide is provided on the web site 106, the program guide may be downloaded to the subscriber's computer, such as the personal computer 172, shown in FIG. 11. The program guide may also be downloaded to the set top terminal 220 and the smart card 180 shown, for example in FIG. 11, and may be displayed on the television 170 and the television 171, respectively.

An entire listing of available programs versus time of viewing may be too large to be easily displayed on a television display. The program guide 300, shown in FIG. 8, may therefore be scrolled using the cursor keys of the remote control 900, for example, to allow the display of future television programming. For example, the program guide 300 may be scrolled to display television programming scheduled for viewing eight hours or 24 hours in the future. If the number of available channels is also too large to be easily displayed, the channels may also be scrolled using the cursor keys of the remote control 900.

Figure 15A:
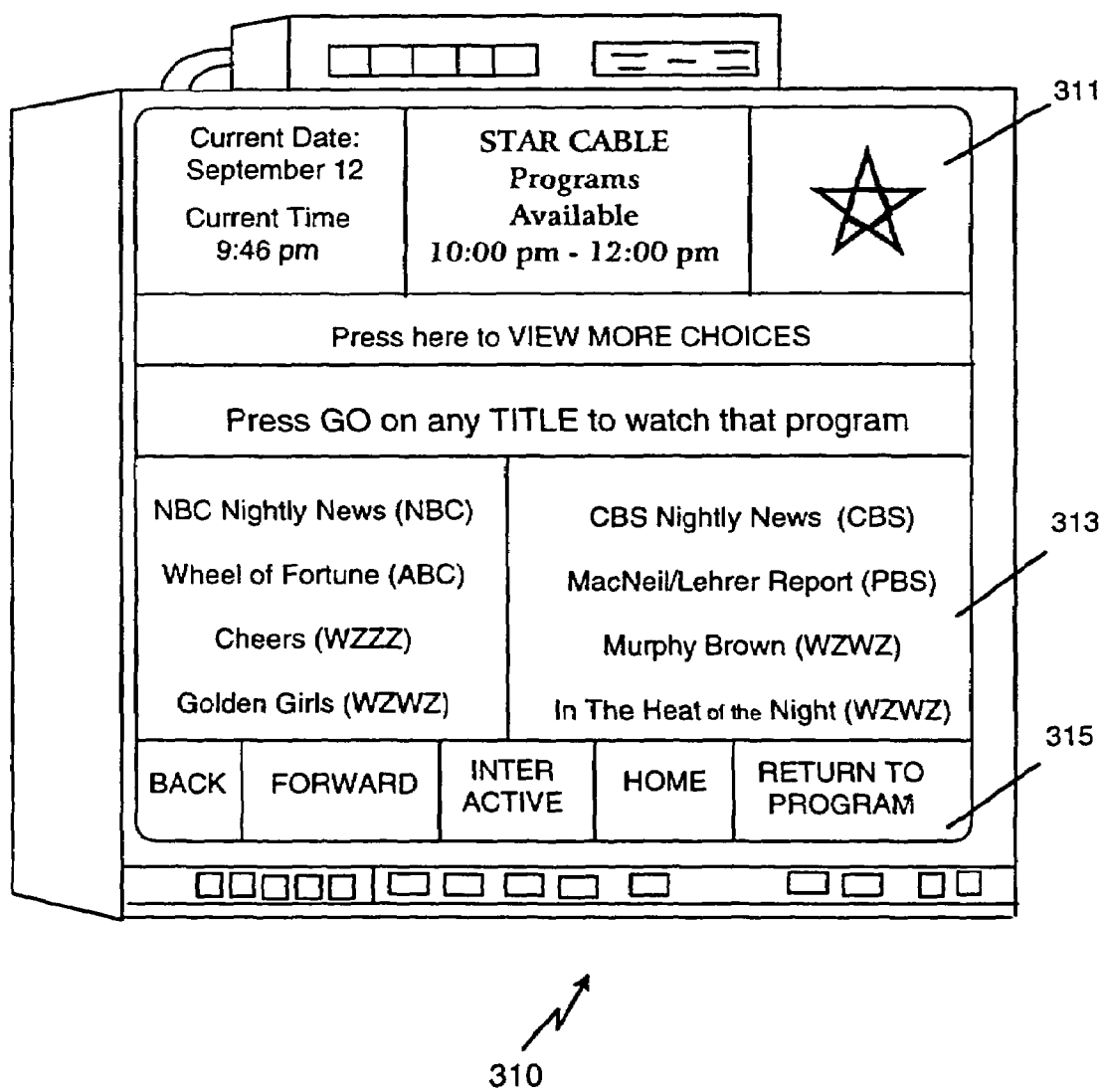
FIGS. 15a–d show examples of an electronic program guide for use in the broadcast program environment of FIG. 1.

FIGS. 15a–15d are alternate examples of electronic program guides that may be used with the broadcast environment of FIG. 1. FIG. 15a shows an alternate program guide 310 that lists available program choices. In FIG. 15a, an upper window 311 identifies the program provider, such as the national broadcaster 110. Additional information such as time and date information may also be provided in the upper window 311. Finally, a hypertext link or logo (shown in FIG. 15 a as a star), or hot button to a web site may be included in the upper window 311. The web site may contain additional information about the program provider, preview information regarding upcoming programs, special features such as a package of NFL games that a subscriber can purchase, promotional programs and other advertising. A central window 313 displays program choice information. For example, the central window 313 could display available programs by title. The control window 313 could also include additional information such as program rating, next available viewing time, and channel number, for example. A lower window 315 may contain access buttons that allow the subscriber to access other submenus or menus related to the program guide 310. For example, the lower window could include a "go back" button that returns the subscriber to the previous menu, a "forward" button that sends the subscriber to the next submenu in the sequence of menus, if available, a "return to program" button that returns the display to the last selected channel, and an interactive button that allows the subscriber to access interactive services including access to the Internet 105 and other online services, and Internet service providers.

Figure 15B:
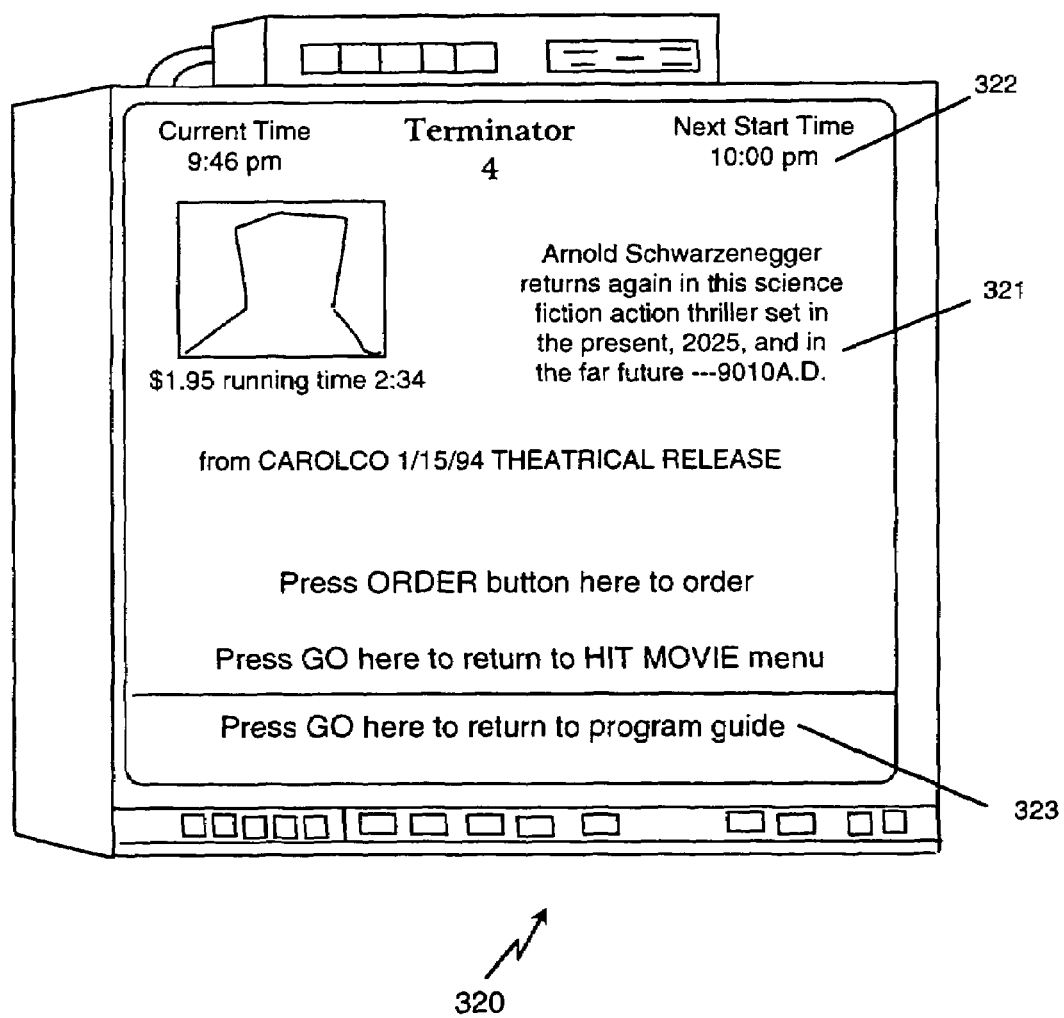

Alternately, operation of the go button may cause a submenu to be displayed. FIG. 15b shows an order submenu 320 that is displayed when the go button of the remote control 900 is operated. The order submenu 320 includes a program description window 321 that may provide a textual description of the selected program. The window 321 may also display a video clip or a still image related to the selected program. Additional windows, or banners may also be incorporated into the order submenu 320. A top window 322 may provide additional program information such as rating, start and stop times of broadcast, and current time and date information, for example. A bottom window 323 may incorporate soft keys and text that prompt the viewer to select one of order program or return to the program guide 310. The bottom window 323 may also include additional features, by way of soft keys, such as automatic "tune to program channel," "turn television on," and "record program button." Referring to FIG. 3, the "automatic tune" command causes the tuner 166 to be tuned to the appropriate broadcast channel prior to the start time of the program, for example, one minute prior to start. Alternately, the processor 161 may create a virtual channel prior to the program start, and cause the tuner to tune to the virtual channel just prior to the program start. If the television is off at the time of the program start, the command "turn television on" causes the processor 161 to turn the television on so that the selected program may be viewed. The command "record program", if selected, may cause the processor 161 to begin recording the program on a VCR or other suitable recording device, for example. The television need not be on for the record program order to be executed. In this case, the processor 161 either creates a virtual channel, or causes the tuner to tune to the appropriate broadcast channel just prior to the start of the program. The order submenu 320 may also incorporate a feature that allows viewing of a program at one of several start times, as selected by the viewer. For example, a movie broadcast on a channel may be shown every three hours throughout a day, and the viewer has the option of selecting a start time. Alternately, the viewer may select a program for viewing, and be authorized to view the program at any time of the day. In this alternative, the viewer may select the time that recording occurs.

Figure 15C:
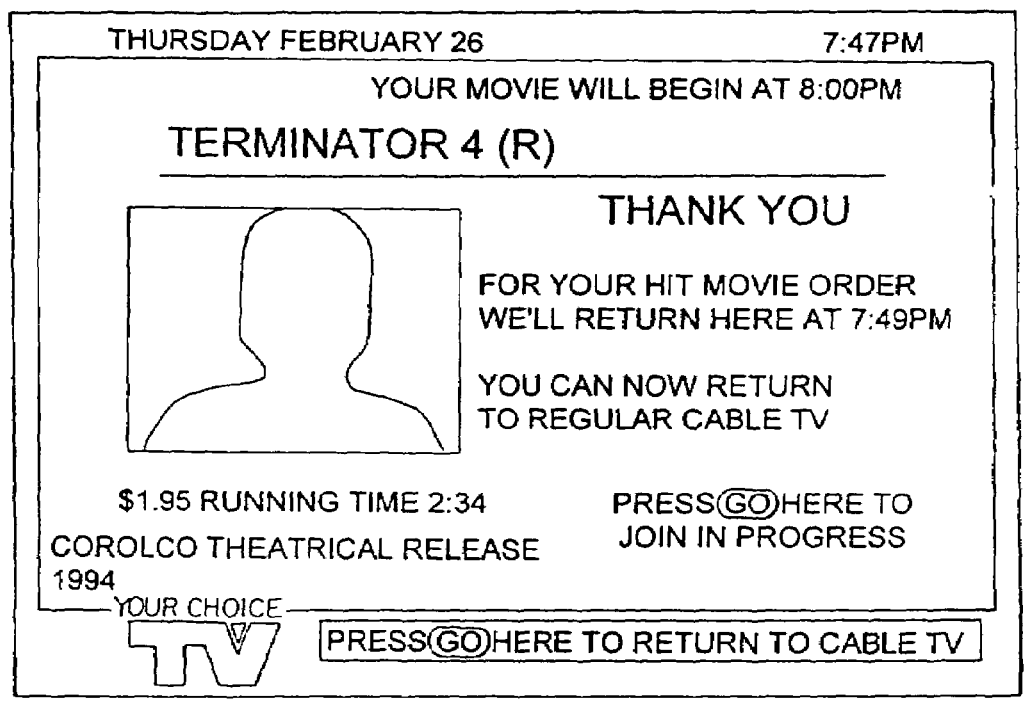

While the above features may be incorporated into a window of the order submenu, one or more of the features may also be incorporated into another submenu, such as a confirm order submenu 330 shown in FIG. 15c.

Figure 15D:
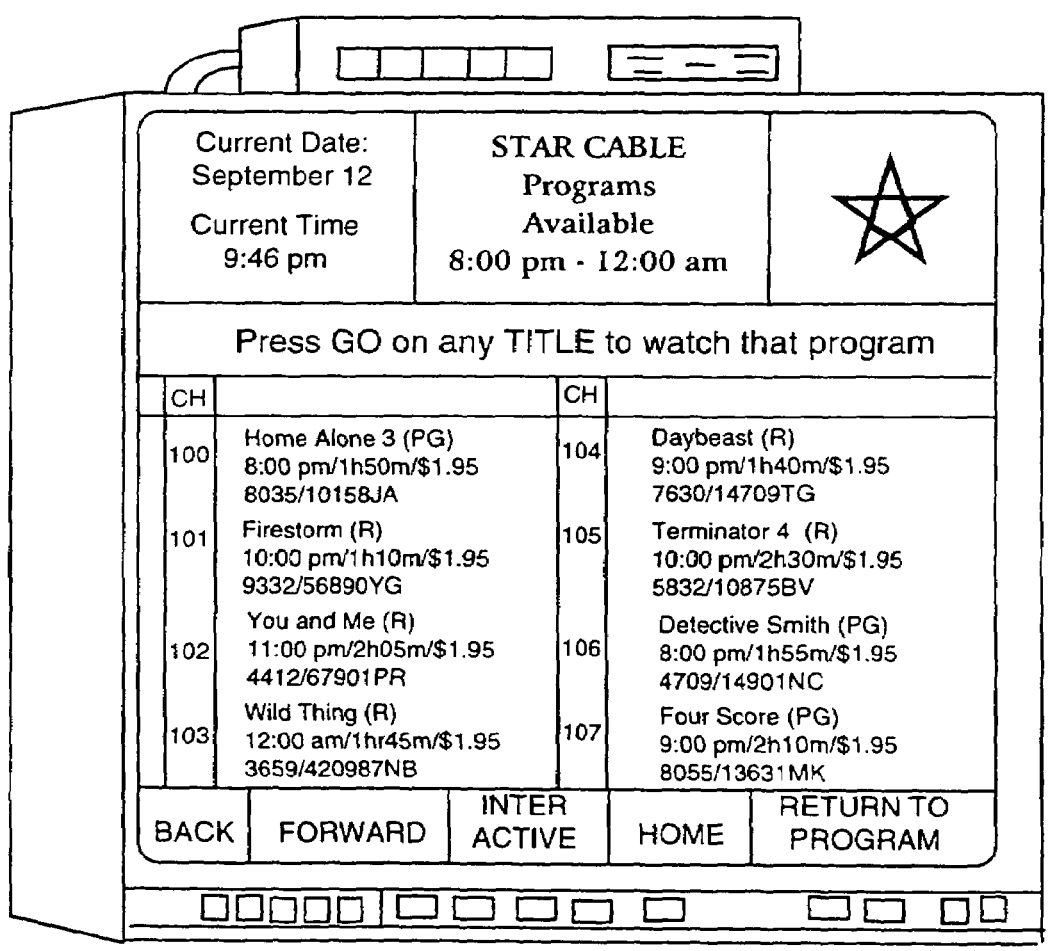

In another embodiment, the electronic program guide may be displayed as a channel lineup menu 340 as shown in FIG. 15d. In FIG. 15d, programs are listed in a column format with the associated broadcast channel indicated. This allows some subscribers to manually tune to a particular channel to receive a program.

The channel lineup menu 340 includes program titles and may include program ratings, times of broadcast start, length of program and cost, for example. A subscriber selects a desired program by scrolling through the program list using the scroll buttons on the remote control 900. When the scrolling stops, the program is highlighted on the menu. The subscriber may then order the selected program by operating the go button on the remote control 900. Referring to FIG. 10, for example, operation of the go button sends the order signal 190 to the order and authorization system 179. The order and authorization system 179 acts on the order signal 190, sending the local authorization code 197'. The terminal 140 that initiated the order signal 190 receives the local authorization code 197', which includes the address and identification of the terminal 140 that sent the order signal 190. The local authorization code 197' may be stored in the memory of the terminal 140, or may be used immediately to access the authorized program.

D. Operation of the Broadcast Program Ordering System

Figure 16:
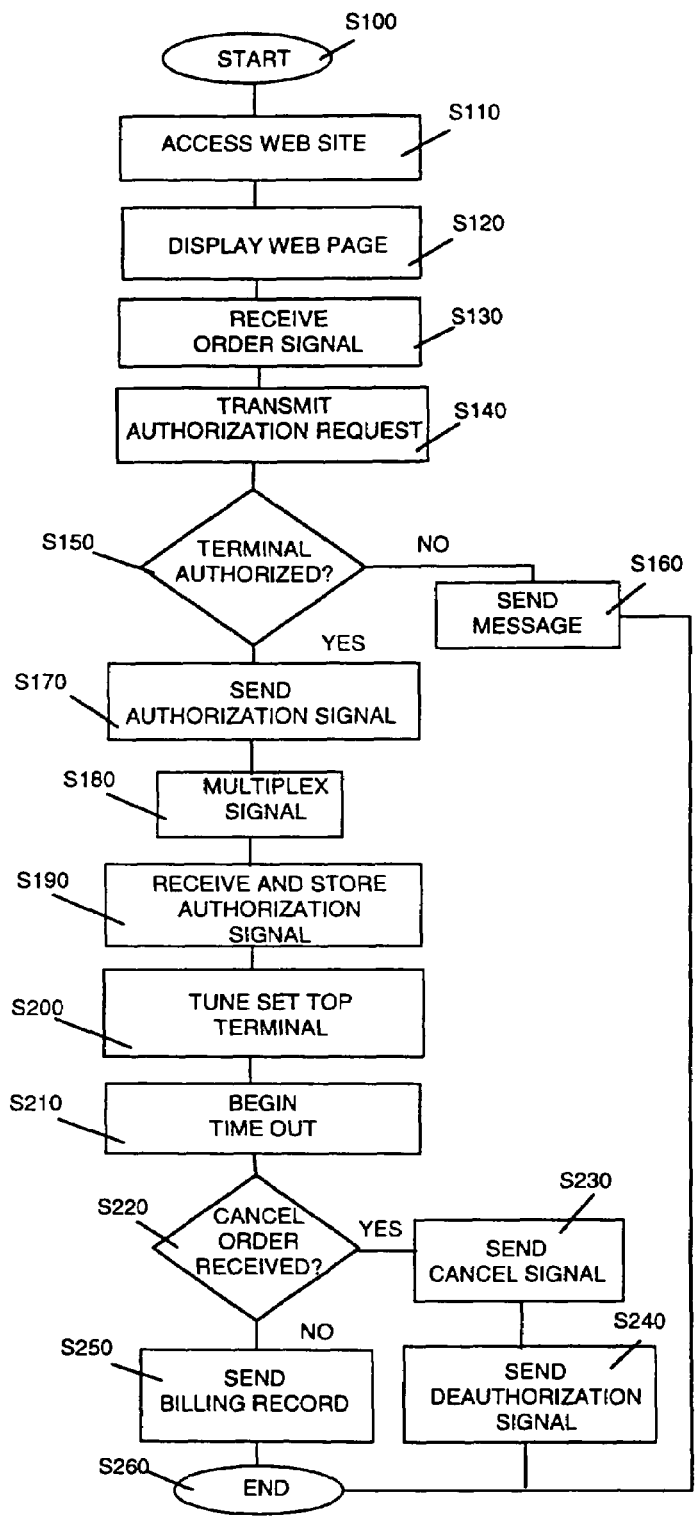
FIG. 16 is a flow chart showing the operation of the broadcast environment of FIG. 11.

FIG. 16 is a flow chart of the major steps associated with ordering and receiving a pay-per-view program, and the subsequent billing cycle. The flow chart assumes the broadcast environment 131 of FIG. 11.

The process begins with step S100. In step S110, the set top terminal 220 accesses the web site 106. The web site 106 may be accessed by entering the address of the web site 106 into a location window of a web browser, by activating a hypertext link provided during the broadcast of current programming, an by activating a hypertext link received from a different web site. The process then moves to step S120.

In step S120, a data signal showing the web site 106 home page is transmitted to the set top terminal 220, and the web site 106 home page is displayed on the display of the television 170. The process then moves to step S130. In step S130, the web site 106 receives the order signal 190 for a program selected by a subscriber. The order signal 190 includes a program identifier and the address and identification of the set top terminal 220. The process then moves to step S140.

In step S140, the web site 106 transmits the authorization request 196 to the ordering and authorization system 179. The process then moves to step S150. In step S150, the order and authorization system 179 determines if the set top terminal from which the order signal 190 originated is authorized to receive the selected program. The order and authorization system 179 may compare the rating of the selected program to a preset rating limit provided by the subscriber, for example. The order and authorization system 179 may determine if the subscriber's account is delinquent. If the set top terminal 220 is not authorized to receive the selected program, the process moves to step S160. Otherwise, the process moves to step S170.

In step S160, the order and authorization system 179 sends a message to the set top terminal 220 stating that the selected program cannot be accessed, along with the reason for no access. The process then moves to step S260 and ends.

In step S170, the order and authorization system 179 sends an authorization signal 191 to the network controller 214. The process then moves to step S180. In step S180, the network controller 214 multiplexes the local authorization code 197' with the programming 197. The process then moves to step S190. In step S190, the set top terminal 220 receives the local authorization code 197' and stores the local authorization code 197' in the memory of the set top terminal 220. The process then moves to step S200.

In step S200, the set top terminal 220 tunes to the channel carrying the program for which the authorization signal applies. The program is then displayed on the display of the television 170. The process then moves to step S210. In step S210, the order and authorization system 179 starts a time out, with the beginning of the time out corresponding to the start time of the displayed program. The process then moves to step S220. In step S220, the time out has ended, and the order and authorization system 179 determines if a cancel program order 192 has been received from the set top terminal 220. If the cancel program order 192 has been received, the process moves to step S230. Otherwise the process moves to step S250.

In step S230, the order and authorization system 179 sends a cancel program signal 191" to the network controller 214. The process then moves to step S240. In step S240, the network controller 214 sends a deauthorization signal 193 to the set top terminal 220, and the set top terminal 220 tunes away from the now deauthorized program. The process then moves to step S260 and ends.

In step S250, the time out has been completed without receipt of a cancel program order 192, the order and authorization system 179 send a billing record to the billing system 194. The process then moves to step S260 and ends.

E. Menu-Driven Program Selection

In a broadcast television environment, a menu-driven program selection scheme may provide the subscriber with one-step access to all major menus, ranging from hit movies to sport specials to specialty programs. From any of the major menus, the subscriber can in turn access submenus and minor menus by cursor or alpha-character access.

Different types of menus may be used in the broadcast television environment. These menus include Program Selection menus and During Program menus. The first series of menus, Program Selection menus, consists of an Introductory menu, a Home menu, Major menus, and Submenus. The second series of menus, During Program menus, consists of two primary types, Hidden menus and the Program Overlay menus.

Immediately after the subscriber turns on the set top terminal 220, or the television 170 of FIG. 10, for example, the Introductory menu welcomes the subscriber to the system. The Introductory menu may display important announcements from the local cable system 114 shown in FIG. 1, advertisements from the national broadcaster 110, or other types of messages. In addition, the Introductory menu can inform the subscriber if the cable headend 208 has sent a personal message to the subscriber's particular set top terminal 220.

After the Introductory menu has been displayed the subscriber may advance to the next level of menus, namely the Home menu. In an embodiment, after a certain period of time, the menu system will advance by default to the Home menu. From the Home menu, the subscriber is able to access all of the programming options. The subscriber may either select a program directly by entering the appropriate channel number from the remote control 900, or the subscriber may sequence through incremental levels of menu options starting from the Home menu. The Home menu lists categories that correspond to the first level of menus called Major menus.

If the subscriber chooses to sequence through subsequent menus, the subscriber will be forwarded to the Major menu that corresponds to the chosen category from the Home menu. The Major menus further refine a subscriber's search and help guide the subscriber to the selection of his choice.

From the Major menus, the subscriber may access several submenus. From each submenu, the subscriber may access other submenus until the subscriber finds a desired television program. Similar to the Major menu, each successive level of Submenus further refines the subscriber's search. The system also enables the subscriber to skip certain menus or submenus and directly access a specific menu or television program by entering the appropriate commands on the remote control 900.

The During program menus (including Hidden menus and Program Overlay menus) are displayed by the set top terminal 220 only after the subscriber has selected a television program. In order to avoid disturbing the subscriber, the set top terminal 220 does not display the Hidden menus until the subscriber selects the appropriate option to display a Hidden menu. The Hidden menus contain options that are relevant to the program selected by the subscriber. For example, a Hidden may contain options that enable a subscriber to enter an interactive mode or escape from the selected program.

Program Overlay menus are similar to Hidden menus because they occur during a program and are related to the program being viewed. However, the Program Overlay menus are displayed concurrently with the program selected by the subscriber. Most Program Overlay menus are small enough on the screen to allow the subscriber to continue viewing the selected program comfortably.

Figure 17:
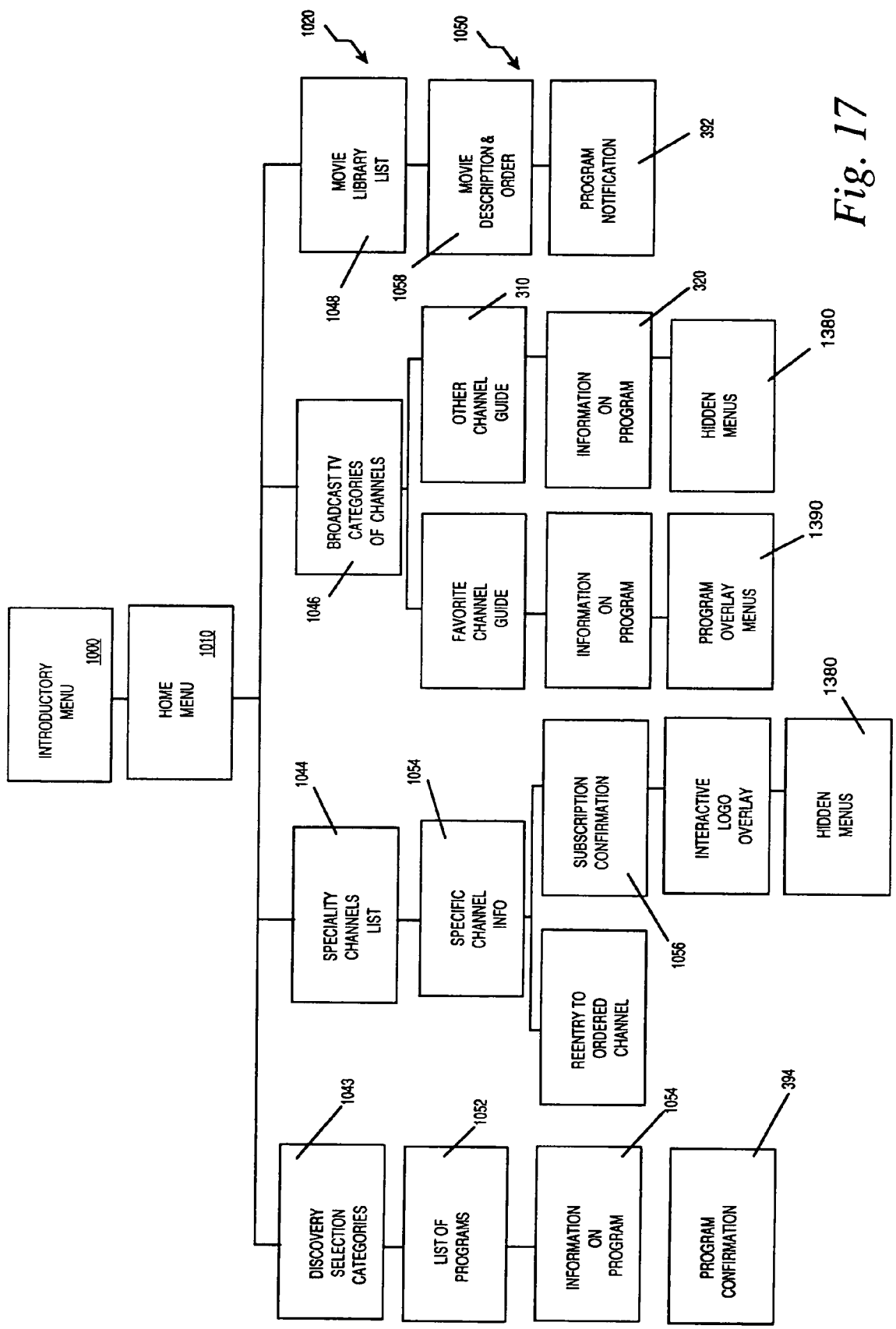
FIG. 17 shows a menu structure for use with the television program delivery system of FIG. 2.

As summarized above, images or programs may be selected for display by sequencing through a series of menus. FIG. 17 is an example of one possible structure for a series of menus. Generally, the sequence of menus is structured with an Introductory menu, a Home menu, various major menus and a multitude of submenus. The submenus can include promotional menus and During Program menus. For example, at the Home menu portion of the sequence of menus and corresponding software routines, a subscriber may select one of the Major menus and start a sequence of menu displays. Alternatively, a subscriber may go directly to a major menu by depressing a menu select button on remote control 900.

At any time during the menu sequence, the subscriber may depress a Major menu button to move into another series of menus. In this way, a subscriber may move from Major menu to Major menu.

Shown in FIG. 17 is a Major menu 1046 for the national broadcaster 110. The Major menu 1046, and the accompanying submenus, allow the national broadcaster's electronic program guide, such as the program guide 310 of FIG. 15*a*, to be incorporated into the menu driven program access system. Alternately, the national broadcaster's electronic program guides could be provided as a stand-alone product.

The various software subroutines executed by the set top terminal 220 allow a subscriber to sequence the menus, navigating through the various menus of the present invention. A subscriber may sequence back through menus or return to the Home menu with a single touch of the Home menu button on remote 900.

An Introductory menu screen 1000 automatically appears upon power-up and initialization of the set top terminal 220. From this Introductory menu screen 1000, the set top terminal software will normally advance the subscriber to the Home menu screen 1010. The Home menu 1010 is the basic menu that the subscriber will return to in order to make the first level of viewing decisions. When the set top terminal software is displaying the Home menu 1010, the subscriber is able to access any television programming option. The software allows programming options to be entered through cursor movement on the screen and directly by button selection on the remote control 900.

In the normal progression through the menu screens, the software will forward the subscriber to a Major menu screen 1020 in response to the subscriber's remote control 900 selection or highlighted cursor selection from the Home menu screen 1010. The selections displayed on the Home menu 1010 are for large categories of programming options.

Following the Major menu 1020, the subscriber may navigate through one or more submenu screens 1050 from which the subscriber may choose one particular program for viewing. For most programming selections, the subscriber will proceed from the Home menu 1010 to a Major menu 1020 and then to one or more submenus 1050. However, for certain programming options or functions of the set top terminal 220, the subscriber may skip one or more menus in the sequence.

The During Program menus are submenus enabled by the set top terminal software only after the subscriber has selected a television program. These menus provide the subscriber with additional functionality and/or additional information while viewing a selected program. The During Program menus sequence can be further subdivided into at least two types of menus, Hidden menus 1380 and Program Overlay menus 1390.

To avoid disturbing a subscriber during viewing of a program, the Hidden menus 1380 are not shown to the subscriber but instead "reside" at the set top terminal 220.

The set top terminal 220 awaits a button entry either from the remote control 900 or the set top terminal 220 buttons before executing or displaying any Hidden menu 1380 options. The set top terminal software provides the subscriber with additional functions such as entering an interactive mode or escaping from a selected program through use of Hidden menus 1380.

Program Overlay menus 1390 are similar to Hidden menus 1380. However, the Program Overlay menus 1390 are overlayed onto portions of the displayed video and not hidden. The software for the Program Overlay menus 1390 allows the subscriber to continue to watch the selected television program with audio but places graphical information on a portion of the television screen. Most Program Overlay menus 1390 are graphically generated to cover small portions of video. Some Program Overlay menus 1390, which are by their nature more important than the program being viewed will overlay onto greater portions of the video. Examples of types of Program Overlay menus 1390 include Notification menus 1392 and Confirmation menus 1394. In an embodiment, the software for the Program Overlay menus 1390 controls the reduction or scales down the (entire) programs video and redirects the video to a portion of the screen.

Submenus may provide the cost of viewing the program and the program's length in hours and minutes. From the submenus, the subscriber is given at least three options: (1) to purchase a program, (2) to return to the previous menu, and (3) to press "go" and return to regular TV. The subscriber may also be given other options such as previewing the program.

Using an on-screen menu approach to program selection, there is nearly an unlimited number of menus that can be shown to the subscriber. The memory capability of the set top terminal 220 and the quantity of information that is sent using the program control information signal are the only limits on the number of menus and amount of information that can be displayed to the subscriber. The approach of using a series of menus in a simple tree sequence is both easy for the subscriber to use and simply implemented by the set top terminal 220 and remote control device 900 with cursor movement. A user interface software programmer will find many obvious variations from the preferred embodiment described.

Figure 18A:
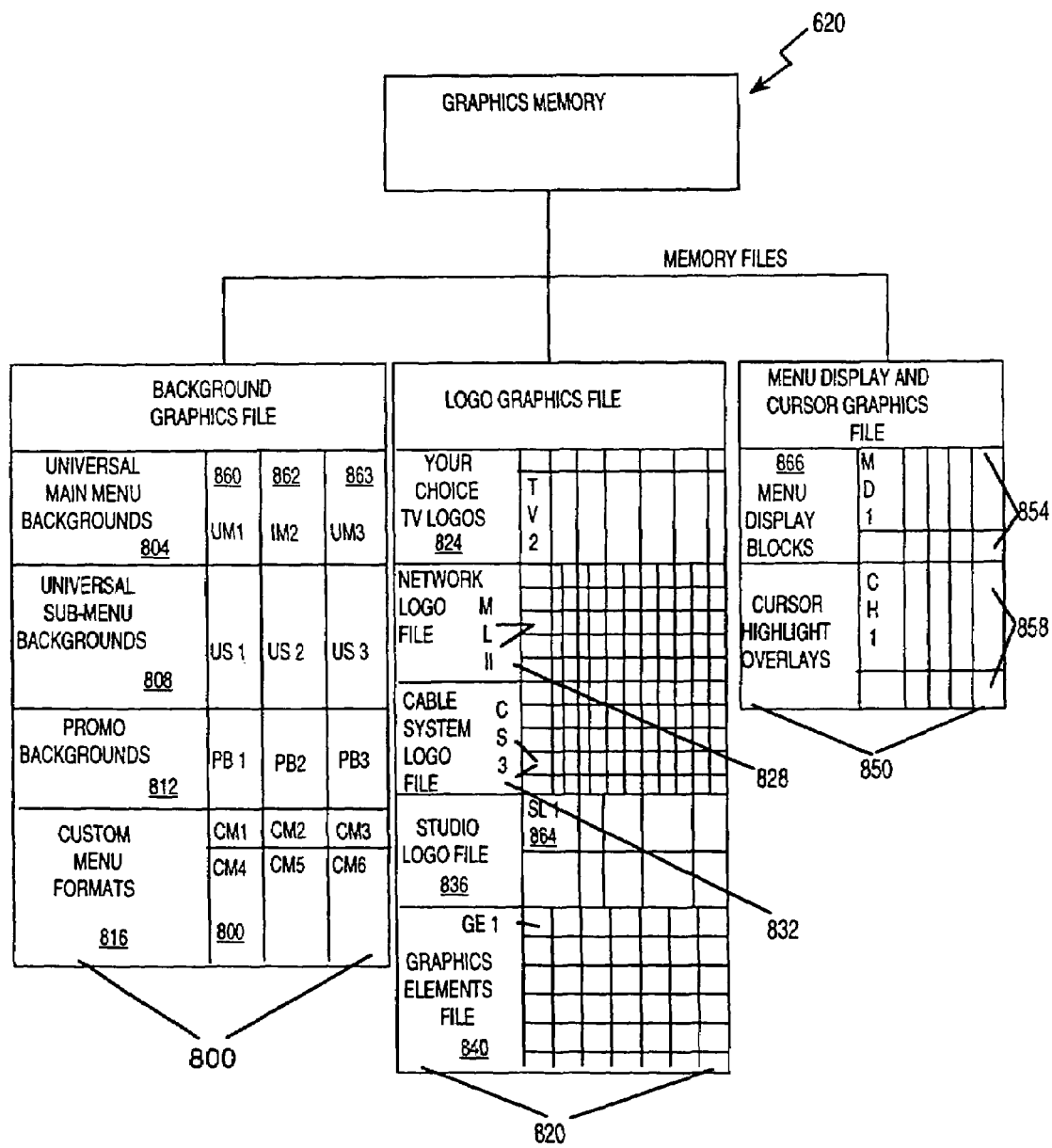
FIG. 18a is a drawing of storage for on-screen menu templates and other graphics files stored in graphics memory of the set top terminal.
Figure 18B:
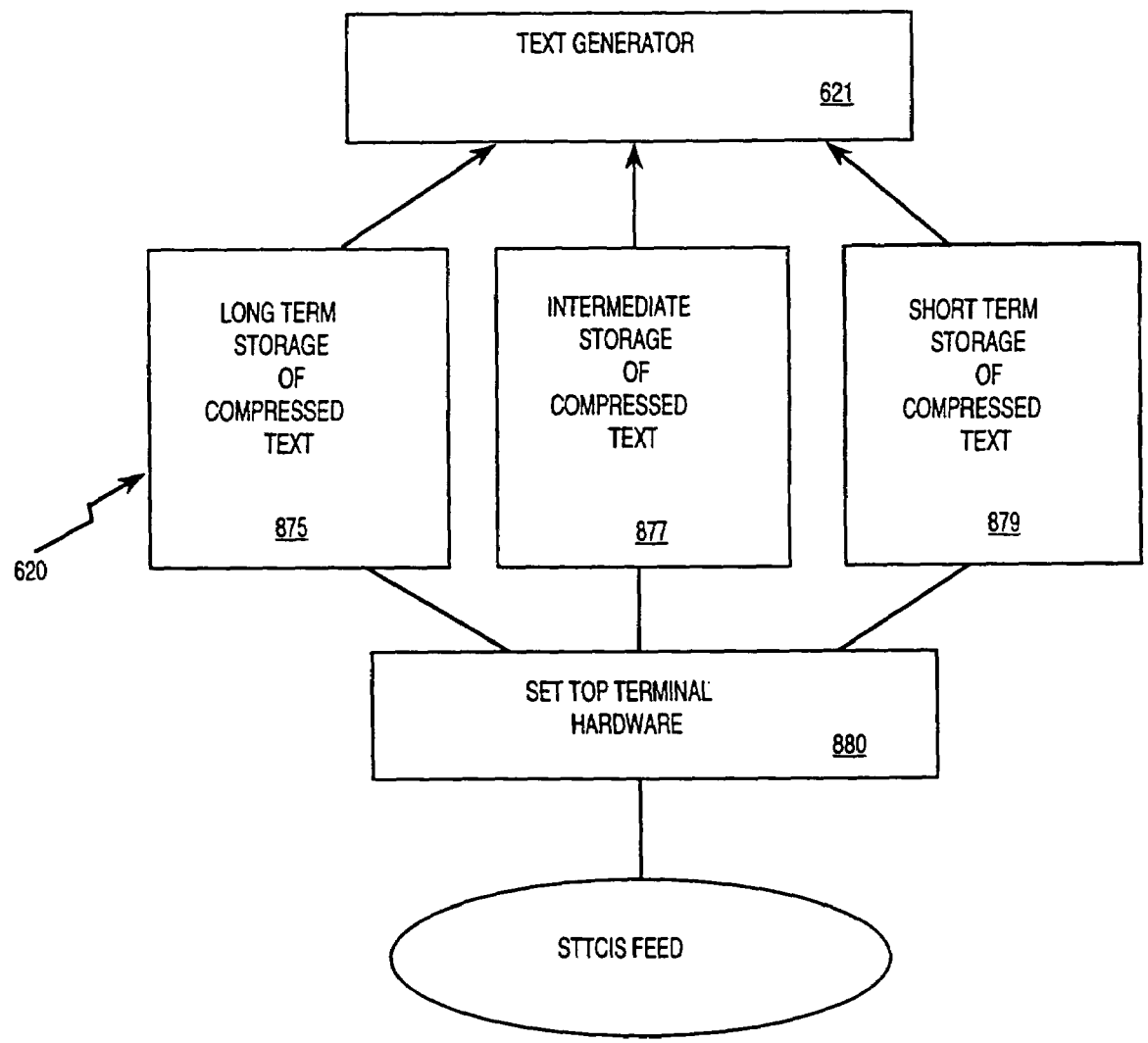
FIG. 18b is a drawing showing the hierarchical storage of text in memory for the set top terminal.
Figure 18C:
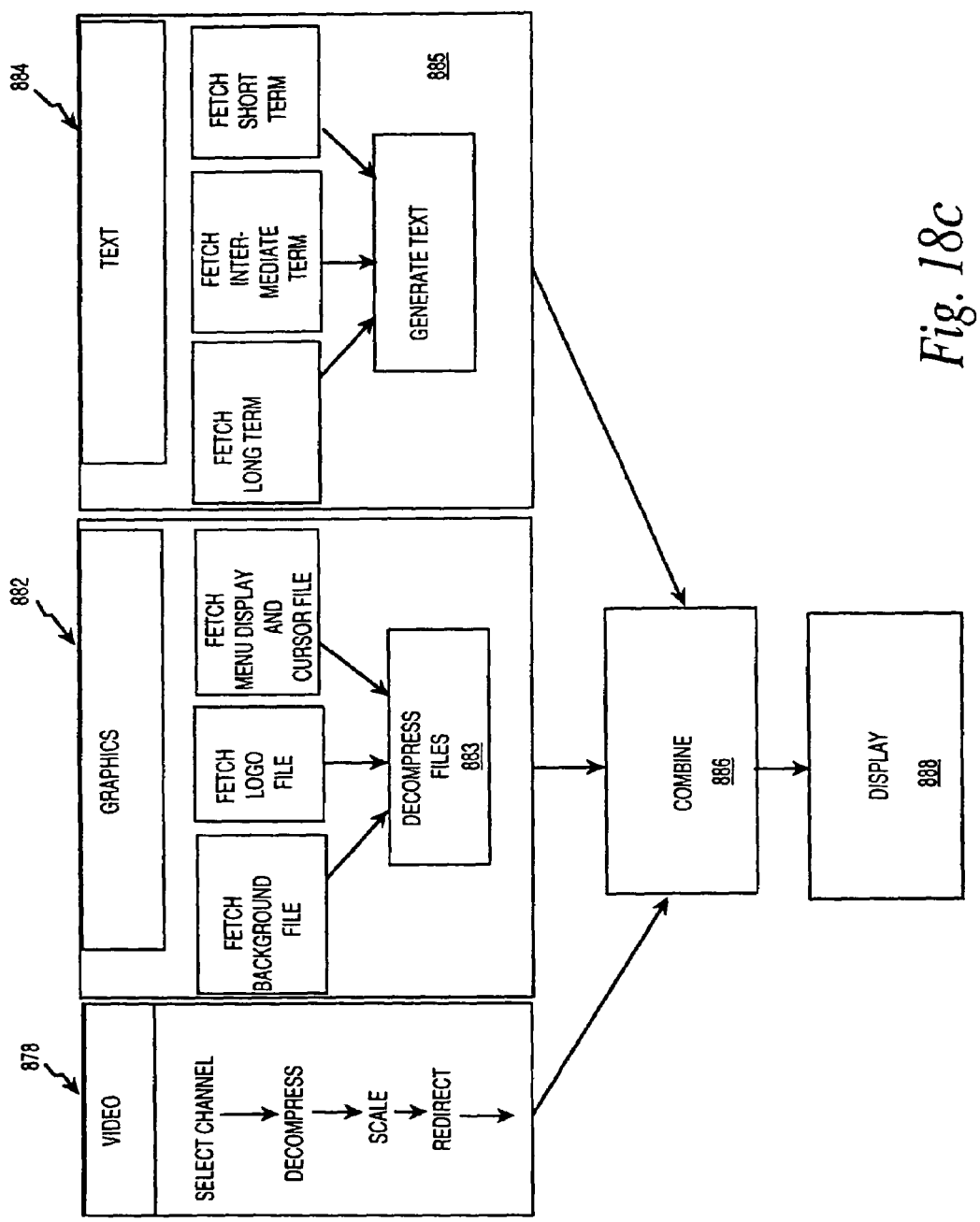
FIG. 18c is a drawing of a flow chart showing the steps required for the microprocessor to retrieve, combine and display a menu.

The set top terminal 220 may generate and create menus using, in part, information stored in its graphics memory. Referring to FIGS. 18a–18c, a background graphics file 800 will store menu backgrounds and a logo graphics file 820 will store any necessary logos. A menu display and cursor graphics file 850 will store menu display blocks and cursor highlight overlays as well as any other miscellaneous files needed to build the menus. Using this method of storing menus, the menus can be changed by reprogramming a graphics memory 620 of the set top terminal 220 through instructions from either the network controller 214 or operations center 202.

A microprocessor in the set top terminal 220 performs the steps required to create a menu using stored information. The microprocessor fetches a background file, logo file, menu display and cursor file in most instances. The microprocessor fetches text from long-term 875, intermediate-term 877, or short-term 879 storage depending on where the text is stored. Using a video combiner 886 (or like device), the stored information is combined with video and the entire image is sent to the television screen 888 for display.

In an embodiment, a graphics controller is used to assist the set top terminal 220 in generating menus. Menu generation by the set top terminal 220 begins with the building of a Major menu screen, which includes background graphics for that Major menu 1020. The background graphics may include an upper window across the top of the screen and a lower window across the bottom of the screen. The background graphics may be generated from the background graphics file 800 in the memory files of the graphics memory. In addition, logo graphics may be generated. Such graphics may include an icon window, a cable company logo, a channel company logo, and two "go" buttons.

The text for each Major menu 1020 may be generated separately by a text generator in the set top terminal 220. Those portions of the text that generally remain the same for a period of weeks or months may be stored in EEPROM or other local storage. Text that changes on a regular basis, such as the movie titles (or other program selections), is transmitted to the set top terminal 220 by either the operations center 202 or the network controller 214 of the cable headend 208. In this manner, the cable headend 208 may change the program selections available on any Major menu 1020 by modifying the program control information signal sent by the operations center 202 and transmitting any changes using a set top terminal control information signal (STTCIS).

Day, date and time information may be added to each Major menu 1020. This information is sent from the operations center 202, the cable headend 208 (signal processor 209 or network controller 214), the uplink site, or generated by the set top terminal 220 internally.

The creation and display of program description submenus is performed by the set top terminal 220 in a manner similar to that described above. Each submenu may be created in parts and combined before being sent to the television screen. Background graphics and upper and lower windows may be used. Likewise, a video window and half-strip window can be generated from information in storage on the EEPROM.

In addition to graphics and text, some submenus include windows that show video. Such video may be still or moving pictures. Still pictures may be stored in a compressed format (such as JPEG) at the set top terminal 220. Video stills may be transmitted by the operations center 202 through the program control information signal from time to time.

Moving video pictures may be obtained directly from a current video feed as described above. Depending on video window size, this may require manipulation of the video signal, including scaling down the size of the video and redirecting the video to the portion of the menu screen which is within the video window of the menu. Alternatively, the video may be obtained from a split screen channel. Such a method involves the use of split screen video techniques to send multiple video clips on a single channel at a given time. The set top terminal 220 would scale the picture, if necessary, and redirect it to the correct position on the screen using known scaling and positioning techniques. Additional circuitry may be required in the set top terminal 220 to perform adequate scaling and repositioning.

To avoid the need for redirecting video into the portion of the screen which houses the video window, masking and menu graphics may be used to cover the portions of the channel video that are not needed. This masking technique allows the split screen video to remain in the same portion of the screen that it is transmitted by the operations center 202. The masking is then adjusted to cover the undesired portions of the screen. These masks are stored in the background graphics file similarly to other background files for menus.

The split screen video technique may also be used for promoting television programming. Since a great number of short video clips may be sent continuously, full or partial screen promotionals (or informationals) may be provided to the subscriber. With this large quantity of promotional video, the subscriber is given the opportunity to "graze" through new movie or television programming selections. The subscriber simply grazes from promotional video to promotional video until the desired television program is discovered.

F. Detailed Set Top Terminal Description

The set top terminal 220 receives and manipulates signals from the cable headend 208. The set top terminal 220 is equipped with local computer memory and the capability of interpreting the digitally compressed signal to produce menus for the subscriber. The remote control 900 communicates the subscriber's selections to the set top terminal 220. The subscriber's selections are generally based upon menus or other prompts displayed on the television screen.

Figure 19:
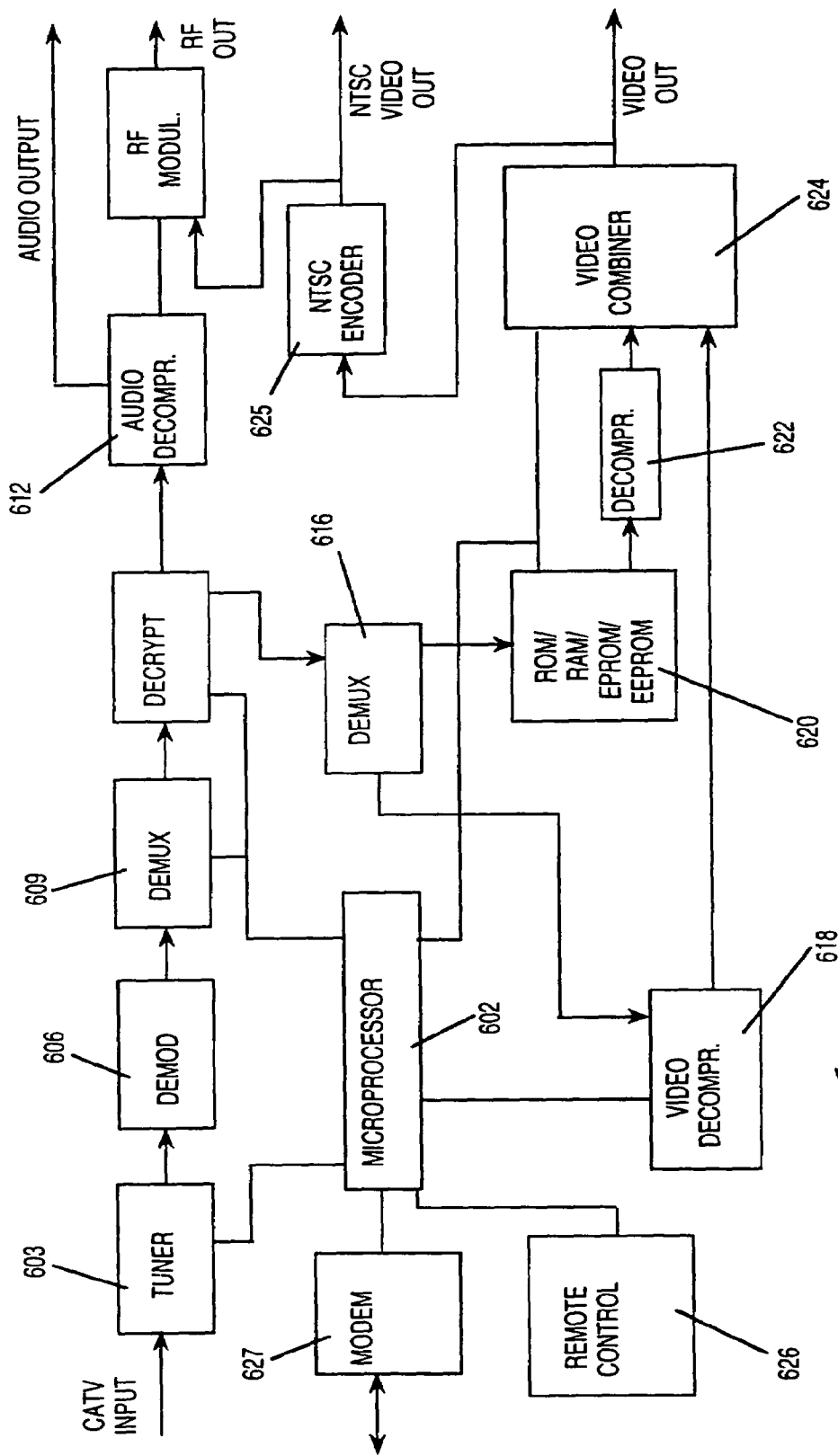
FIG. 19 is a block diagram of the hardware components of the set top terminal.

FIG. 19 shows the basic hardware components of the set top terminal 220. The set top terminal 220 has a tuner 603, digital demodulator 606, decryptor 600, and demultiplexers 609, 616 as well as audio equipment 612 and a remote control interface 626 for receiving and processing signals from the remote control unit 900. A modem 627 allows communication between a microprocessor 602 and the cable headend 208. An NTSC encoder 625 provides a standard NTSC video output.

The microprocessor 602 is capable of executing program instructions stored in memory. These instructions allow a subscriber to access various menus by making selections on the remote control 900.

The manner in which the video is decompressed and the menus are generated from the program control information signal or STTCIS varies depending on the specific embodiment of the invention. Video decompressors 618 and 622 may be used if the video is compressed. The program control information signal may be demultiplexed into its component parts, and a video decompressor 618, graphic decompressor, text generator and video combiner 624 may be used to assist in creating the menus.

In addition to the menu format information that is stored in graphics memory, the set top terminal 220 also stores data tracking those programs that have been selected for viewing. By gathering this data, the set top terminal 220 can maintain an accurate record of all programs accessed/watched by storing the data in EEPROM or RAM. Subsequently, this data can be transmitted to the cable headend 208, where it can be used in carrying out network control and monitoring functions. Such data transmissions between the set top terminal 220 and cable headend 208 can be accomplished, for example, through upstream transmission over the cable network or over telephone lines through the use of telephone modems. Where upstream transmission over the cable network is used, the set top terminals 220 can complete data transmissions on a scheduled (e.g., using a polling response or status report to respond to polling requests sent from the cable headend 208) or as-needed (e.g., using a random access technique) basis.

Figure 20A:
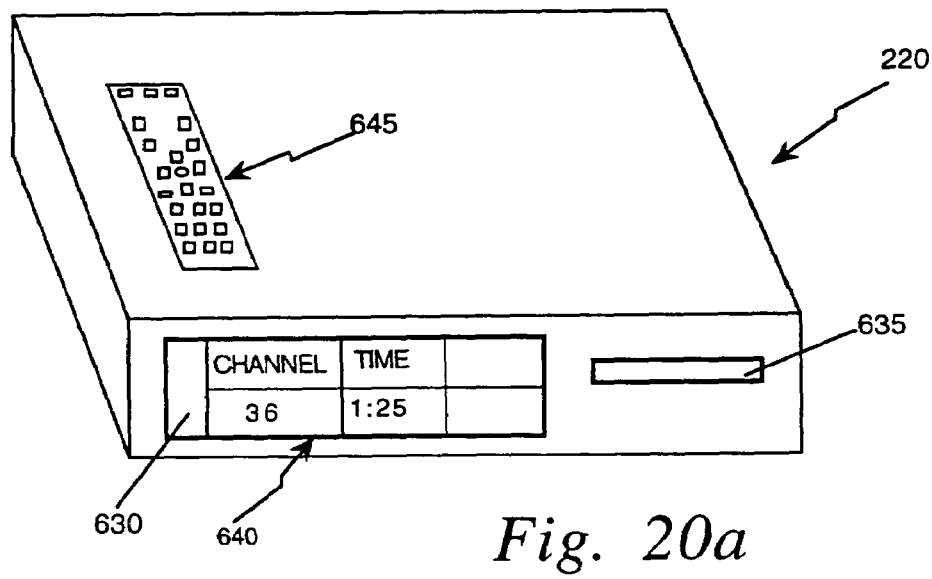
FIG. 20a is a perspective front view of a set top terminal.

FIG. 20a shows the front panel of the set top terminal 220, which includes an infrared sensor 630 and a series of LED displays 640. The LED displays 640 may indicate with an icon or a letter (e.g. A–K) the Major menu currently selected by the set top terminal 220 or the channels selected directly by a subscriber, or menu channel selections (e.g., from 1 to 50). Further displays may include current channel, time, volume level, sleep time, parental lock (security), account balance, use of a hardware upgrade, second channel being recorded by the VCR, use of the Level D music hardware upgrade in a separate room, a channel being viewed on another television that is coupled to the set top terminal 220, and any other displays useful to a subscriber to indicate the current status of the set top terminal 220. The LEDs 640 may also provide an indication of the digital audio channel currently tuned.

The set top terminal 220 includes a flapped opening 635 on its front that allows the insertion of a magnetic cartridge (or similar portable storage device, including optical disk, ROM, EPROM, etc. not shown). This cartridge opening 635 allows the set top terminal 220 to be upgraded or reprogrammed locally with the use of a magnetic tape cartridge.

On the top or cover of the set top terminal 220 are located pushbutton controls 645. Any function that can be performed on the remote 900 may also be performed at the set top terminal 220 using the duplicative pushbutton controls 645.

Figure 20B:
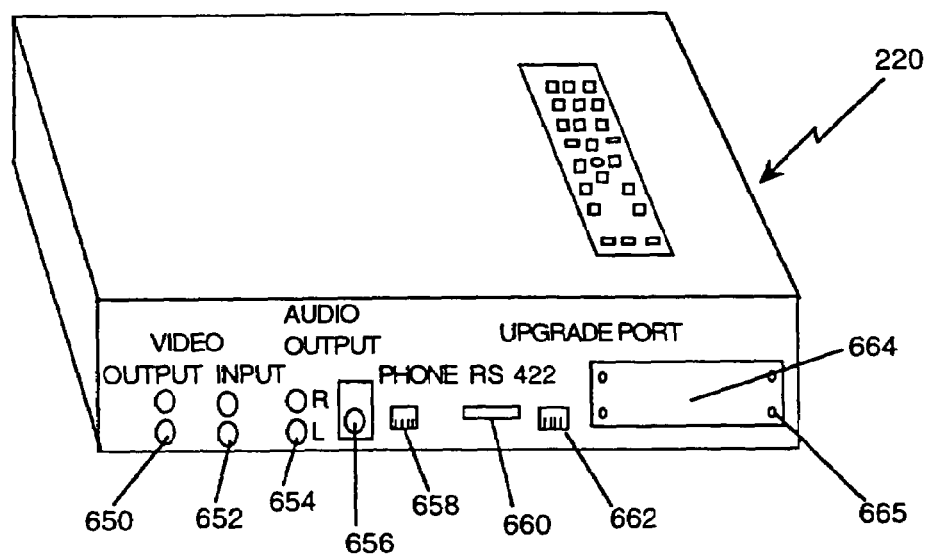
FIG. 20b is a perspective rear view of a set top terminal.

FIG. 20b shows the back of the set top terminal 220, which includes a pair of output terminals 650, pair of input terminals 652, pair of stereo/audio output terminals 654, satellite dish input port 656, telephone jack 658 and an RS-422 port 660. In addition, an upgrade port 662 and a cover plate 664 are held in place by a series of sheet metal screws. One of the output terminals 650 is for a television and the other is for a VCR or other video recording device. The set top terminal 220 is equipped to handle incoming signals on one or two cables using the input terminals 652. The phone jack 658 and an RS-232 or RS-422 port 660 are provided for maintenance, trouble shooting, reprogramming and additional customer features, such as connection to a digital camera. In alternate embodiments, the telephone jack 658 may be used as the primary mode of communication between the cable headend 208 and the set top terminal 220. This connection is possible through the local telephone, cellular telephone or a personal communications network (PCN).

The basic programming of each set top terminal 220 is located on ROM within the set top terminal 220. Random access memory, the magnetic cartridge capability, and the expansion card slot 635 each allow upgrades and changes to be easily made to the set top terminal 220. The upgrade cards may be daisy-chained together to provide greater functionality for the set top terminal 220.

In an embodiment, the set top terminal 220 includes a hardware upgrade port 662, in addition to expansion card slots. The hardware upgrade port 662 accommodates a four-wire (or more) connection for: (1) error corrected, decrypted data output of the set top terminal 220, (2) a control interface, (3) decompressed video output, and (4) a video input port. In an embodiment, multiple wires are used to perform each of the four functions. The four sets of wires are combined in a single cable with a single multipin connector.

Multipin connections may be used for the multiwire cable. The multipin connection 662 may range from DB9 to DB25. A variety of small computer systems interface (SCSI) ports may also be provided. Alternatively, four or more ports may be provided instead of the single port depicted.

Another port 662 is used to attach the various hardware upgrades described below to a set top terminal 220. An embodiment has a number of hardware upgrades available for use with a set top terminal 220, including: (1) a Level A interactive unit, (2) a Level B interactive unit, (3) a Level C interactive unit with compact disc capability, (4) a Level D digital radio tuner for separate room use, and (5) a Level E information download unit. Each of these upgrades may be connected to the set top terminal 220 unit through the upgrade port 662 described earlier. The same four wires in a single cable described earlier may be used.

Existing set top converter boxes such as those made by Scientific Atlanta or General Instruments are presently unequipped to handle the menu selection system of the present invention. Thus, hardware modifications are necessary in order to use the menu selection system with existing set top converter technology.

Figure 21:
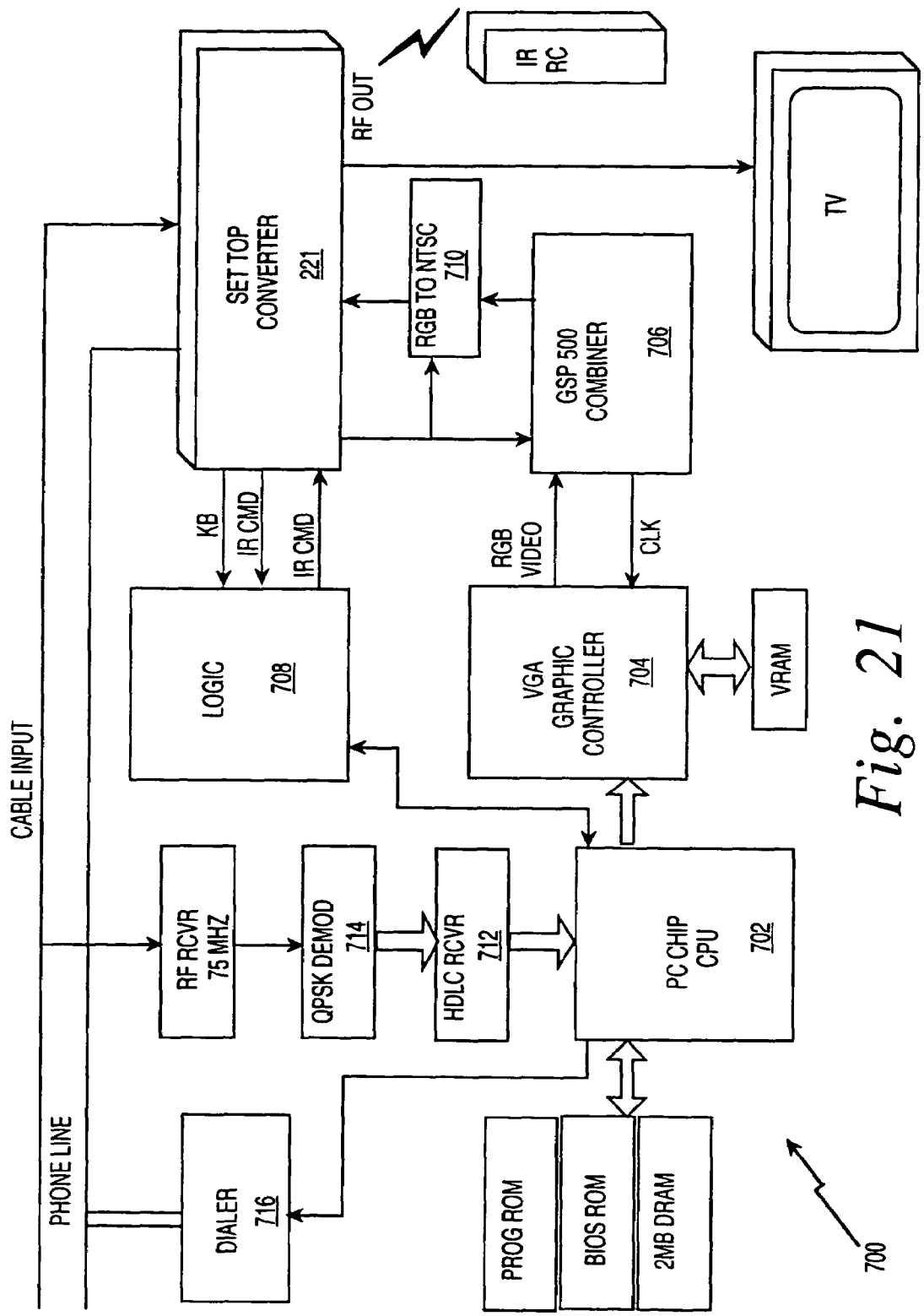
FIG. 21 is a schematic of a card upgrade for a set top terminal.

An upgrade card addition to a set top converter is depicted in FIG. 21. The card 700 shown provides the additional functionality needed to utilize the menu system with existing set top converter technology. The primary functions the card 700 adds to the set top converter are the interpreting of program control information signals, generating of menus, sequencing of menus, and, ultimately, the ability of the subscriber to select a channel through the menu system without entering any channel identifying information. The card 700 also provides a method for a remote location, such as the cable headend 208, to receive information on programs watched and control the operation of the set top converter 220 and the card 700. The programs watched information and control commands may be passed from the cable headend 208 to the card 700 using telephone lines coaxial cable, fiber optic cable, wireless means and by satellite.

The primary components of the card 700 are a PC chip CPU 702, a VGA graphic controller 704, a video combiner 706, logic circuitry 708, NTSC encoder 710, a receiver 712, demodulator 714, and a dialer 716. The card 700 operates by receiving the program control information signal from the cable headend 208 through the coaxial cable. The logic circuitry 708 of the card 700 receives data, infrared commands, and synchronization signals from the set top converter. Menu selections made by the subscriber on the remote control 900 are received by the set top converter's infrared equipment and passed through to the card 700. The card 700 interprets the infrared signal and determines the program (or menu) the subscriber has selected. The card 700 modifies the infrared command to send the program selection information to the set top converter 221. The modified infrared command contains the channel information needed by the set top converter 220. Using the phone line and dialer 716, the card 700 is able to transmit program access information to the cable headend 208.

G. Program Control Information Signal

Throughout this application, the term "program control information" is used to indicate control information coming from the cable headend 208 to the set top terminal 220, whether it is sent directly from the operations center 202, processed by the network controller 214 and then forwarded to the set top terminal 220, or transmitted over telephone lines.

The program control information signal may reach the subscriber's home in a compressed format and be decompressed prior to viewing. Included in the delivered signal is information that enables equipment at the subscriber's home to display menus for choosing particular programs. The delivered program signal may also include the local authorization code, which allows for display of programs and channels of programming. Depending on the particular embodiment, the television program signal may arrive at the subscriber's home through one or more connections such as coaxial cables, T1 and T3 lines, Integrated Services Digital Network (ISDN) lines and Asymmetric Digital Signal Lines (ADSL) cables, twisted pairs, cellular telephone connections, local area networks, direct satellite broadcasts, terrestrial broadcasts, or personal communications network (PCN) hookups.

The program control information signal is generated by the operations center 202 and provides the network controller 214 with data on the scheduling and description of programs. In an alternate configuration, this data is sent directly to the set top terminal 220 for display to the subscriber. In an embodiment, the program control information signal is stored and modified by the network controller 214 and sent to the set top terminal 220 in the form of the STTCIS. The set top terminal 220 integrates either the program control information signal or the STTCIS with data stored in the memory of the set top terminal 220 to generate on-screen menus that assist the subscriber in choosing programs for display.

The types of information that can be sent using the program control signal include: number of program categories, names of program categories, what channels are assigned to a specific category (such as specialty channels), names of channels, names of programs on each channel, program start times, length of programs, description of programs, menu assignment for each program, pricing, whether there is a sample video clip for advertisement for the program, and any other program, menu or product information. As noted above, the program control signal may also include local authorization codes.

With a minimal amount of information being communicated to the set top terminal 220 on a regular basis, the set top terminal 220 is able to determine the proper menu location for each program and the proper time and channel to activate for the subscriber after a menu selection. The program control information signal and STTCIS can be formatted in a variety of ways and the on-screen menus can be produced using many different methods. For instance, if the program control information signal carries no menu format information, the menu format for creating the menus can be fixed in ROM at the set top terminal 220. In an embodiment, the menu format information is stored at the set top terminal 220 in a temporary memory device such as a RAM or EPROM. New menu format information is sent via the program control information signal or the STTCIS to the set top terminals 200 whenever a change to a menu format is desired.

In an embodiment, the menu formats remain fixed and only the text changes. In this way the program control information signal can be limited to primarily text and a text generator can be employed in the set top terminal 220. Another simple embodiment uses a separate channel full-time (large bandwidth) just for the menu information.

Live video signals may be used in windows of certain menus. These video signals can be transmitted using the program control information signal or STTCIS, or can be taken off channels being transmitted simultaneously with the menu display. Video for menus, promos or demos may be sent to the set top terminal 220 in several formats, including (1) on a dedicated channel, (2) on a regular program channel and scaled to size, or (3) along with the program control information signal. For example, a large number of short promos or demo video may be sent using a split screen technique on a dedicated channel. A multiple window technique may be used with the menus to display a description of a program and one or more video frames that assist the subscriber in selecting the program.

The program control information signal generated by the operations center 202 provides data on the scheduling and description of programs to the network controller 214 or, in an alternate configuration, directly to the set top terminal 220 for display to the subscriber. In an embodiment, the program control information signal is stored and modified by the network controller 214 and sent to the set top terminal 220 in the form of the STTCIS. This configuration is required to accommodate differences in individual cable systems and possible differences in set top terminal devices. The set top terminal 220 integrates either the program control information signal or the set top terminal control information stream together with data stored in the memory of the set top terminal 220, to generate on-screen displays for assisting the subscriber in choosing programs.

The goal of the menu driven program selection system is to allow the subscriber to choose a program by touring through a series of menus, organized generally as depicted in FIG. 17, utilizing the remote control 900 for cursor movement. The final choice in the series of menus will identify one particular channel and one time for activation of that channel. Armed with a channel and activation time the set top terminal 220 can display the selected program on the television for the subscriber. To achieve this goal an intelligent alpha-numeric code is assigned to each program. This alpha-numeric code identifies the category of the program, the menu in which the program should be displayed, its transmission time(s), and the position on the menu that the program should be displayed.

The program control information, including menu codes, may be sent continuously from the operations center 202 to the network controller 214, and ultimately to the set top terminal 220.

Table A shows the basic programming information that may be sent to the set top terminal 220. The program descriptions shown are coded abbreviations. For example, C for comedy, N for news, S for sports, A for cartoons, and Tx for text. If there is a textual description for a program, such as a movie, the description may be given following that program's coded description or may be communicated following the four hours' worth of programming information. As is shown in the coded listing, program descriptions for programs greater than a half hour in length need not be repeated (each half hour). The video description code informs the set top terminal 220 of whether there is still or live video available to advertise the program.

For example, a sporting program may be assigned a code of B35-010194-1600-3.25-Michigan St. vs. USC. The letter B would assign the program to category B, sports. The second alpha-numeric character number 3 would assign the program to the third menu of the sports category. The third character of the code, number 5, assigns the program to the fifth program slot on the third menu. The next six characters, 01/01/94, represent the date. The following four characters, 1600 represent the start time which is followed by the length of the program and the program name. This entry represents a sports show, a college football game, which will be aired at 4:00 PM on New Years day 1994.

TABLE A

| *Ch. | *Program name | *Program length | *Menu code | *Description | *Video |
|---|---|---|---|---|---|
| 12:00 PM | | | | | |
| 1 | Cheers | .5 | E24 | C | N |
| 2 | Terminator | 2.0 | A33 | Tx | S |
| 3 | PrimeTime | 1.0 | D14 | N | N |
| 4 | Football Special | .5 | B24 | S | N |

TABLE A-continued

| *Ch. | *Program name | *Program length | *Menu code | *Description | *Video |
|---|---|---|---|---|---|
| 12:30 PM | | | | | |
| 1 | Simpsons | .5 | E14 & C13 | C | S |
| 4 | Football Game | 3.0 | B13 | S | N |

In the 12:30 Channel 1 entry of Table A, two menu codes are shown. By allowing two menu codes, programs that may fit under two different category descriptions may be shown in both menus to the subscriber. With this minimal amount of information being communicated to the set top terminal 220 on a regular basis, the terminal is able to determine the proper menu location for each program and the proper time and channel to activate for the subscriber after his menu selection.

In the 12:30 Channel 1 entry of Table A, two menu codes are shown. By allowing two menu codes, programs that may fit under two different category descriptions may be shown in both menus to the subscriber. With this minimal amount of information being communicated to the set top terminal 220 on a regular basis, the terminal is able to determine the proper menu location for each program and the proper time and channel to activate for the subscriber after his menu selection.

Table B shows an example Events Table that may be downloaded to a set top terminal 220 using the Event.Dat file which contains information about events and

TABLE B

| Field # | Field Type | |
|---|---|---|
| 1 | Event Type 1 = YCTV 2 = Pay-Per-View 3 = Reg. TV | Unsigned Int |
| 2 | Event ID | Unsigned Int |
| 3 | Global Channel ID | Unsigned Int |
| 4 | Price (in Cents) | Unsigned Int |
| 5 | Start Time | HH:MM:SS |
| 6 | End Time | HH:MM:SS |
| 7 | Start Date | MM/DD/YY |
| 8 | End Date | MM/DD/YY |
| 9 | P-Icon | ASCIIZ |
| 10 | Name | ASCIIZ |
| 11 | Description | ASCIIZ | pricing. As shown in the table, the three columns of the Events Table identify the field number, the field itself and the type of information downloaded in the Event.Dat file. The first column contains the field numbers 1 through 11. The middle column contains the corresponding field parameters, including the event type, event ID, global channel ID, price, start time, end time, start date, end date, P-icon, name and description. The third column contains corresponding field type information. Field type information typically consists of an unsigned integer; hours, minutes and seconds; months, day and year; and ASCII character identifier.

Table C shows an example Event.Dat data file. In particular, Table C shows two data streams corresponding to two event types. The first data stream identifies a YCTV™ event in the first field. The second field designates the event ID, which is 1234 in this example. The third field includes the global channel ID number two. The fourth field indicates the cost of 50 cents for this event. The fifth and sixth fields indicate the respective start and end times of 3:00 AM to 3:00 PM, respectively. The seventh and eighth fields show the corresponding start and end dates, designated as 8/25/93 and 8/27/93, respectively. Field nine indicates the P-icon set to PBS.PCX graphics file. Finally, fields ten and eleven indicate the name and description of the events selected, which in this case are Sesame Street™ and Barney™. The second data stream in the Event.Dat example shown in Table C includes analogous information for Terminator IV™, which is designated in field one as a pay-per-view event.

TABLE C

Event.Dat Example

1'1234'2'50'03:00:00'15:00:00'08/25/93'08/27/93'pbs.pcx'Sesame Street & Barney's Sesame Street and Barney Abstract
2'1234'2'50'20:00:00'22:00:00'08/25/93'08/25/93't4.pcx'Terminator 4' Terminator 4 Abstract The program control information signal and STTCIS can be formatted in a variety of ways and the on-screen menus can be produced in many different ways. For instance, if the program control information signal carries no menu format information, the menu format for creating the menus can be fixed in ROM at the set top terminal 220. This method allows the program control information signal to carry less information but has the least flexibility since the menu formats can not be changed without physically swapping the ROM.

In an embodiment, the menu format information is stored at the set top terminal 220 in temporary memory either in a RAM, FLASH ROM, EEPROM or EPROM. This configuration provides the desired flexibility in the menu format while still limiting the amount of information needed to be communicated via the program control information signal. New menu format information can be sent via the program control information signal or the STTCIS to the set top terminals 220 each time there is a change to a menu.

Program access information for each program watched is stored at the set top terminal 220 until it is polled by the network controller 214 for information retrieval using the program control information signal or STTCIS. This information retrieval can be accomplished by using the polling request message and response formats, 920 and 920' respectively, as shown, and FIGS. 22a and 22b, and described below, but any suitable polling request and response message format may be used to interrogate each set top terminal 220 sequentially, one by one. The set top terminals 220 are identified by a unique address and set top terminal identifier. The set top terminal 220 may transmit information and messages to the network controller 214 only when given permission by the network controller 214 to do so.

Where, for example, specialty programs have been accessed since the previous poll, the set top terminal 220 is given permission to transmit a polling response 920' in the form of a status report that includes any such access information. The network controller's control receiver (not shown) is tasked with the receipt of set top terminal polling responses or status reports. These status reports generally include information that allows the network controller 214 to track a subscriber's program access history.

Figure 22A:
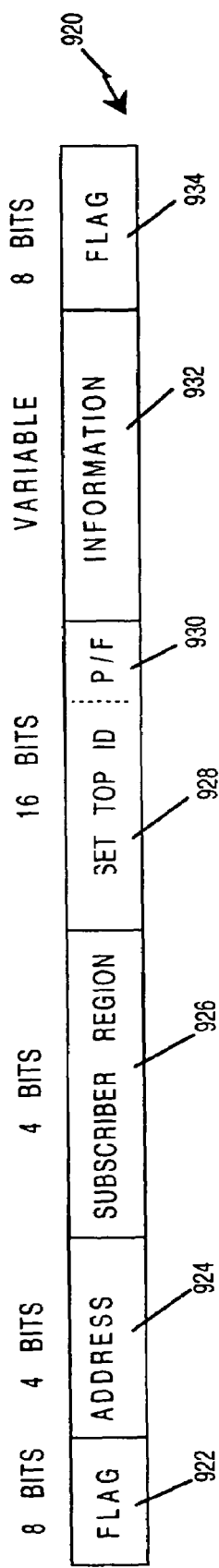
FIG. 22a is a drawing of a frame format for a program control information signal.

FIG. 22a shows an embodiment of a frame format message 920 used for polling the set top terminals 220. This frame format 920 consists of six fields, namely: (1) a leading flag 922 at the beginning of the message, (2) an address field 924, (3) a subscriber region designation 926, (4) a set top terminal identifier 928 that includes a polling command/response (or P/F) bit 930, (5) an information field 932, and (6) a trailing flag 934 at the end of the message.

The eight-bit flag sequence 922 that appears at the beginning and end of a frame is used to establish and maintain synchronization. Such a sequence typically consists of a "001111110" bit-stream. The address field 924 designates a 4-bit address for a given set top terminal 220. The subscriber region designation 926 is a 4-bit field that indicates the geographical region in which the subscriber's set top terminal 220 is housed. The set top terminal identifier 928 is a 16-bit field that uniquely identifies each set top terminal 220 with a 15-bit designation followed by an appended P/F bit 930. Although field size is provided by this example, a variety of sizes can be used with the invention.

The P/F bit 930 is used to command a polling response from the set top terminal 220 addressed, as described below. The response frame format 920' also provides a variable-length information field 932' for other data transmissions, such as information on system updates. The frame format 920' ends with an 8-bit flag (or trailing flag) 934' that is identical in format to the leading flag 922', as set forth above. Other frame formats (e.g., MPEG) will be apparent to one skilled in the art and can be easily adapted for use with the system.

Figure 22B:
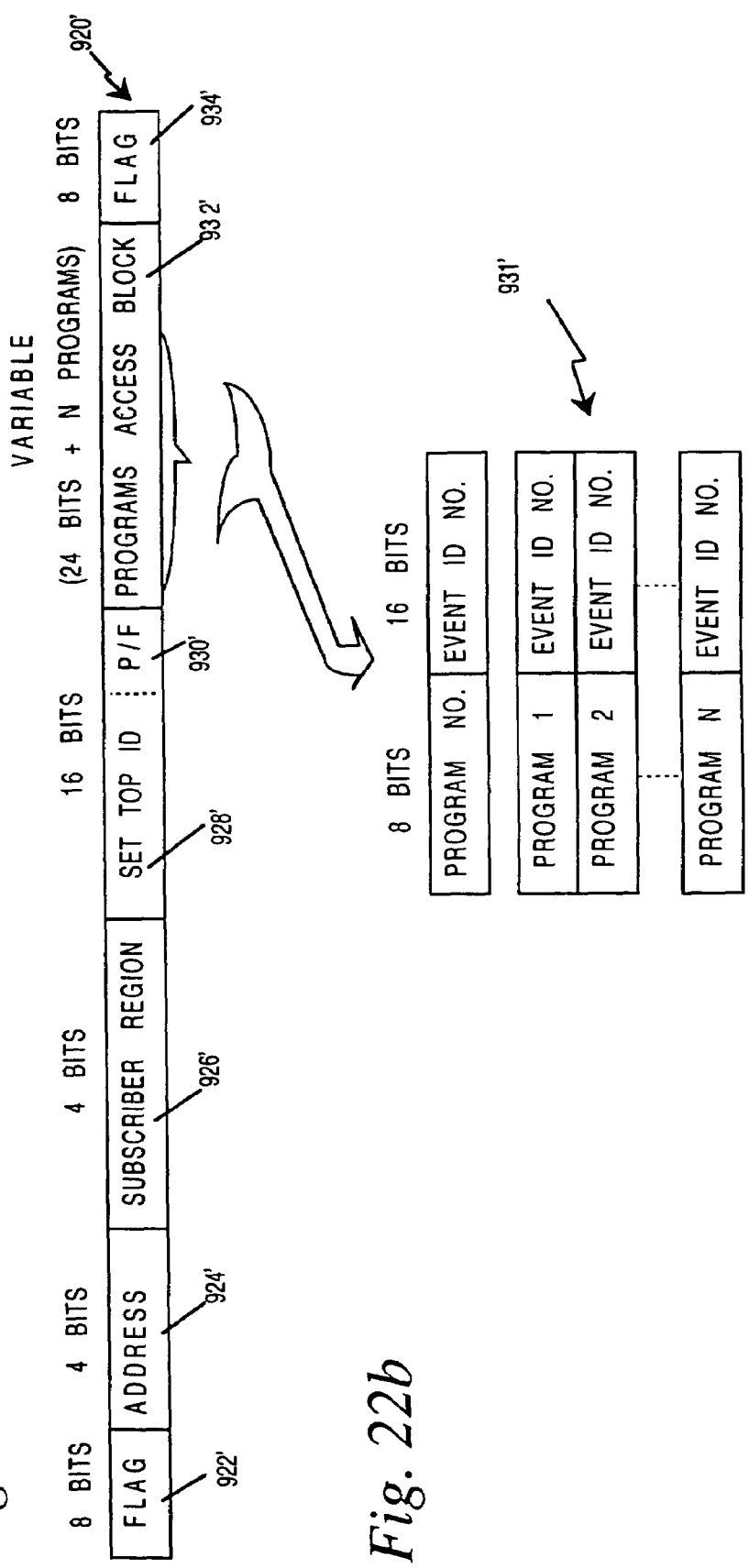
FIG. 22b is a drawing of a frame format for a polling response from the set top terminal.

FIG. 22b shows an example of frame format 920' for the status reports received from the set top terminals 220 during the polling cycle. This frame format is identical to the polling request message format 920 and, as described, includes: (1) a leading flag 922' at the beginning of the message, (2) an address field 924', (3) a subscriber region designation 926', (4) a set top terminal identifier 928' that includes a polling command/response (or P/F) bit 930', (5) an information field 932', and (6) a trailing flag 934' at the end of the message.

The information field 932' remains variable in length so that the status of an indeterminate number of programs, represented at 931, accessed can be included in the frame. In this way, the control message length of the polling request message is minimal since the network controller 214 does not transmit such access information. After a polling response by a given set top terminal 220, however, the control message length increases in proportion to the number of programs accessed.

During transmission, the P/F bit is used to carry out the polling function. In particular, the P/F bit is set to a "1" position to command a polling response from the set top terminal 220 whose address is identified in the frame. The set top terminal 220 addressed must respond to the command in the same P/F bit also set to the "1" position. The response will include the number of programs accessed and their corresponding event identification numbers as shown in FIG. 22b at 931. In cases where the set top terminal 220 has not accessed any programs since the previous polling cycle, the set top terminal 220 responds with the P/F bit set to "1" and the programs access block denoting zero programs accessed.

Through the polling cycle, the network controller 214 acquires the information needed to operate the system 200. During the polling cycle, the network controller 214 sends signals to the set top terminals 220 to authorize both their operation and access to specific channels. If, for example, a subscriber has failed to pay a recent bill, the network controller 214 can deauthorize the subscriber's set top terminal 220. Likewise, when the subscriber orders a program or channel, the network controller 214 checks the subscriber's account for good standing by reading the proper database file. After the check, the network controller 214 then either authorizes or deauthorizes access by the set top terminal 220. The authorization and deauthorization may be provided by any of the methods described with respect to FIGS. 10–12, for example. As a result, the cycle requires a series of requests and responses to operate.

A second method for the network controller 214 to receive information from the set top terminals 220 is through the use of a random access scheme. In this method, individual set top terminals 220 can send control-related messages to the network controller 214 without being polled. This scheme is particularly useful in networks where subscriber regions include potentially large numbers of subscribers. High concentrations of subscribers may be found, for example, in large metropolitan areas. In such cases, the polling cycle can be replaced with a more sophisticated random access strategy such as carrier-sense multiple access with collision detection (CSMA/CD). In this scheme, each set top terminal 220 must "listen" before it transmits and then does so only if it senses an idle medium. When the return link to the network controller 214 is silent, a given set top terminal 220 can transmit its messages. Any messages sent from a set top terminal 220 to the network controller 214 would set the P/F bit 930' to a "0" position to indicate that the message is not in response to any command or polling request. In addition to CSMA/CD, other random access schemes can be used with the system, such as CDSL. Yet another method for the network controller 214 to receive information from the set top terminals 220 is through the use of modems. In this arrangement, the set top terminals 220 communicate program access information and orders to the network controller 214 using telephone modems. The set top terminals 220 are equipped with a modem port to facilitate such operation. Thus, communications between a given set top terminal 220 and the network controller 214 can be established over telephone lines or other media when cable traffic or other primary traffic is congested. A method includes using modems is in combination with a control or "hit" signal from the network controller 214. A group (or region) of set top terminals 220 is "hit" simultaneously by the network controller 214 via the cable. Only those set top terminals 220 within the group that have data for the network controller 214 call the network controller 214 by modem. The network controller 214 is equipped with a bank of modems (organized to roll-over telephone calls) to answer the incoming calls.

Among the methods discussed for the network controller 214 to receive information from the set top terminals 220, polling allows the network controller 214 to conduct and control communications with set-top terminals 220 over the cable network in an orderly fashion. In particular, the network controller 214 can schedule data retrieval by polling the set top terminals 220 one by one. A random access method, on the other hand, does not allow the network controller 214 to maintain such orderly communications. Instead, the network controller 214 receives data from the set top terminals 220 at random, depending on when the cable medium is idle. This random reception of data lessens the degree of control that the network controller 214 has over set top terminal transmissions.

In between polling cycles, the program control information continues to supply the set top terminals 220 with menu information. In the simplest embodiment, the menus remain fixed and only the text changes. Thus, the program control information signal can be limited to primarily text and a text generator can be employed in the set top terminal 220. This simple embodiment keeps the cost of the set top terminal 220 low and limits the bandwidth necessary for the program control information. Another simple embodiment uses a separate channel full-time (large bandwidth) just for the menu information. This separate channel would facilitate the rapid downloading of new graphics for the system and would enhance response time when text and other data information needs to be changed.

In an embodiment, the basic building blocks or templates of the on-screen menu displays will be stored in graphics memory consisting of nonvolatile RAM, FLASH ROM, EPROM, or preferably, EEPROM, as shown as 620 in FIG. 18a. Referring to FIG. 19, with the information from the graphics memory 620, the microprocessor 602, graphics decompressor 622, a text generator (not shown in FIG. 19, but incorporated if necessary), and video combiner 624 will build a menu screen.

The memory files of the graphics memory are preferably categorized into three categories, background graphics 800, logo graphics 820, and menu and display graphics 850, as shown in FIG. 18a.

The background graphics file 800 will store menu backgrounds such as: universal main menu backgrounds 804, universal submenu backgrounds 808, promo backgrounds 812 and custom menu formats 816. The logo graphics file 820 will store any necessary logos such as: Your Choice TV™ logos 824, Network logo files 828, cable system logo files 832, studio logo files 836, and graphic elements file 840. The menu display and cursor graphics file 850 will store menu display blocks 854 and cursor highlight overlays 858, as well as any other miscellaneous files needed to build the menus.

Using this method of storing menus discussed above, the menus can be changed by reprogramming the graphics memory 620 of the set top terminal 220. To revise the entire design of displayed menus, the network controller 214 or operations center 202 instructs the EEPROM 620 to be erased and reprogrammed with new menu templates. To change one menu format or logo, the network controller 214 or operations center 202 instructs just the one location in memory to be erased and rewritten. The menu reprogramming can also be done locally (at the set top terminal 220) by a serviceman.

As shown in FIG. 18a, each memory subfile is further divided into various memory blocks. For example, the background graphics file 800 contains the universal main menu backgrounds 804. The universal main menu backgrounds memory 804 includes memory units UM1 860, UM2 862 and UM3 863. Similarly, the logo graphics file 820 and menu display and curser graphics file 850 contain individual subfile memory blocks (for example, studio logo file 836 has memory block SL1 864; menu display blocks 854 has memory menu display block MD1 866).

FIG. 18b shows the hierarchical storage of text transmitted from the cable headend 208. Although text may be continuously transmitted with the video signals to set top terminals 220, text may also be transmitted intermittently. In such a case, the text is stored in the set top terminal 220. The text may be transmitted and stored in a compressed format using known techniques. Additionally, the text may be stored in the graphics memory 620 within the set top terminal 220.

Depending upon the use of the text, it will be stored in one of three portions of memory. Information sent with the text will either direct the text to a particular portion of memory, or include information as to the priority of text. The microprocessor 602, part of the set top terminal hardware represented at block 880, may then direct the text to the appropriate memory location for storage.

If the text is to be used frequently and over a long period of time a long term storage 875 will be used. If the text will be used for a shorter period of time (for example, a month), the text will be directed to an intermediate storage area 877. If the text is to be used almost immediately, or for a short period of time (for example, within a few days) the text is directed to a short term storage area 879. The microprocessor 602 locates the appropriate text required for a particular menu and retrieves it from the appropriate portion of memory 620. The text is output from the graphics memory 620 to the text generator 621. Text generated from the text generator 621 is thereafter directed to text/graphics video combiner 624.

FIG. 18*c* shows the steps performed by the microprocessor 602 for creating a menu based upon a series of overlay screens. These instructions are stored in memory within the set top terminal 220 in a screen data file. The screens data file instructs the microprocessor 602 on the location of each graphics file on the screen. An example screen data file is shown in Table D, wherein the screen data file specifies menu data positioning in terms of, for example, x- and y-pixel positions, height and width, color codes and fonts. Alternatively, instructions or routines may be transmitted from the operations center 202 to be stored in memory within the individual set top terminals 220.

Similarly, the microprocessor 602 may fetch text, as shown in block 884. Depending upon the memory location of the text, the microprocessor 602 will fetch the text from long-term, intermediate-term, or short-term storage, as described above. Based upon this memory retrieval, the text is generated, block 885, and combined with the video (if any), with as many screens of a decompressed graphics as are necessary, and any text, block 886. The image or portions of the image are stored in the video combiner (for example, combiner 624 of FIG. 19) until all overlays are received. Thereafter, the entire image is sent, under direction of another routine, to be displayed on the television screen, as represented by display block 888.

The terms and descriptions used herein are set forth by way of illustration only and are not meant as limitations. Those skilled in the art will recognize that numerous variations are possible within the spirit and scope of the invention as defined in the following claims.

What is claimed is:

1. An apparatus that provides digital broadcast television programs to a subscriber, comprising:
    a set top terminal, comprising:
        a receiver module to receive program data including the digital broadcast television programs, an address for a scheduling web site and a local authorization code, wherein the authorization code allows at least one of the digital broadcast television programs to be decrypted for viewing; and

TABLE D

~The following data lines are for the main menu
~
~           Screen Type     Template File    Description
SCREEN      '@MAIN          'main menu.pcx   'Main Menu
~
~           Justify    X      Y     Ht    Wd    FColor   BColor   Font
STR POS     'Left      '165   '85   '30   '300  '27      '55      FUTUR14.GFT
STRING 'MAIN MENU
~
~           Justify    X      Y     Hght  Wdt
PCX POS     'LEFT      '190   '75   '200  '200
PCX example.pcs
~
~           Justify    X      Y     Ht    Wd    FColor   BColor   Font          X    Y    Ht   Wd
ITEM POS    'Left      '120   '100  '20   '400  '15      '25      FUTUR12.GFT   '1   1    0    '420
            '90        '30
ITEM'@YCTV'YOUR CHOICE TV
~
~           Justify    X      Y     Ht    Wd    FColor   BColor   Font          X    Y    Ht   Wd
ITEM POS    'Left      '120   '200  '20   '400  '15      '25      FUTUR12.GFT   '1   1    0    '420
            '190       '30
ITEM '@PPV'PAY-PER-VIEW HIT MOVIES As shown at block 878 in FIG. 18*c*, initially the microprocessor 602 instructs the tuner 603 to select a channel. The channel is decompressed, error corrected and decrypted, if necessary. If the video is to be reduced in size, so as to be placed within a video window, or is a split screen video window which must be enlarged, the video is scaled to the appropriate size. Additionally, the video may be required to be redirected to a portion of the television screen, accomplished by creating a series of offsets for each pixel location of the video.

Graphics may also be used to create a menu in most instances. As shown in block 882, the microprocessor 602 may fetch a background file, a logo file, and a menu display and cursor file in most instances. Each of these files is decompressed 883, and then combined, block 886.

an ethernet LAN connector to receive electronic program guide data from the scheduling web site and send a program selection to the scheduling web site;

the scheduling web site that receives the program selection and sends an authorization request to an order and authorization system, wherein the scheduling web site recognizes the subscriber and customizes the electronic program guide data for the subscriber;

the order and authorization system that receives the authorization request, including the program selection, from the scheduling web site and generates an authorization signal, the authorization signal providing the local authorization code; and a billing system that receives the authorization signal and generates a billing record.

2. The apparatus of claim 1, wherein the billing record debits a subscriber's account.

3. The apparatus of claim 1, wherein the billing system sends the billing record to a subscriber for payment.

4. The apparatus of claim 1, wherein the billing system charges a subscriber's credit card account.

5. The apparatus of claim 1, wherein the billing record is used to debit a cash card included in a terminal, the billing system sending a debit signal corresponding to the billing record to the terminal.

6. The apparatus of claim 5, wherein the cash card is part of a smart card.

7. The apparatus of claim 6, wherein the cash card is removable or fixed to the smart card.

8. The apparatus of claim 1, wherein the order and authorization system sends a credit signal to a terminal upon receipt of payment from the subscriber.

9. The apparatus of claim 1, wherein the order and authorization system includes a time out feature that allows cancellation of the program order without incurring a charge, the time out feature effective for a time prior to a start of the program and for a time after the start of the program.

10. The apparatus of claim 9, wherein the time after start of the program is five minutes.

11. The apparatus of claim 1, wherein the order and authorization system and a broadcaster are colocated with the billing system.

12. The apparatus of claim 1, wherein the order and authorization system sends a credit signal to a terminal upon receipt of payment from the subscriber.

13. The apparatus of claim 1, comprising a network controller that receives the authorization signal from the order and authorization system and generates the local authorization code.

14. The apparatus of claim 13, wherein the network controller comprises a network management CPU linked to the order and authorization system.

15. The apparatus of claim 1, wherein the order and authorization system is capable of receiving the authorization request by either an upstream data transmission over a cable distribution network or by a telephone line.

16. The apparatus of claim 1, wherein the receiver module comprises a means to communicate with the Internet.

17. The apparatus of claim 1, wherein the receiver module comprises a means to store text transmitted from at least one of a cable headend and an operations center, the transmitted text including information on billing and account status.

18. The apparatus of claim 1, wherein the scheduling web site is an Internet web site.

19. The apparatus of claim 1, wherein the scheduling web site is capable of recognizing the subscriber based on at least one of an automatic number identification (ANI), user name, user identification, and Internet address of the subscriber.

20. The apparatus of claim 1, wherein the scheduling web site is capable of recognizing the subscriber by requiring the subscriber to log into the web site.

21. The apparatus of claim 1, wherein the scheduling web site provides the electronic program guide customized for the subscriber, a generic electronic program guide, and a means to switch between the customized electronic program guide and the generic electronic program guide.

22. The apparatus of claim 1, comprising a set top terminal having the receiver module and the transmitter, and wherein the set top terminal is capable of displaying the customized electronic program guide in at least one of (i) a separate window and (ii) a picture-in-picture format, so that a broadcast program can also be simultaneously displayed.

23. The apparatus of claim 1, wherein the electronic program guide is customized according to previous programs ordered by the subscriber.

24. The apparatus of claim 1 wherein the electronic program guide is customized according to programs watched data collected from the subscriber.

25. The apparatus of claim 1, comprising a set top terminal having the receiver module and the transmitter, and wherein the electronic program guide is customized according to subscriber specific data stored in the set top terminal.

26. A method for providing broadcast television digital programming, comprising:
providing electronic program guide data to an ethernet LAN connector at a set top terminal from a scheduling web site, wherein the scheduling web site is capable of recognizing a subscriber and customizing the electronic program guide data for the subscriber;
receiving a program order at the scheduling web site from the ethernet LAN connector at the set top terminal, the program order designating one or more programs for viewing;
sending an authorization request from the scheduling web site to an order and authorization system;
sending a program authorization to a receiver module at the set top terminal;
broadcasting the digital programming and an address of the scheduling website to a receiver module at the set top terminal, wherein the program authorization provides access to the one or more programs designated by the program order; and
waiting for a time out period to determine if a cancel order signal has been received, and if the cancel order signal is not received in the time out period;
sending the program order to a billing system, and preparing a billing record.

27. The method of claim 26, further comprising:
waiting for a time out period to determine if a cancel order signal has been received, and if the cancel order signal is received in the time out period:
generating a deauthorization signal; and
transmitting the deauthorization signal, wherein the deauthorization signal removes access to a previously authorized program.

28. The method of claim 26, further comprising a debit signal corresponding to the billing record to a terminal, the debit signal debiting a cash card in the terminal.

29. The method of claim 28, wherein the cash card is part of a smart card.

30. The method of claim 26 further comprising a credit signal corresponding to receipt of payment from a subscriber to a terminal.

31. A set top terminal, comprising:
a receiver module to receive program data from a digital broadcast cable television delivery network, wherein the program data includes a plurality of multiplexed digital broadcast television programs, an address of a scheduling web site, and at least one authorization code to authorize access to at least one of the plurality of multiplexed digital broadcast television programs; and
an ethernet LAN connector to receive electronic program guide data from the scheduling web site and send an order to the scheduling web site for the at least one of the plurality of multiplexed digital broadcast television programs.

32. A method, comprising:

receiving program data from a digital broadcast cable television delivery network at a receiver module of a set top terminal, the program data including a plurality of multiplexed digital broadcast television programs, an address of a scheduling web site, and at least one authorization code to authorize access to at least one of the plurality of multiplexed digital broadcast television programs;

receiving electronic program guide data from the scheduling web site at an ethernet LAN connector of the set top terminal; and sending an order to the scheduling web site from the ethernet LAN connector of the set top terminal for the at least one of the plurality of multiplexed digital broadcast television programs.

* * * * *

UNITED STATES PATENT AND TRADEMARK OFFICE
CERTIFICATE OF CORRECTION

| | |
|---|---|
| PATENT NO. | : 7,134,131 B1 |
| APPLICATION NO. | : 09/556875 |
| DATED | : November 7, 2006 |
| INVENTOR(S) | : John S. Hendricks et al. |

It is certified that error appears in the above-identified patent and that said Letters Patent is hereby corrected as shown below:

Column 1, line 8, delete "No," and insert instead --No.--.

Column 1, line 52, delete "1999," and insert instead --1999.--.

Column 13, line 11, delete "subscribers" and insert instead --subscribers'--.

Column 15, line 38, delete "RS422" and insert instead --RS-422--.

Column 18, line 14, delete "am.," and insert instead --a.m.,--.

Column 46, line 9, delete ""001111110"" and insert instead --"01111110"--.

Signed and Sealed this

Thirteenth Day of March, 2007

JON W. DUDAS
*Director of the United States Patent and Trademark Office*